United States Patent
Chao et al.

(10) Patent No.: US 9,819,024 B2
(45) Date of Patent: Nov. 14, 2017

(54) SOLID STATE CATHOLYTES AND ELECTROLYTES FOR ENERGY STORAGE DEVICES

(71) Applicant: QuantumScape Corporation, San Jose, CA (US)

(72) Inventors: Cheng-Chieh Chao, San Jose, CA (US); Zhebo Chen, San Jose, CA (US); Tim Holme, San Jose, CA (US); Marie A. Mayer, San Jose, CA (US); Gilbert N. Riley, Jr., San Jose, CA (US)

(73) Assignee: QuantumScape Corporation, San Jose, CA (US)

( * ) Notice: Subject to any disclaimer, the term of this patent is extended or adjusted under 35 U.S.C. 154(b) by 0 days.

(21) Appl. No.: 15/404,179

(22) Filed: Jan. 11, 2017

(65) Prior Publication Data
US 2017/0149065 A1 May 25, 2017

Related U.S. Application Data

(60) Division of application No. 14/849,468, filed on Sep. 9, 2015, now Pat. No. 9,553,332, which is a
(Continued)

(51) Int. Cl.
*H01M 10/0562* (2010.01)
*H01M 4/62* (2006.01)
(Continued)

(52) U.S. Cl.
CPC .......... *H01M 4/624* (2013.01); *C01B 33/00* (2013.01); *H01M 4/505* (2013.01); *H01M 4/525* (2013.01);
(Continued)

(58) Field of Classification Search
CPC .... H01M 4/62; H01M 10/0562; H01M 4/131; H01M 2/1673; H01M 4/136;
(Continued)

(56) References Cited

U.S. PATENT DOCUMENTS

| 6,210,836 B1 | 4/2001 | Takada et al. |
| 6,277,524 B1 | 8/2001 | Kanno |

(Continued)

FOREIGN PATENT DOCUMENTS

| JP | 2001316583 | 11/2001 |
| JP | 2007273217 | 10/2007 |

(Continued)

OTHER PUBLICATIONS

Adams, S. et al., "Structural requirements for fast lithium ion migration in $Li_{10}GeP_2S_{12}$," J. Mater. Chem., 2012, 22, pp. 7687-7691.

(Continued)

*Primary Examiner* — Gary Harris
(74) *Attorney, Agent, or Firm* — Squire Patton Boggs (US) LLP

(57) ABSTRACT

The present invention provides an energy storage device comprising a cathode region or other element. The device has a major active region comprising a plurality of first active regions spatially disposed within the cathode region. The major active region expands or contracts from a first volume to a second volume during a period of a charge and discharge. The device has a catholyte material spatially confined within a spatial region of the cathode region and spatially disposed within spatial regions not occupied by the first active regions. In an example, the catholyte material comprises a lithium, germanium, phosphorous, and sulfur ("LGPS") containing material configured in a polycrystalline state. The device has an oxygen species configured
(Continued)

within the LGPS containing material, the oxygen species having a ratio to the sulfur species of 1:2 and less to form a LGPSO material. The device has a protective material formed overlying exposed regions of the cathode material to substantially maintain the sulfur species within the catholyte material. Also included is a novel dopant configuration of the $Li_aMP_bS_c$ (LMPS) [M=Si, Ge, and/or Sn] containing material.

3 Claims, 33 Drawing Sheets

Related U.S. Application Data continuation of application No. 14/618,979, filed on Feb. 10, 2015, now Pat. No. 9,172,114, which is a continuation of application No. PCT/US2014/038283, filed on May 15, 2014.

(60) Provisional application No. 61/935,956, filed on Feb. 5, 2014, provisional application No. 61/823,407, filed on May 15, 2013.

(51) Int. Cl.
| H01M 4/505 | (2010.01) |
| H01M 4/525 | (2010.01) |
| H01M 4/58 | (2010.01) |
| C01B 33/00 | (2006.01) |

(52) U.S. Cl.
CPC ....... *H01M 4/5825* (2013.01); *C01P 2006/40* (2013.01); *H01M 2300/0068* (2013.01)

(58) Field of Classification Search
CPC ...... H01M 4/525; H01M 4/505; H01M 4/582; H01M 4/366; H01M 10/056; H01M 10/0525; H01M 2300/0068; H01M 2220/20; H01M 2220/30; H01M 2300/0071; Y02T 10/7011; Y02P 70/54
USPC .................................................. 429/144, 322
See application file for complete search history.

(56) References Cited

U.S. PATENT DOCUMENTS

| 6,365,300 | B1 | 4/2002 | Ota et al. |
| 6,656,641 | B1 | 12/2003 | Kumar |
| 7,416,815 | B2 | 8/2008 | Ota et al. |
| 7,901,598 | B2 | 3/2011 | Ota |
| 8,524,393 | B2 | 9/2013 | Kojima |
| 8,546,019 | B2 | 10/2013 | Lee et al. |
| 8,697,292 | B2 | 4/2014 | Kanno et al. |
| 8,729,866 | B2 | 5/2014 | Tamane et al. |
| 8,871,391 | B2 | 10/2014 | Liang et al. |
| 8,962,194 | B2 | 2/2015 | Senga et al. |
| 9,172,112 | B2 | 10/2015 | Hama et al. |
| 9,172,113 | B2 | 10/2015 | Ohtomo et al. |
| 2003/0031931 | A1 | 2/2003 | Obrovac et al. |
| 2003/0157409 | A1 | 8/2003 | Huang |
| 2006/0246355 | A1 | 11/2006 | Min et al. |
| 2007/0160911 | A1 | 7/2007 | Senga et al. |
| 2009/0226816 | A1 | 9/2009 | Yoshida et al. |
| 2010/0019194 | A1* | 1/2010 | Fujiwara ............... H01M 4/131 252/182.1 |
| 2011/0076570 | A1 | 3/2011 | Hama et al. |
| 2011/0229765 | A1 | 9/2011 | Barker et al. |
| 2011/0259505 | A1 | 10/2011 | Lee et al. |
| 2011/0262816 | A1 | 10/2011 | Amatucci |
| 2011/0311875 | A1 | 12/2011 | Lee et al. |
| 2012/0094185 | A1 | 4/2012 | Tsuchida et al. |
| 2012/0196186 | A1 | 8/2012 | Richard |
| 2012/0208062 | A1 | 8/2012 | Zhou et al. |
| 2012/0276459 | A1 | 11/2012 | Im et al. |
| 2013/0040208 | A1 | 2/2013 | Kanno et al. |
| 2014/0141341 | A1 | 5/2014 | Ohtomo et al. |
| 2014/0170504 | A1 | 6/2014 | Baek et al. |
| 2014/0193693 | A1 | 7/2014 | Hoshina et al. |
| 2014/0193695 | A1 | 7/2014 | Hoshina et al. |
| 2014/0197800 | A1 | 7/2014 | Nagase et al. |
| 2014/0363745 | A1 | 12/2014 | Hirayama |
| 2015/0017548 | A1 | 1/2015 | Kato et al. |
| 2015/0037687 | A1 | 2/2015 | Kanno |
| 2015/0056496 | A1 | 2/2015 | Liang et al. |
| 2015/0118574 | A1 | 4/2015 | Visbal et al. |
| 2016/0156065 | A1 | 6/2016 | Visco et al. |
| 2016/0164136 | A1 | 6/2016 | Higuchi et al. |
| 2016/0181585 | A1 | 6/2016 | Choi et al. |
| 2016/0190638 | A1 | 6/2016 | Sugiura et al. |
| 2016/0190640 | A1 | 6/2016 | Visco et al. |

FOREIGN PATENT DOCUMENTS

| JP | 2013045683 | 3/2013 |
| JP | 2014241240 | 12/2014 |
| KR | 20140095658 | 8/2014 |
| WO | WO 2011/118801 | 9/2011 |

OTHER PUBLICATIONS

Ahn, Byung Tae, et al., "Synthesis and Lithium Conductivities of $Li_2SiS_3$ and $Li_4SiS_4$," Mat. Res. Bull., 1989, vol. 24, pp. 889-897.

Amaresh, S. et al., "Aluminum based sulfide solid lithium ionic conductors for all solid state batteries," Nanoscale, 2014, 6, pp. 6661-6667.

Andrews, Lester, et al., "Infrared Spectra of $P_4S_{10}$ and its Decomposition Products in Solid Argon," Inorganic Chemistry, 1990, vol. 29, pp. 5222-5225.

Aotani, Noboru, "Synthesis and electrochemical properties of lithium ion conductive glass, $Li_3PO_4$—$Li_2S$—$SiS_2$," Solid State Ionics, 1994, vol. 68, pp. 35-39.

Bandari, A. et al., "Origin of Fast Ion Conduction in $Li_{10}GeP_2S_{12}$, a Superionic Conductor," J. Phys. Chem. C, 2016, 120, pp. 29002-29010.

Bartholomew, Roger, F., et al., "Electrical properties of new glasses based on the $Li_2S$—$SiS_2$ system," Journal of Non-Crystalline Solids, 1999, vol. 256 & 257, pp. 242-247.

Bron, P. et al., "$Li_{10}Si_{0.3}Sn_{0.7}P_2S_{12}$—A low-cost and low-grain-boundary-resistance lithium superionic conductor," Journal of Power Sources, 329, 2016, pp. 530-535.

Bron, P. et al., "$Li_{10}SnP_2S_{12}$: An Affordable Lithium Superionic Conductor," J. Am. Chem. Soc., 2013, 135, pp. 15694-15697.

Creus, R., et al., "The Use of Ionic and Mixed Conductive Glasses in Microbatteries," Materials Science and Engineering, 1989, B3, pp. 109-112.

Creus, R., et al., "Thin films of ionic and mixed conductive glasses: their use in microdevices," Solid State Ionics, 1992, vol. 53-56, pp. 641-646.

Deiseroth, Hans-Jorg, et al., "$Li_6PS_5X$: A Class of Crystalline Li Rich Solids with an Unusually High Li+ Mobility," Angew. Chem. Int. Ed., 2008, vol. 47, pp. 755-758.

Du, F. et al., "Structures, Thermodynamics, and Li+Mobility of $Li_{10}GeP_2S_{12}$: a First-Principles Analysis," J. Phys. Chem. C 2014, 118, pp. 10590-10595.

Duluard, Sandrine, et al., "Lithium conducting solid electrolyte $Li_{1.3}Al_{0.3}Ti_{1.7}(PO_4)_3$ obtained via solution chemistry," Journal of the European Ceramic Society, 2012, 9 pages.

Eckert, Hellmut, et al., "Structural Transformation of Non-Oxide Chalcogenide Glasses. The Short-Range Order of $Li_2S$—$P_2S_5$ Glasses Studied by Quantitative $^{31}P$ and $^{6,7}Li$ High-Resolution Solid-State NMR," Chem. Mater., 1990, vol. 2, pp. 273-279.

Hassoun, J. et al., "A structural, spectroscopic and electrochemical study of a lithium ion conducting $Li_{10}GeP_2S_{12}$ solid electrolyte," Journal of Power Sources, 229, 2013, pp. 117-122.

(56) References Cited

OTHER PUBLICATIONS

Hayashi, Akitoshi, et al., "Characterization of $Li_2S$—$P_2S_5$ glass-ceramics as a solid electrolyte for lithium secondary batteries," Solid State Ionics, 2004, vol. 175, pp. 683-686.

Hayashi, Akitoshi, et al., "Characterization of $Li_2S$—$SiS_2$—$Li_3MO_3$ (M=B, Al, Ga and In) oxysulfide glasses and their application to solid state lithium secondary batteries," Solid State Ionics, 2002, vol. 152-153, pp. 285-290.

Hayashi, Akitoshi, et al., "Development of sulfide glass-ceramic electrolytes for all-solid-state lithium rechargeable batteries," J. Solid State Electrochem, 2010, vol. 14, pp. 1761-1767.

Hayashi, Akitoshi, et al., "Formation of Li superionic crystals from the $Li_2S$—$P_2S_5$ melt-quenched glasses," J. Mater Sci, 2008, vol. 43, pp. 1885-1889.

Hayashi, Akitoshi, et al., "Formation of superionic crystals from mechanically milled $Li_2S$—$P_2S_5$ glasses," Electrochemistry Communications, 2003, vol. 5, pp. 111-114.

Hayashi, Akitoshi, et al., "Improvement of chemical stability of $Li_3PS_4$ glass electrolytes by adding MA (M=Fe, Zn, and Bi) nanoparticles," Journal of Materials Chemistry A, 2013, vol. 1, pp. 6320-6326.

Hayashi, Akitoshi, et al., "Preparation of $Li_2S$—$P_2S_5$ Amorphous Solid Electrolytes by Mechanical Milling," Journal of the American Ceramic Society, 2001, vol. 84, pp. 477-479.

Hirai, Koichi, et al., "Thermal and electrical properties of rapidly quenched glasses in the systems $LI_2S$—$SiS_2$—$Li_xMO_y$ ($Li_xMO_y$=$LL_iSia_j$, $Li_2SO_4$)," Solid State Ionics, 1995, vol. 78, pp. 269-273.

Hu, C.H. et al., "Insights into structural stability and Li superionic conductivity of $Li_{10}GeP_2S_{12}$ from first-principles calculations," Chemical Physics Letters, 591, 2014, pp. 16-20.

Hu, Y-W., et al., "Ionic Conductivity of Lithium Orthosilicate-Lithium Phosphate Solid Solutions," J. Electrochem. Soc., 1977, vol. 124, No. 8, pp. 1240-1242.

Inada, T. et al., "All solid-state sheet battery using lithium inorganic solid electrolyte, thio-LISICON," Journal of Power Sources, 194, 2009, pp. 1085-1088.

Inada, T. et al., "Fabrications and properties of composite solid-state electrolytes," Solid State Ionics, 158, 2003, pp. 275-280.

Inada, T. et al., "Silicone as a binder in composite electrolytes," Journal of Power Sources, 119-121, 2003, pp. 948-950.

Kaib, Thomas, et al., "New Lithium Chalcogenidotetrelates, LiChT: Synthesis and Characterization of the LitConducting Tetralithium ortho-Sulfidostannate $Li_4SnS_4$," Chemistry of Materials, 2012, vol. 24, pp. 2211-2219.

Kamaya, Noriaki, et al., "A lithium superionic conductor," Nature Materials, 2011, vol. 10, pp. 682-686.

Kamaya, Noriaki, et al., "A lithium superionic conductor," *Supporting Information* Nature Materials, 2011, vol. 10, pp. 682-686.

Kanno, R. et al., "New Lithium Solid Electrolytes, Thio-Lisicon: Materials Design Concept and Application to Solid State Battery," Solid State Ionics: Trends in The New Millennium, Dec. 7, 2002, pp. 13-22.

Kanno, Ryoji, "Lithium Ionic Conductor Thio-LISICON, the $Li_2S$—$GeS_2$—$P_2S_5$ System," Journal of the Electrochemical Society, 2001, vol. 148, pp. A742-A746.

Kanno, Ryoji, "Synthesis of a new lithium ionic conductor, thio-LISICON-lithium germanium sulfide system," Solid State Ionics, 2000, vol. 130, pp. 97-104.

Kato, Y. et al., "Discharge Performance of All-Solid-State Battery Using a Lithium Superionic Conductor $Li_{10}GeP_2S_{12}$," Electrochemistry, vol. 80, 2012, No. 10, pp. 749-751.

Kato, Y. et al., "Synthesis, structure and lithium ionic conductivity of solid solutions of $Li_{10}(Ge_{1-x}M_x)P_2S_{12}$ (M=Si, Sn)," Journal of Power Sources, 271, 2014, pp. 60-64.

Kennedy, John, H., et al., "A Highly Conductive Li-Glass System: (1-x) ($0.45iS_2$—$0.6Li_2S$)—$xLiI$," J. Electrochem. Soc., 1986, pp. 2437-2438.

Kobayashi, Takeshi, et al., "Interfacial reactions at electrode/electrolyte boundary in all solid-state lithium battery using inorganic solid electrolyte, thio-LISICON," Electrochimica Acta, 2008, vol. 53, pp. 5045-5050.

Kondo, S., et al., "New lithium ion conductors based on $Li_2S$—$SiS_2$ system," Solid State Ionics, 1992, vol. 53-56, pp. 1183-1186.

Kuhn, A. et al., "A new ultrafast superionic Li-conductor: ion dynamics in $Li_{11}Si_2PS_{12}$ and comparison with other tetragonal LGPS-type electrolytes," Phys. Chem. Chem. Phys., 2014, 16, pp. 14669-14674.

Kuhn, A. et al., "Single-crystal X-ray structure analysis of the superionic conductor $Li_{10}GeP_2S_{12}$," Phys.Chem. Chem. Phys., 2013, 15, 11620-11622.

Kuhn, A. et al., "Tetragonal $Li_{10}GeP_2S_{12}$ and $Li_7GePS_8$—exploring the Li ion dynamics in LGPS Li electrolytes," Energy Environ. Sci., 2013, 6, pp. 3548-3552.

Kuhn, A. et al., "Ultrafast Li Electrolytes Based on Abundant Elements: $Li_{10}SnP_2S_{12}$ and $Li_{11}Si_2PS_{12}$," Feb. 19, 2014: arXiv: 1402.4586.

Kuhn, A. et al., "Ultrafast Li Electrolytes Based on Abundant Elements: $Li_{10}SnP_2S_{12}$ and $Li_{11}Si_2PS_{12}$," *Supporting Information*, Feb. 19, 2014: arXiv: 1402.4586.

Leal-Gonzalez, J., et al., "Structure of Lithium Sulfide, $LiGaS_2$," Acta. Cryst., 1990, pp. 2017-2019.

Liu, Zengcai, et al., "Anomalous High Iconic Conductivity of Nanoporous R—$Li_3PS_4$," Journal of the American Chemical Society, 2012, 4 pages.

Liu, Zhangiang, et al., "High performance $Li_2S$—$P_2S_5$ solid electrolyte induced by selenide," Journal of Power Sources, 2014, vol. 260, pp. 264-267.

Menetrier, M, et al., "Iconic conduction in $B_2S_3$—$Li_2S$—LiI glasses," Solid State Ionics, 1992, vol. 53-56, pp. 1208-1213.

Mercier, Rene, et al., "Superionic Conduction in $Li_2S$—$P_2S_5$—LiI-Glasses," Solid State Ionics, 1981, vol. 5, pp. 663-666.

Minami, Keiichi, et al., "Electrical and electrochemical properties of the $70Li_2S$ $(30-x)P_2S_5xP_2O_5$ glass-ceramic electrolytes," Solid State Ionics, 2008, vol. 179, pp. 1282-1285.

Minami, Keiichi, et al., "Electrical and electrochemical properties of glass-ceramic electrolytes in the systems $Li_2S$—$P_2S_5$—$P_2S_3$ and $Li_2S$—$P_2S_5$—$P_2O_5$," Solid State Ionics, 2011, vol. 192, pp. 122-125.

Minami, Keiichi, et al., "Lithium ion conductivity of the $Li_2S$—$P_2S_5$glass-based electrolytes prepared by the melt quenching method," Solid State Ionics, 2007, vol. 178, pp. 837-841.

Minami, Tsutomu, et al., "Preparation and characterization of lithium ion-conducting oxysulfide glasses," Solid State Ionics, 2000, vol. 136-137, pp. 1015-1023.

Minami, Tsutomu, et al., "Recent progress of glass and glass-ceramics as solid electrolytes for lithium secondary batteries," Solid State Ionics, 2006, vol. 177, pp. 2715-2720.

Minami Tsutomu,, "Fast Ion Conducting Glasses," Journal of Non-Crystalline Solids, 1985, vol. 73, pp. 273-284.

Mizuno, Fuminori, et al., "All Solid-State Lithium Secondary Batteries Using High Lithium Ion Conducting $Li_2S$—$P_2S_5$ Glass-Ceramics," Chemistry Letters, 2002, pp. 1244-1245.

Mizuno, Fuminori, et al., "High lithium ion conducting glass-ceramics in the system $Li_2S$—$P_2S_5$," Solid State Ionics, 2006, vol. 177, pp. 2721-2725.

Mizuno, Fuminori, et al., "New, Highly Ion-Conductive Crystals Precipitated from $Li_2S$—$P_2S_5$ Glasses," Advanced Materials, 2005, vol. 17, No. 7, pp. 918-921.

Mo, Y. et al., "First Principles Study of the $Li_{10}GeP_2S_{12}$ Lithium Super Ionic Conductor Material," Chem. Mater., 2012, 24, pp. 15-17.

Morimoto, Hideyuki, et al., "Mechanochemical Synthesis of New Amorphous Materials of $60Li_2$—$40SiS_2$ with High Lithium Ion Conductivity," J. Am. Ceram. Soc., 1999, vol. 82, pp. 1352-1354.

Muramatsu, Hiromasa, et al., "Structural change of $Li_2S$—$P_2S_5$ sulfide solid electrolytes in the atmosphere," Solid State Ionics, 2011, vol. 182, pp. 116-119.

Murayama, Masahiro, et al., "Material Design of New Lithium Ionic Conductor thio-LISICON, in the $Li_2S$—$P_2S_5$ System," Solid State Ionics, 2004, vol. 170, pp. 173-180.

(56) References Cited

OTHER PUBLICATIONS

Murayama, Masahiro, et al., "Synthesis of New Lithium Ionic Conductor Thio-LISICON-Lithium Silicon Sulfides System," Journal of Solid State Chemistry, 2002, vol. 168, pp. 140-148.
Norrel, Johannes, et al., "Anion exchange of Oxygen by Sulfur in GeO$_2$-based glasses," Proceedings of SPIE vol. 4990, 2003, 10 pages. pp. 87-96.
Oh, G. et al., "Bulk-Type All Solid-State Batteries with 5 V Class LiNi$_{0.5}$Mn$_{1.5}$O$_4$ Cathode and Li$_{10}$GeP$_2$S$_{12}$ Solid Electrolyte," Chem. Mater., 2016, 28, pp. 2634-2640.
Ohtomo, Takamasa, et al., "Characteristics of the Li$_2$O—Li$_2$S—P$_2$S$_5$ glasses synthesized by the two-step mechanical milling," Journal of Non-Crystalline Solids, 2013, vol. 364, pp. 57-61.
Ohtomo, Takamasa, et al., "Electrical and electrochemical properties of Li$_2$S—P$_2$S$_5$—P$_2$O$_5$ glass-ceramic electrolytes," Journal of Power Sources, 2005, vol. 146, pp. 715-718.
Ohtomo, Takamasa, et al., "Suppression of H$_2$S gas from Li$_2$S—P$_2$S$_5$glass electrolytes by the addition of Li$_2$O," The Electrochemical Society, 2012, 1 page.
Ong, S. et al., "Phase stability, electrochemical stability and ionic conductivity of the Li$_{10\pm1}$MP$_2$X$_{12}$ (M=Ge, Si, Sn, Al or P, and X=O, or Se) family of superionic conductors," Energy Environ. Sci., 2013, 6, pp. 148-156.
Ooura, Yuji, et al., "A new lithium-ion conducting glass ceramic in the composition of 75Li$_2$S 5P$_2$S$_3$ 20P$_2$S$_5$ (mork)," Solid State Ionics, 2013, 5 pages.
Pradel, A., et al., "Lithium Chalcogenide Conductive Glasses," Materials Chemistry and Physics, 1989, vol. 23, pp. 121-142.
Pradel, Annie, et al., "Ionically Conductive Chalcogenide Glasses," Journal of Solid State Chemistry, 1992, vol. 96, pp. 247-257.
Rao, R. Prasada, et al., "Synthesis and Li ion Migration Studies of Li$_6$PS$_5$X (X=Cl, Br, I)," Mater. Res. Soc. Symp. Proc., 2011, vol. 1331, 6 pages.
Sahu, Gayatri, et al., "Air-Stable, High-Conduction Solid Electrolytes of Arsenic-Substituted Li$_4$SnS$_4$," Energy Environ. Sci., 2013, 9 pages.
Sakuda, Atsushi, et al., "All-solid-state lithium secondary batteries using LiCoO$_2$ particles with pulsed laser deposition coatings of L1$_2$5—P$_2$S$_5$ solid electrolytes," Journal of Power Sources, 2011, vol. 196, pp. 6735-6741.
Sakuda, Atsushi, et al., "Sulfide Solid Electrolyte with Favorable Mechanical Property for All-Solid-State Lithium Battery," Scientific Reports, 2013, 5 pages.
Seino, Yoshikatsu, et al., "A sulphide lithium super ion conductor is superior to liquid ion conductors for use in rechargeable batteries," Energy & Environmental Science, 2013, 5 pages.
Seino, Yoshikatsu, et al., "Synthesis and electrochemical properties of Li$_2$S—B$_2$S$_{3-LLI}$SiO$_4$," Solid State Ionics, 2006, vol. 177, pp. 2601-2603.
Seino, Yoshikatsu, et al., "Synthesis of phosphorous sulfide solid electrolyte and all-solid-state lithium batteries with graphite electrode," Solid State Ionics, 2005, pp. 2389-2393.
Seino, Yoshikatsu, et al., Electronic Supplementary Material (ESI) to "A sulphide lithium super ion conductor is superior to liquid ion conductors for use in rechargeable batteries," Energy & Environmental Science, 2013, 4 pages.
Seo, Inseok, et al., "Fast lithium ion conducting solid state thin-film electrolytes based on lithium thio-germanate materials," Acta Materialia, 2011, vol. 59, pp. 1839-1846.
Seo, Inseok, et al., "Structural Properties of Lithium Thio-Germanate Thin Film Electrolytes Grown by Radio Frequency Sputtering," Inorganic Chemistry, 2011, vol. 50, pp. 2143-2150.
Sistla, Ramesh, K. et al., "Structural studies on xLi$_2$S—(1 − x)P$_2$S$_5$ glasses by X-ray diffraction and molecular dynamics simulation," Journal of Non-Crystalline Solids, 2004, vol. 349, pp. 54-59.
Sun, Y. et al., "Oxygen substitution effects in Li$_{10}$GeP$_2$S$_{12}$ solid electrolyte," Journal of Power Sources, 324, 2016, pp. 798-803.
Suzuki, K. et al., "Synthesis, structure, and electrochemical properties of crystalline Li—P—S—O solid electrolytes: Novel lithium-conducting oxysulfides of Li$_{10}$GeP$_2$S$_{12}$ family," Solid State Ionics, vol. 288, May 2016, pp. 229-234.
Sveinbjornsson, Dadi, et al., "Ionic Conductivity and the Formation of Cubic CaH$_2$ in the LiBH$_4$—Ca(BH$_4$)$_2$ Composit," Journal of Solid State Chemistry, 2013, 26 pages.
Tachez, Michel, et al., "Ionic Conductivity of and Phase Transition in Lithium Thiophosphate Li$_3$PS$_4$," Solid State Ionics, 1984, vol. 14, pp. 181-185.
Takada, K. et al., "Compatibility of Lithium Ion Conductive Sulfide Glass with Carbon-Lithium Electrode," J. Electrochem. Soc. 2003, vol. 150, Issue 3, pp. A274-A277.
Takada, Kazunori, et al., "Electrochemical behaviors of Li ion conductor Li$_3$PO$_4$—Li$_2$S—SiS$_2$," Journal of Power Sources, 1993, vol. 43-44, pp. 135-141.
Takada, Kazunori, et al., "Lithium ion conductive oxysulfide Li$_3$PO$_4$—Li$_3$PS$_4$," Solid State Ionics, 2005, vol. 176, pp. 2355-2359.
Takada, Kazunori, et al., "Solid State Lithium Battery with Oxysulfide glass," Solid State Ionics, 1996, vol. 86-88, pp. 877-882.
Takahara, Hikari, et al., Application of Lithium Metal Electrodes to All-Solid-State Lithium Secondary Batteries Using Li$_3$PO$_4$—Li$_2$S—SiS$_2$ glass, Journal of the Electrochemical Society, 2004, vol. 151, Issue 9, pp. A1309-A1313.
Tarhouchi, I. et al., "Electrochemical characterization of Li$_{10}$SnP$_2$S$_{12}$: An electrolyte or a negative electrode for solid state Li-ion batteries?" Solid State Ionics, 296, 2016, pp. 18-25.
Tatsumisago, Masahiro, et al., "All-solid-state lithium secondary batteries using sulfide-based glass-ceramic electrolytes," Journal of Power Sources, 2006, vol. 159, pp. 193-199.
Teragawa, Shingo, et al., "Preparation of Li$_2$S—P$_2$S$_5$ solid electrolyte from N-methylformamide solution and application for all-solid-state lithium battery," Journal of Power Sources, 2014, vol. 248, pp. 939-942.
Trevey, James, et al., "Glass-ceramic Li$_2$S—P$_2$S$_5$ electrolytes prepared by a single step ball billing process and their application for all-solid-state lithium-ion batteries," Electrochemistry Communications, 2009, vol. 11, pp. 1830-1833.
Ujiie, Satoshi, et al., "Preparation and electrochemical characterization of (100 − x)(0.7Li$_2$S 0.3P$_2$S$_5$) xLiBr glass-ceramic electrolytes," Mater Renew Sustain Energy, 2013, 8 pages.
Wang, Y. et al., "Highly lithium-ion conductive thio-LISICON thin film processed by low-temperature solution method," Journal of Power Sources, 224, 2013, pp. 225-229.
Wang, Y. et al., "Highly lithium-ion conductive thio-LISICON thin film processed by low-temperature solution method," *Supporting Information*, Journal of Power Sources, 224, 2013, pp. 225-229.
Weber, Dominik A. et al., "Structural Insights and 3D Diffusion Pathways within the Lithium Superionic Conductor Li$_{10}$GeP$_2$S$_{12}$," Chem. Mater., 2016, 28, pp. 5905-5915.
Wenzel, S. et al., "Direct Observation of the Interfacial Instability of the Fast Ionic Conductor Li$_{10}$GeP$_2$S$_{12}$ at the Lithium Metal Anode," Chem. Mater., 2016, 28, pp. 2400-2407.
Xu, M. et al., "One-dimensional stringlike cooperative migration of lithium ions in an ultrafast ionic conductor," Appl. Phys. Lett. 101, 2012, 031901.
Yamashita, M., et al., "Formation and ionic conductivity of L1$_2$5—GeS$_{2-Ga2}$S$_3$ glasses and thin films," Solid State Ionics, 2003, vol. 158, pp. 151-156.
Yamauchi, A., et al., "Preparation and ionic conductivities of (100-x)(0.75Li$_2$S0.25P$_2$S$_5$)xLiBH$_4$ glass electrolytes," Journal of Power Sources.
McGrogan, Frank P. et al., Compliant Yet Brittle Mechanical Behavior of Li$_2$S-P$_2$S$_5$ Lithium-Ion-Conducting Solid Electrolyte (2017) *Adv. Energy Mater*. 1602011, 5 pages.
Qu, Meng et al., Nanomechanical Quantification of Elastic, Plastic, and Fracture Properties of LiCoO$_2$ (2012) *Adv. Energy Mater*. 2:940-944; 5 pages.
Sakuda, Atsushi et al., Evaluation of elastic modulus of Li$_2$S-P$_2$S$_5$ glassy solid electrolyte by ultrasonic sound velocity measurement and compression test (2013) *Journal of the Ceramic Society of Japan* 121[11]:946-949; 4 pages.

(56) References Cited

OTHER PUBLICATIONS

Sakuda, Atsushi et al., Sulfide Solid Electrolyte with Favorable Mechanical Property for All-Solid-State Lithium Battery (2013) *Scientific Reports* 3:2261 | DOI: 10.1038/srep02261, 5 pages.

\* cited by examiner

Diagonal lines– active positive electrode material

Speckle – Ionic conductor

Black – Electronic conductor

Horizontal Pin Stripes— Negative electrode current collector
Crosshatch— Solid State Electrolyte
Checkered— Positive electrode current collector

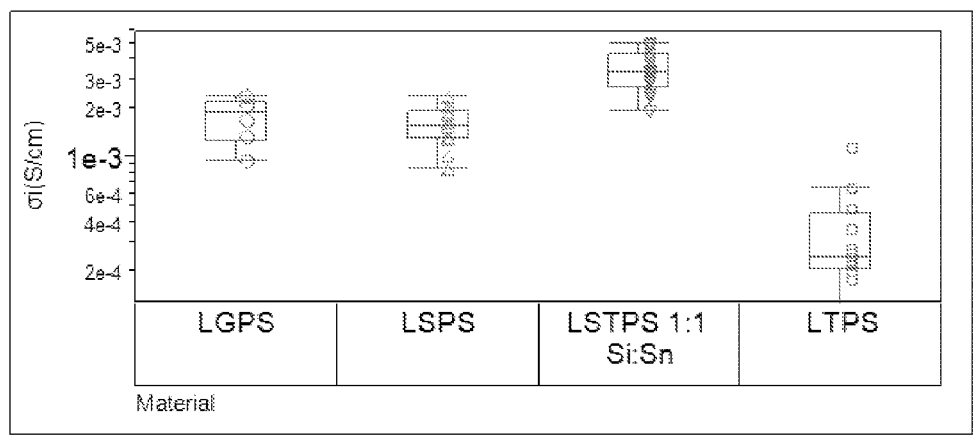
FIGURE 19: Ionic conductivity at 60°C of LGPS, LSPS, LSTPS, and LTPS

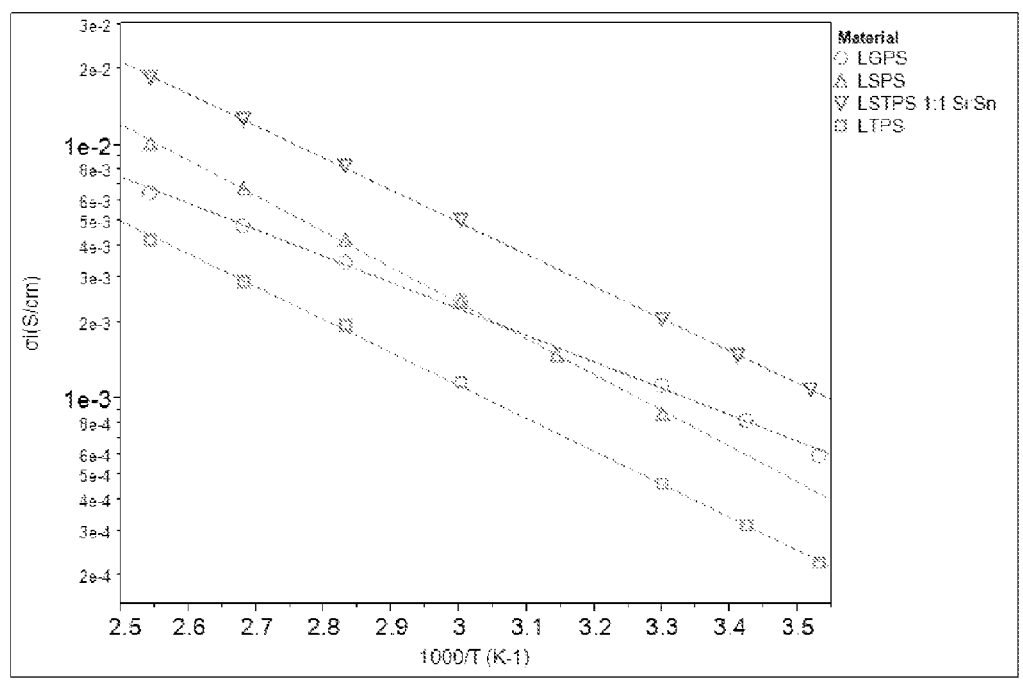
FIGURE 20: Arrhenius plot of ionic conductivity. The activation energies are as follows: LGPS – 0.21 eV. LSTPS – 0.25 eV. LSPS – 0.28 eV. LTPS – 0.26 eV

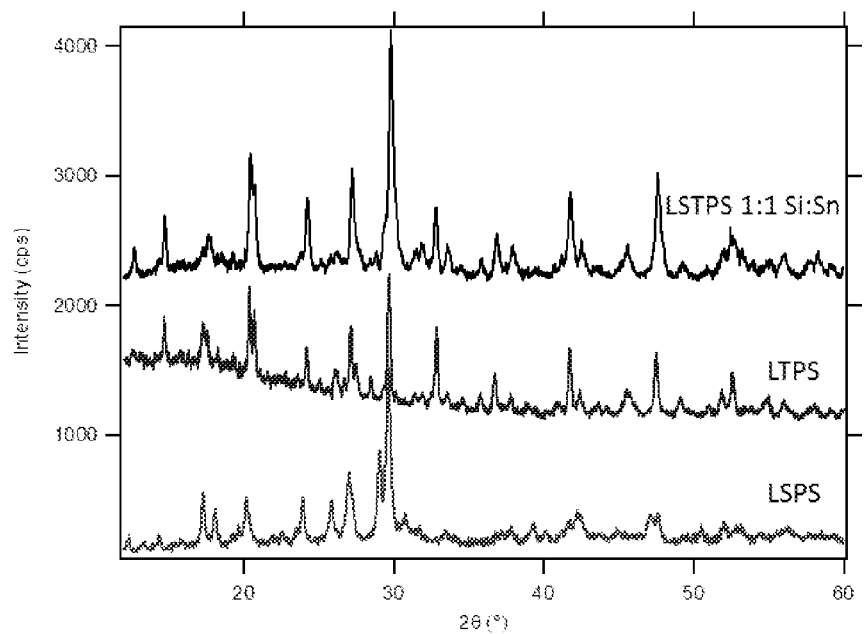
FIGURE 21: Crystal structure from XRD spectra of LSTPS, LSPS, and LTPS

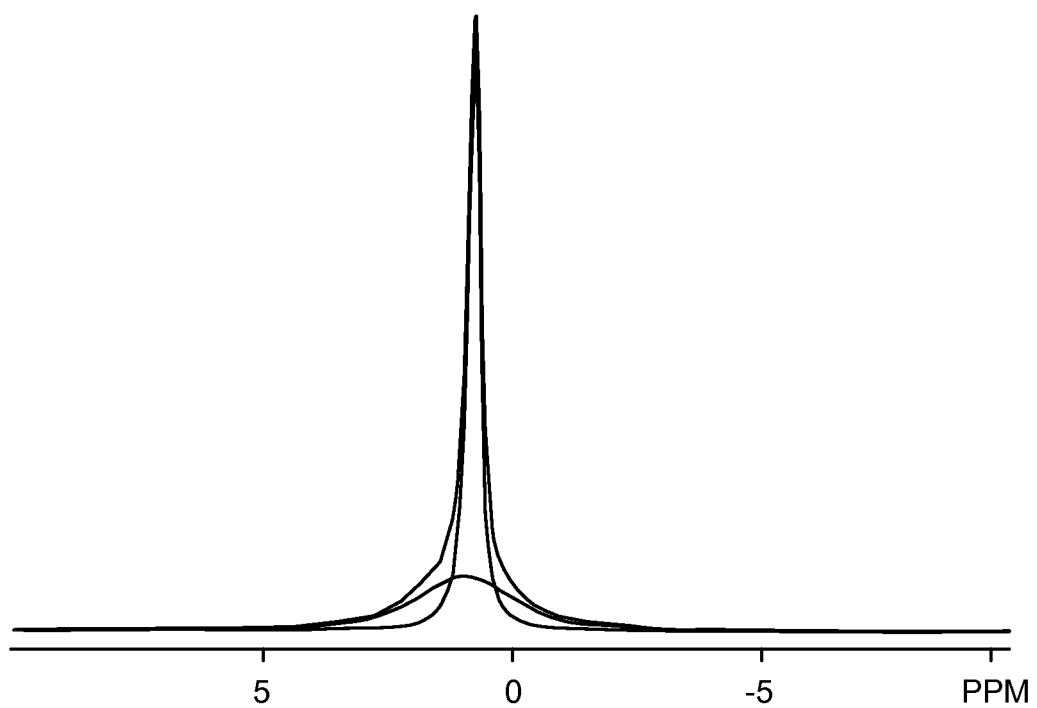
FIGURE 22A: LTPS $^7$Li NMR

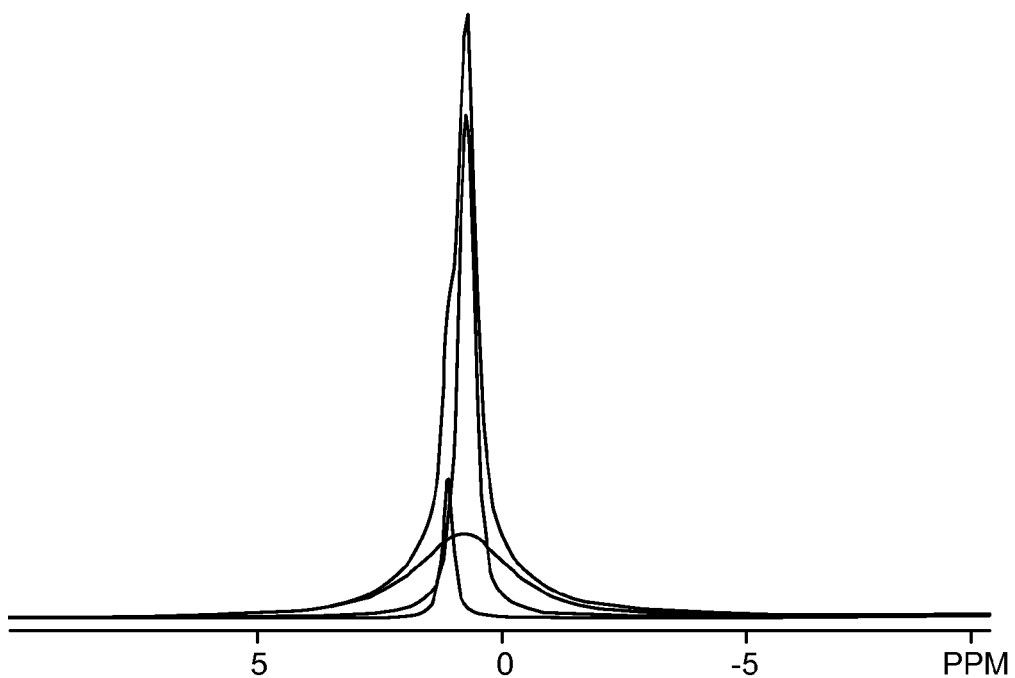
FIGURE 22B: LSTPS $^7$Li NMR

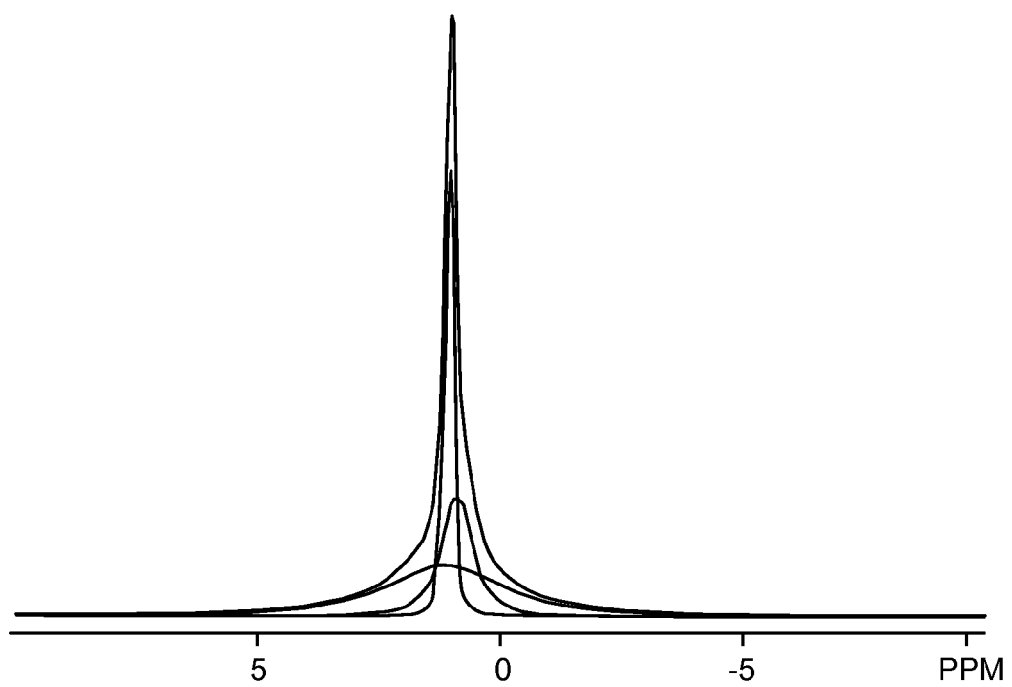
FIGURE 22C: LSPS $^7$Li NMR

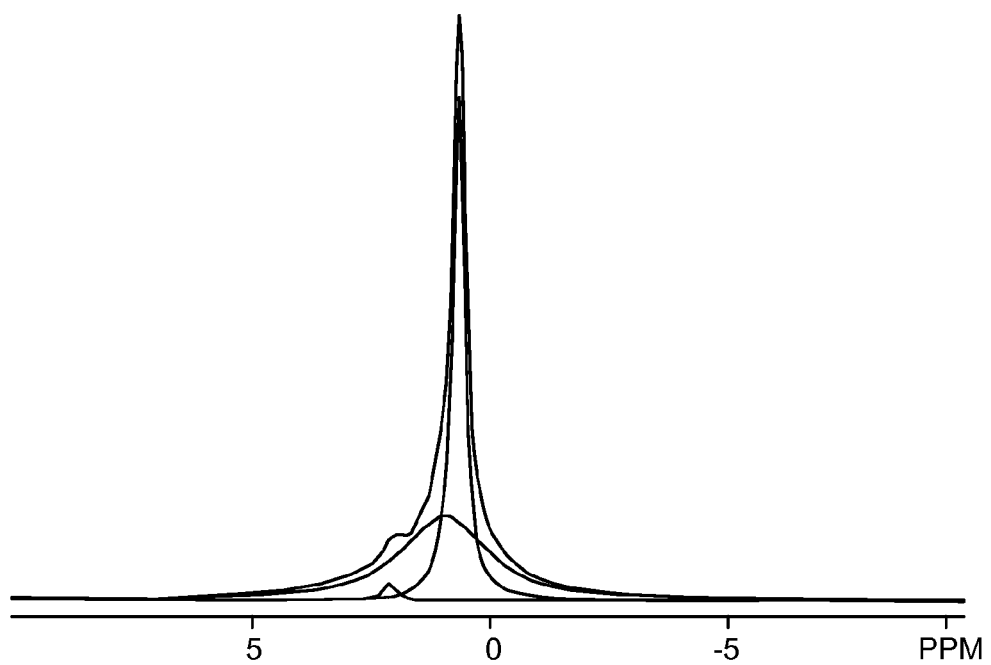
FIGURE 22D: LGPS $^7$Li NMR

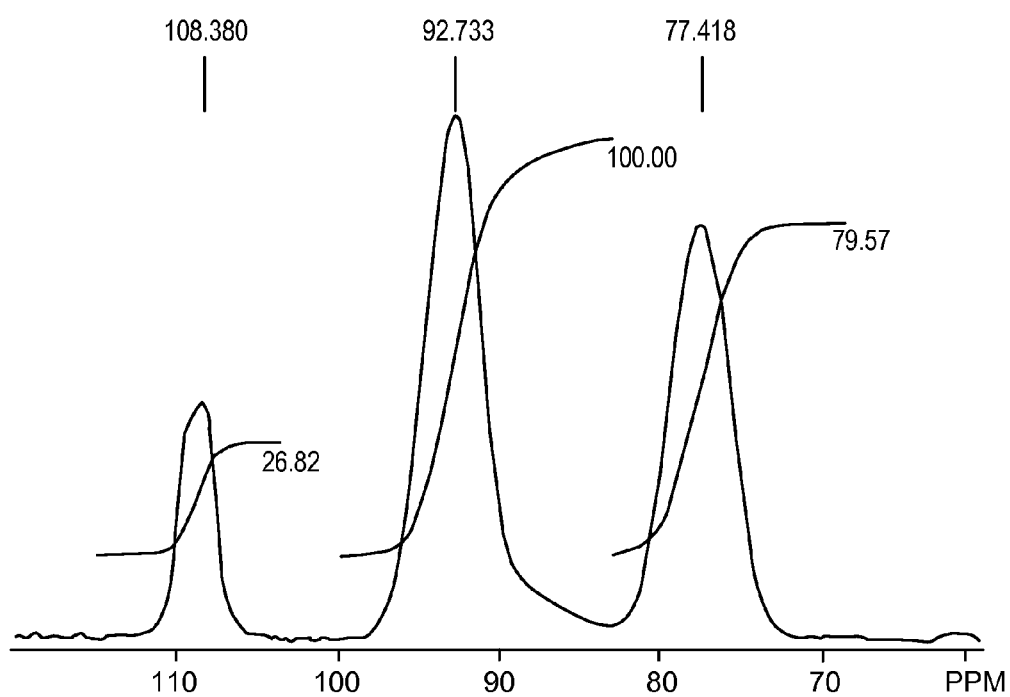
FIGURE 23A: LTPS $^{31}$P NMR

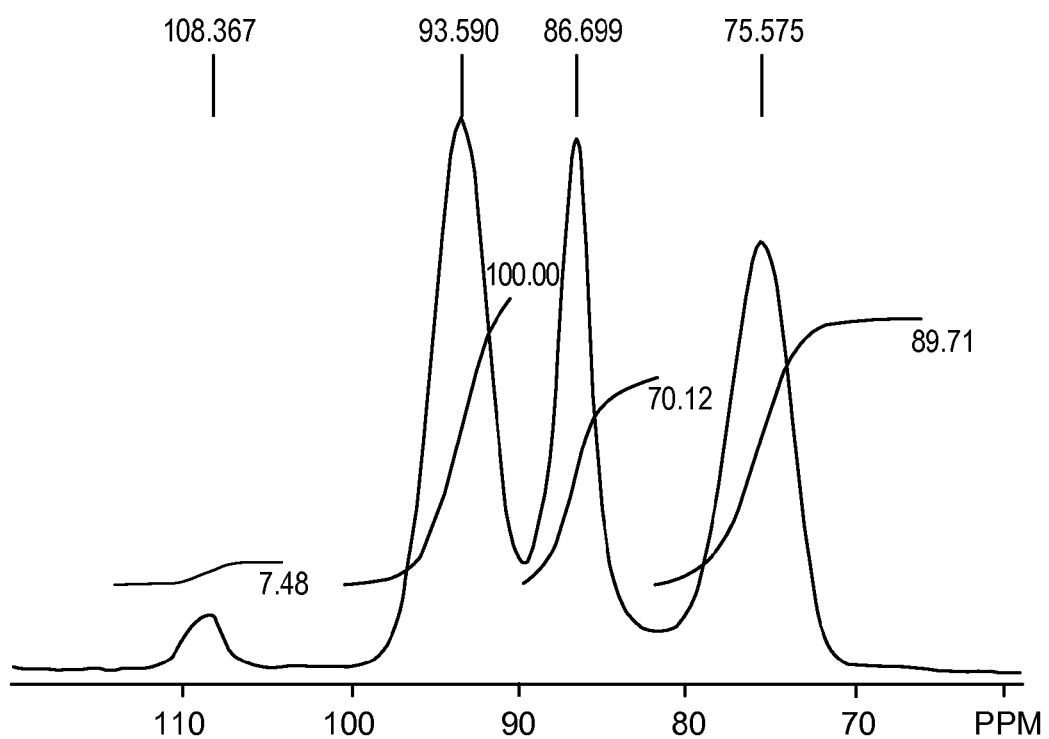
FIGURE 23B: LSTPS $^{31}$P NMR

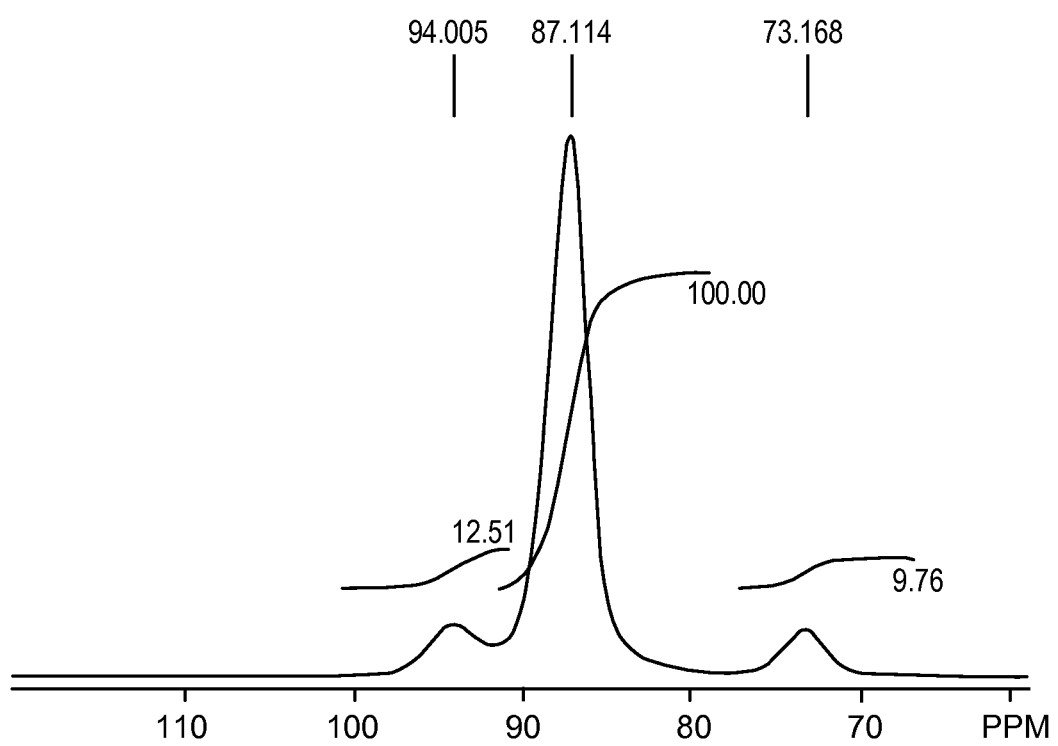
FIGURE 23C: LSPS $^{31}$P NMR

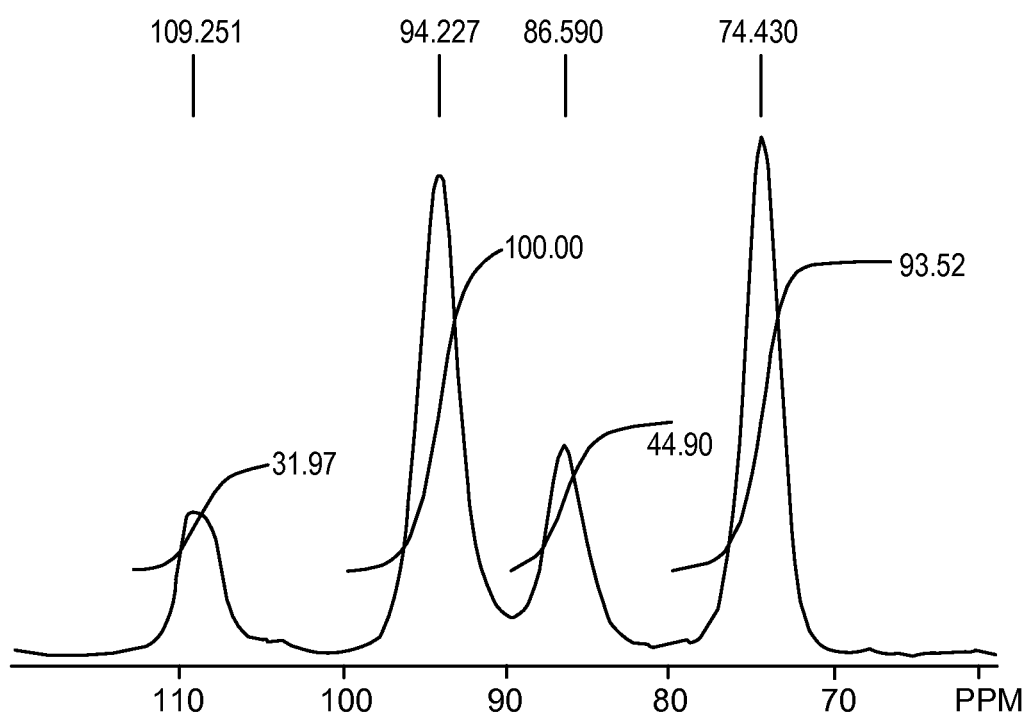
FIGURE 23D: LGPS $^{31}$P NMR

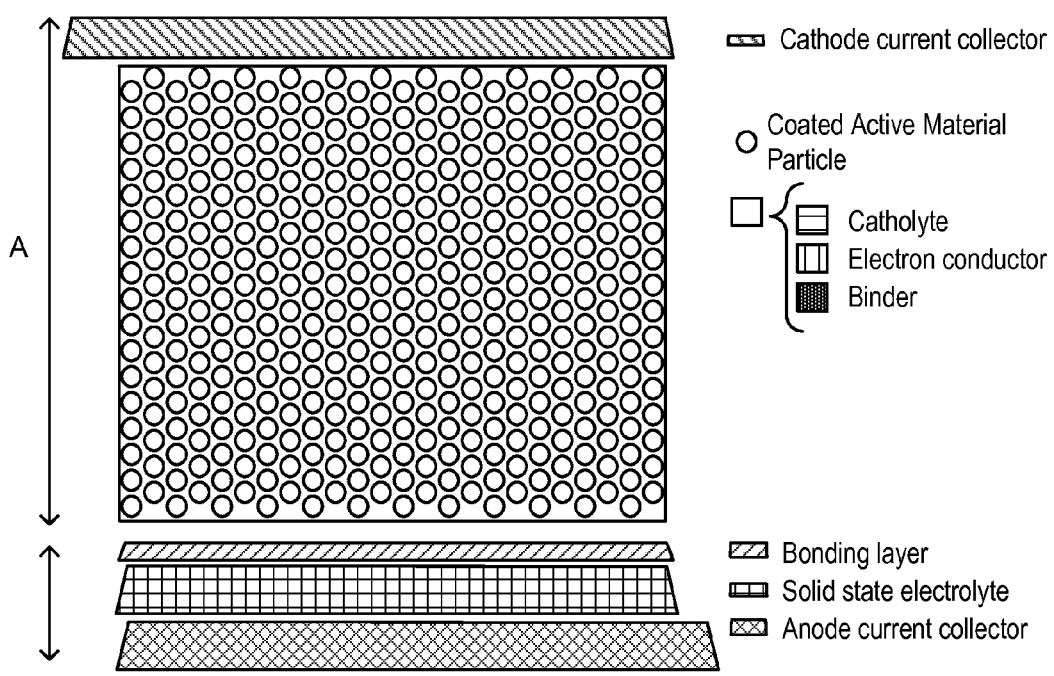
FIGURE 24: Schematic of full cell with solid state catholyte

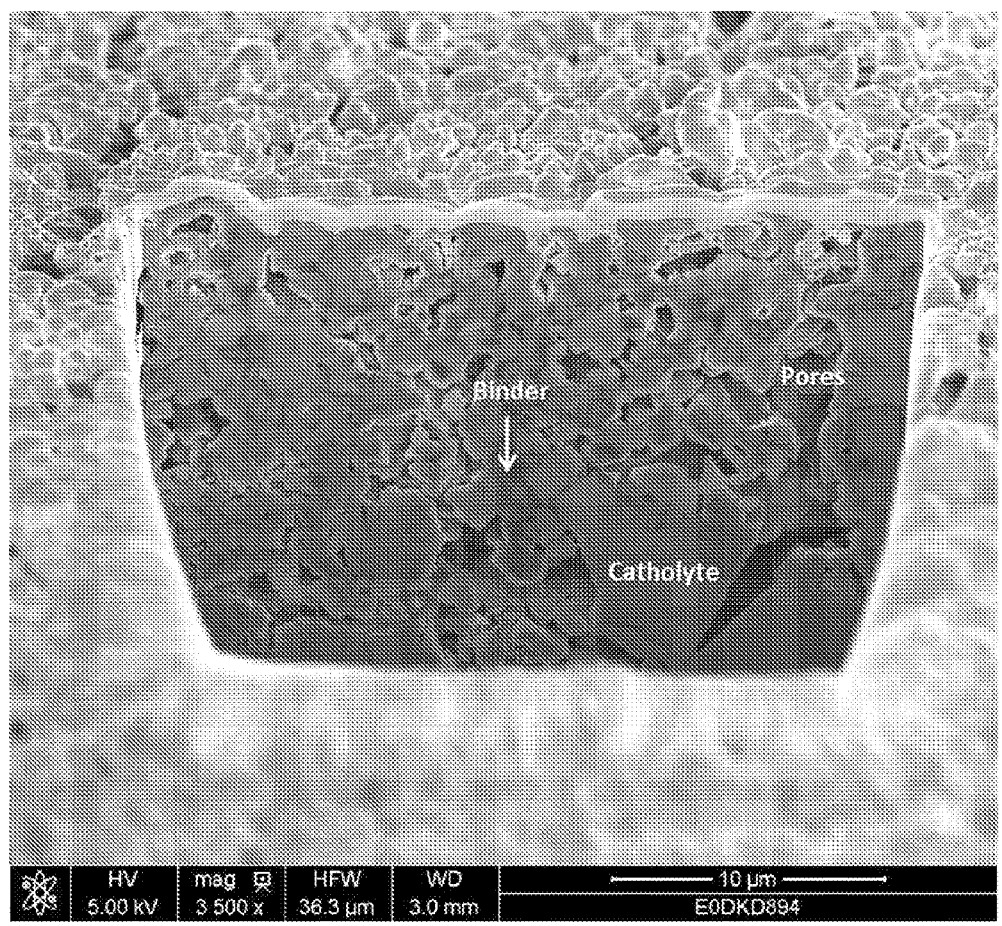
FIGURE 25: SEM micrograph of cast film of solid state catholyte

SOLID STATE CATHOLYTES AND ELECTROLYTES FOR ENERGY STORAGE DEVICES

CROSS-REFERENCE TO RELATED APPLICATIONS

This application is a divisional of U.S. patent application Ser. No. 14/849,468, entitled SOLID STATE CATHOLYTES AND ELECTROLYTES FOR ENERGY STORAGE DEVICES, filed Sep. 9, 2015, which is a continuation of U.S. patent application Ser. No. 14/618,979, entitled SOLID STATE CATHOLYTES AND ELECTROLYTES FOR ENERGY STORAGE DEVICES, filed Feb. 10, 2015, which is a continuation of PCT Application No. PCT/US2014/038238, filed May 15, 2014, entitled SOLID STATE CATHOLYTE OR ELECTROLYTE FOR BATTERY USING $Li_aMP_bS_c$ (M=Si, Ge, and/or Sn), which claims priority to U.S. Provisional Patent Application No. 61/823,407, filed May 13, 2013, and U.S. Provisional Patent Application No. 61/935,956, filed Feb. 5, 2014, the disclosures of which are incorporated herein by reference in their entirety.

BACKGROUND

In some examples, an embodiment of the present invention relates generally to a solid catholyte or electrolyte material having desired ion conductivity. More particularly, an embodiment of the present invention provides a method and structure for a catholyte material to improve a total ionic conductivity for a cathode to allow for higher mass loading of an active material, faster charge/discharge, and a wider range of operating temperature. Merely by way of example, the invention has been applied to solid state battery cells, although there can be other applications.

A high level of development has caused an explosion in electronic and communication apparatus. As an example, such apparatus include, among others, a personal computer, a video camera and a portable telephone, commonly termed a "smart phone." Examples of popular smart phones include the iPhone™ from Apple Inc. of Cupertino, Calif. or those phones using the Android™ operating system of Google Inc. in Mountain View, Calif. Other popular apparatus include electric or hybrid automobiles such as those from Tesla Motors Inc. in Fremont, Calif. or the Prius manufactured by Toyota Motor Corporation. Although highly successful, these popular apparatus are limited by storage capacity and in particular battery capacity. That is, a higher power and higher capacity battery for an electric automobile or a hybrid automobile would be an advance in the automobile industry. A lithium battery has been presently noticed from the viewpoint of a high energy density among various kinds of batteries.

Liquid electrolyte containing a flammable organic solvent has been used for conventional lithium batteries. Liquid electrolytes suffer from outgassing at high voltage and pose a threat of thermal runaway due to the enthalpy of combustion of the solvents. A lithium battery configured with a solid electrolyte layer (replacing the liquid electrolyte) has been described to improve the safety of the battery. A sulfide solid electrolyte material has been known as a solid electrolyte material used for a solid-state lithium battery. As an example, a solid electrolyte material is described in EP2555307 A1 published Feb. 6, 2013, and filed Mar. 25, 2011, which claims priority to Mar. 26, 2010, in the names of Ryoji Kanno and Masaaki Hirayama, assigned to Tokyo Institute of Technology and Toyota Jidosha Kabushiki Kaisha, which is hereby incorporated by reference.

State of the art solid state batteries are not ready for mass market adoption due to limited power density, mass loading, and manufacturability. Accordingly, techniques for improving a solid-state battery are highly desired.

SUMMARY OF INVENTION

According to an embodiment of the present invention, techniques related to a solid catholyte or electrolyte material having desired ion conductivity are provided. More particularly, an embodiment of the present invention provides a method and structure for a catholyte material to improve a total ionic conductivity for a cathode to allow for higher mass loading of an active material, faster charge/discharge, and a wider range of operating temperature. Merely by way of example, the invention has been applied to solid state battery cells, although there can be other applications.

In an example, an embodiment of the present invention provides an energy storage device comprising a cathode region or other element. The device has a major active region comprising a plurality of first active regions spatially disposed within the cathode region. The major active region expands or contracts from a first volume to a second volume during a period of a charge and discharge. The device has a catholyte material spatially confined within a spatial region of the cathode region and spatially disposed within spatial regions not occupied by the first active regions. In an example, the catholyte material comprises a lithium, germanium, phosphorous, and sulfur ("LGPS") containing material configured in a polycrystalline state. The device has an oxygen species configured within the LGPS containing material, the oxygen species having a ratio to the sulfur species of 1:2 and less to form a LGPSO material. The device has a protective material formed overlying exposed regions of the cathode material to substantially maintain the sulfur species within the catholyte material.

In an alternative example, an embodiment of the present invention provides an energy storage device comprising a cathode region or other element. The device has a major active region comprising a plurality of first active regions spatially disposed within the cathode region. The device has a catholyte material spatially confined within a spatial region of the cathode region and spatially disposed within spatial regions not occupied by the first active regions. In an example, the catholyte material comprises a lithium, germanium, phosphorous, and sulfur ("LGPS") containing material or a lithium, silicon phosphorous, and sulfur ("LSPS") containing material, each of which is configured in a polycrystalline or amorphous state or variations or combinations thereof. The device has an oxygen species configured within the LGPS or LSPS containing material. The oxygen species has a ratio to the sulfur species of 1:2 and less to form a LGPSO or LSPSO material. The device has a confinement material formed overlying exposed regions of the cathode active material to minimize reaction between the LGPS or LSPS containing material and the active material.

In an alternative example, an embodiment of the present invention provides an energy storage device comprising a cathode region or other element. The device includes a major active region comprising a plurality of first active regions spatially disposed within the cathode region, and a catholyte material spatially confined within a spatial region of the cathode region and spatially disposed within spatial regions not occupied by the first active regions. In an example, each of the plurality of active regions has a median diameter ranging from about 20 nm to about 3 μm. In another example, each of the plurality of active regions has a median diameter ranging from about 20 nm to about 8 μm.

In an example, the catholyte material comprises a lithium, germanium, phosphorous, and sulfur ("LGPS") containing material or a lithium, silicon phosphorous, and sulfur ("LSPS") containing material, each of which is configured in a polycrystalline or amorphous state. In an example, the device has a plurality of particles characterizing the catholyte material. In an example, each of the plurality of particles is interconnected to another via a necking arrangement. Each particle has a dimension characterized by a particle diameter to neck ratio dimension ranging from 1% to greater than 100%. In some examples, the plurality of particles is arranged to form a polycrystalline structure having a porosity of less than 30% of a total volume of the cathode region. In an example, each of the plurality of particles in the catholyte material is substantially homogeneous in a microscale while configured in the polycrystalline structure in a ten to one hundred micron scale. In an example, the cathode region comprises an active material, the active material comprising iron and fluorine. In an example, the catholyte material is selected from one of $Li_xSiP_yS_z$ or $Li_aGeP_bS_c$. In an example, the catholyte material is provided by annealing $Li_2S$, $P_2S_5$, and $GeS_2$ or $SiS_2$ at 550° C. for greater than about 4 hrs in stainless steel reactors sealed from the air, or other variations. In an example, the catholyte material is configured to substantially fill the cathode region comprising the major active region to form a substantially homogeneous thickness of material defining the cathode region. In an example, the catholyte material comprising a plurality of clusters, each of which has a median diameter ranging from about 10 nm to about 300 nm. In an example, the catholyte material comprising a plurality of shell structures around the cathode active regions. In an example, the catholyte material configured as a plurality of particles, each of the particles having a median diameter ranging from about 20 nm to about 300 nm. In an example, the catholyte material is substantially free from oxygen species.

In an example, the oxygen species ranges from less than 1 percent to 20 percent of the LGPSO or LSPSO material. In an example, the sulfur containing species ranges from about 25 to 60 percent of the LGPSO or LSPSO material. In an example, the device has an oxygen species configured within the LGPS or LSPS containing material. In an example, the oxygen species has a ratio to the sulfur species of 1:2 and less to form a LGPSO or LSPSO material.

The device has a confinement material formed overlying exposed regions of the cathode active material to minimize reaction between the LGPS or LSPS containing material and the active material. In an example, the confinement material is configured as a barrier material and/or the confinement material substantially preventing an interaction of the sulfur containing species with an element within the major active region. In an example, the confinement material is configured to selectively allow a lithium species to traverse through the confinement material. In an example, the major active region is greater than 50 percent by volume of the cathode region. The active region is desirably as great a fraction as possible of the cathode, possibly up to 70% or even 80%. In an example, the device has a second confinement material overlying each of the plurality of active regions.

In an example, the device has a polymer material configured within a vicinity of the catholyte material, the polymer material serving as a binder material. In an example, the polymer material is formed overlying the catholyte material. In an example, the polymer material serves as an electrolyte. In an example, the polymer material has an ionic conductivity serves as an electrolyte. In an example, the polymer material is configured to accommodate an internal stress within the cathode region during the change in volume from the expansion to a contraction.

In an example, an embodiment of the present invention provides an energy storage device comprising a catholyte material spatially confined within a spatial region of the energy storage device. The material includes a lithium, germanium, phosphorous, and sulfur ("LGPS") containing material or a lithium, silicon phosphorous, and sulfur ("LSPS") containing material, each of which is configured in a polycrystalline, nanocrystalline or amorphous state. The device has a room temperature ionic conductivity ranging from $10^{-5}$ to $5\times10^{-2}$ S/cm characterizing the LGPS or LSPS material and an electrical conductivity less than $10^{-5}$ S/cm characterizing the LGPS or LSPS material.

In an example, an embodiment of the present invention provides an energy storage device comprising a catholyte material spatially confined within a spatial region of the energy storage device. The material has a lithium, silicon, phosphorous, and sulfur ("LSPS") containing material. Each of which is configured in a polycrystalline or amorphous state. The device has a room temperature ionic conductivity ranging from $10^{-5}$ S/cm to $5\times10^{-2}$ S/cm characterizing the LSPS material, an electrical conductivity less than $10^{-5}$ S/cm characterizing the LSPS material, and an XRD 2Θ scan characterized by a primary peak at 33°±1°, 31°±1°, or 43°±1°.

In an example, an embodiment of the present invention provides an energy storage device comprising a cathode region or other region(s). The device has a major active region comprising a plurality of first active regions spatially disposed within the cathode region. The major active region expands or contracts from a first volume to a second volume during a period of a charge and discharge. The device has a catholyte material spatially confined within a spatial region of the cathode region and spatially disposed within spatial regions not occupied by the first active regions. In an example, the catholyte material comprises a lithium, germanium, phosphorous, and sulfur ("LGPS") containing material configured in a polycrystalline state. The catholyte material is characterized by an XRD as measured in counts per second characterized by a first major peak between about 41 to 45° 2theta (i.e., 2Θ) and a second major peak between about 30 to 35° 2theta and a third major peak between 51-54° 2-theta; whereupon the first major peak is higher in intensity than either the second major peak or the third major peak.

In an example, an embodiment of the present invention provides a method for manufacturing an energy storage device. The method includes forming a cathode region, the cathode region comprising a major active region comprising a plurality of first active regions spatially disposed within the cathode region. The major active region expands or contracts from a first volume to a second volume during a period of a charge and discharge; a catholyte material spatially confined within a spatial region of the cathode region and spatially disposed within spatial regions not occupied by the first active regions, the catholyte material comprising a lithium, germanium, phosphorous, and sulfur ("LGPS") containing material configured in a polycrystalline state.

In an example, an embodiment of the present invention provides a solid catholyte material or other material. The material includes at least a lithium element, a silicon element, a phosphorous element, a sulfur element, and an oxygen element. In an example, the catholyte is characterized by a major XRD peak located at a peak position of 2θ=30°±1° in an X-ray diffraction measurement using a CuKα line, or a peak of 2θ=33°±1° or a peak of 2θ=43°±1°.

In an alternative example, the invention provides a solid ion conducting material characterized by a formula $Li_aSiP_bS_cO_d$ where 2≤a≤8, 0.5≤b≤2.5, 4≤c≤12, d<3, wherein any impurities are less than 10 atomic percent. In an example, the solid ion conducting material comprising Li, Si, P, and S is characterized by primary Raman peaks at 418±10 cm$^{-1}$, 383±10 cm$^{-1}$, 286±10 cm$^{-1}$, and 1614±10 cm−1 when measured at room temperature with a Renishaw inVia Raman microscope system with a laser wavelength of 514 nm.

In some examples, an embodiment of the present invention achieves these benefits and others in the context of known process technology. However, a further understanding of the nature and advantages of an embodiment of the present invention may be realized by reference to the latter portions of the specification and attached drawings.

According to an embodiment of the present invention, techniques related to a solid catholyte material having desired ion conductivity are provided. In particular, an embodiment of the present invention provides a method and structure for a catholyte material to improve a total ionic conductivity for a cathode to allow for higher mass loading of an active material, faster charge/discharge, and a wider range of operating temperature. More particularly, an embodiment of the present invention provides a novel dopant configuration of the $Li_aMP_bS_c$ (LMPS) [M=Si, Ge, and, or, Sn] containing material. Merely by way of example, the invention has been applied to solid state battery cells, although there can be other applications. In some examples, M is selected from Si, Ge, Sn, or combinations thereof. In some other examples, M is selected from Si, Sn, or combinations thereof.

In an example, an embodiment of the present invention provides for a solid state catholyte material to enable a fully solid state battery with improved total ionic conductivity for a cathode, higher mass loading of active material (therefore higher energy density), faster charge/discharge, and a wider range of operating temperature. The solid state architecture eliminates the need for a flammable liquid electrolyte and therefore provides a safer alternative.

In an example, an embodiment of the present invention provides a dopant species configured within the LMPS containing material. In an example, the dopant species is characterized by increasing an ionic conductivity of the LMPS material from a first ion conductivity value to a second ionic conductivity value. Such dopant species may be provided in any one of the examples described below. In an example, an embodiment of the present invention provides an energy storage device comprising a cathode region or other element. The device has a major active region comprising a plurality of first active regions spatially disposed within the cathode region. The major active region expands or contracts from a first volume to a second volume during a period of a charge and discharge. The device has a catholyte material spatially confined within a spatial region of the cathode region and spatially disposed within spatial regions not occupied by the first active regions. In an example, the catholyte material comprises a lithium, germanium, phosphorous, and sulfur ("LGPS") containing material configured in a polycrystalline state. The device has an oxygen species configured within the LGPS containing material, the oxygen species having a ratio to the sulfur species of 1:2 and less to form a LGPSO material. The device has a protective material formed overlying exposed regions of the cathode material to substantially maintain the sulfur species within the catholyte material.

In an alternative example, an embodiment of the present invention provides an energy storage device comprising a cathode region or other element. The device has a major active region comprising a plurality of first active regions spatially disposed within the cathode region. The device has a catholyte material spatially confined within a spatial region of the cathode region and spatially disposed within spatial regions not occupied by the first active regions. In an example, the catholyte material comprises a lithium, germanium, phosphorous, and sulfur ("LGPS") containing material or a lithium, silicon, phosphorous, and sulfur ("LSPS") containing material, each of which is configured in a polycrystalline or amorphous state or variations. The material may have an oxygen species configured within the LGPS or LSPS containing material. The oxygen species has a ratio to the sulfur species of 1:2 and less to form a LGPSO or LSPSO material. The device has a confinement material formed overlying exposed regions of the cathode active material to minimize reaction between the LGPS or LSPS containing material and the active material.

In an alternative example, an embodiment of the present invention provides an energy storage device comprising a cathode region or other element. The device includes a major active region comprising a plurality of first active regions spatially disposed within the cathode region, and a catholyte material spatially confined within a spatial region of the cathode region and spatially disposed within spatial regions not occupied by the first active regions. In an example, each of the plurality of active regions has a size ranging from about 20 nm to about 3 µm.

In an example, the catholyte material comprises a lithium, germanium, phosphorous, and sulfur ("LGPS") containing material, or a lithium, silicon, phosphorous, and sulfur ("LSPS") containing material, or a lithium, tin, phosphorous, and sulfur ("LTPS") containing material. Each of the compounds may be configured in a polycrystalline or amorphous state. In an example, the device has a plurality of particles characterizing the catholyte material. In an example, each of the plurality of particles is interconnected to another via a necking arrangement. Each particle has a dimension characterized by a neck to particle diameter ratio dimension ranging from 1% to greater than 100% to form a polycrystalline structure having a porosity of less than 30% of a total volume of the cathode region. In an example, each of the plurality of particles in the catholyte material is substantially homogeneous, or can have variations. For example, the particles can have a diameter ranging from about 20 nm to about 1 micron. In an example, the cathode region comprises an active material, the active material comprising iron and fluorine. In an example, the cathode region comprises an active material, the active material comprising one or more of LiFePO$_4$, LiCoO$_2$, LiMn$_2$O$_4$, LiNi$_x$Mn$_{2-x}$O$_4$, Li(NiCoAl)O$_2$, or other conventional lithium battery cathode materials. In an example, the catholyte material is selected from one of $Li_xSiP_yS_z$ or $Li_aGeP_bS_c$. In an example, the catholyte material is provided by annealing Li$_2$S, P$_2$S$_5$, and GeS$_2$ or SiS$_2$ at 550° C. for greater than about 4 hrs in stainless steel reactors sealed from the air, or other variations. In an example, the catholyte material is configured to substantially fill the cathode region comprising the major active region to form a substantially homogeneous thickness of material defining the cathode region. In an example, the catholyte material comprising a plurality of clusters, each of which has a diameter ranging from about 10 nm to about 300 nm. In an example, the catholyte material comprising a plurality of shell structures around the cathode active regions. In an example, the catholyte material configured as a plurality of particles, each of the particles having a diameter ranging from about 20 nm to about 300 nm. In an example, the catholyte material is substantially free from oxygen species.

In an example, the oxygen species ranges from less than 1 percent to 20 percent of the LGPSO or LSPSO material. In an example, the sulfur containing species ranges from about 25 to 60 percent of the LGPSO or LSPSO material. In an example, the device has an oxygen species configured within the LGPS or LSPS containing material. In an example, the oxygen species has a ratio to the sulfur species of 1:2 and less to form a LGPSO or LSPSO material.

In an example, the LMPS material is doped with a combination of metal species on the M site. The composition range includes $Li_a(SiSn)P_bS_c$ ("LSTPS"), $Li_a(SiGe)P_bS_c$, $Li_a(GeSn)P_bS_c$, and $Li(SiGeSn)P_bS_c$, including variations in a ratio of Si to Sn, and other alternatives. The material may have an oxygen species configured within the LSTPS, LSGPS, LGTPS, or LSGTPS containing material to form LSTPSO, LSGPSO, LGTPSO, or LSGTPSO. The oxygen species has a ratio to the sulfur species of 1:2 and less.

In an example, the device has a confinement material formed overlying exposed regions of the cathode active material to minimize reaction between the LGPS or LSPS containing material and the active material. In an example, the confinement material is configured as a barrier material and/or the confinement material substantially preventing an interaction of the sulfur containing species with an element within the major active region. In an example, the confinement material is configured to selectively allow a lithium species to traverse through the confinement material. In an example, the major active region is greater than 50 percent by volume of the cathode region. The active region is desirably as great a fraction as possible of the cathode, possibly up to 70% or even 80%. In an example, the device has a second confinement material overlying each of the plurality of active regions.

In an example, an embodiment of the present invention achieves these benefits and others in the context of known process technology. However, a further understanding of the nature and advantages of an embodiment of the present invention may be realized by reference to the latter portions of the specification and attached drawings.

BRIEF DESCRIPTION OF THE DRAWINGS

FIG. 19 illustrates ionic conductivity at 60° C. of LGPS, LSPS, LSTPS, and LTPS according to examples of the present invention.

FIG. 20 illustrates an Arrhenius plot of ionic conductivity for activation energies are as follows: LGPS—0.21 eV. LSTPS—0.25 eV. LSPS—0.28 eV. LTPS—0.26 eV, in various examples according to the present invention.

FIG. 21 illustrates crystal structure from XRD spectra of LSTPS, LSPS, and LTPS according to examples according to the present invention.

FIGS. 22A, 22B, 22C, and 22D are examples of $^7Li$ NMR plots.

FIGS. 23A, 23B, 23C, and 23D are examples of $^{31}P$ NMR plots.

FIG. 24 illustrates a schematic of full cell with solid state catholyte in an example according to the present invention.

FIG. 25 is a SEM micrograph of cast film of solid state catholyte according to an example of the present invention.

DETAILED DESCRIPTION OF THE SPECIFIC EMBODIMENTS

Figure 1:
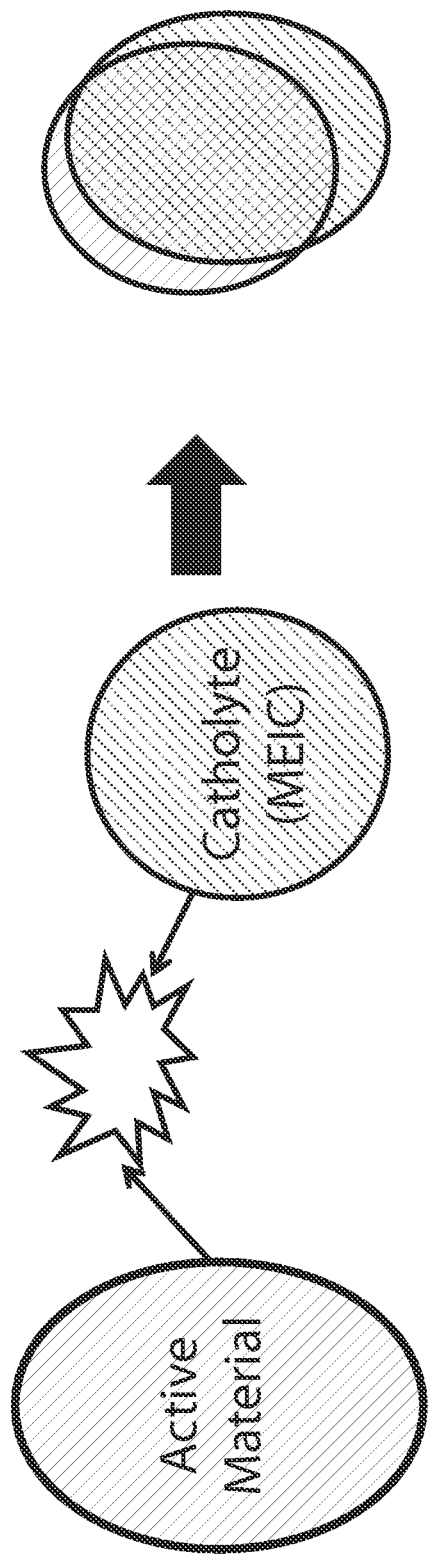
FIG. 1 is a simplified diagram illustrating mixing cathode active material with catholyte to improve overall ion conductivity according to an example of an embodiment of the present invention.

According to an embodiment of the present invention, techniques related to a solid catholyte or electrolyte material having desired ion conductivity are provided. More particularly, an embodiment of the present invention provides a method and structure for a catholyte material to improve a total ionic conductivity for a cathode to allow for higher mass loading of an active material, faster charge/discharge, and a wider range of operating temperature. Merely by way of example, the invention has been applied to solid state battery cells, although there can be other applications.

As background, poor ionic conductivity of the cathode in a battery imposes strong limitations to overall performance. By mixing the low ionic conductivity cathode active material with a high ionic conductivity ceramic catholyte, it is possible to improve the overall cathode conductivity. In this description, the ceramic catholyte is either LGPS or LSPS, which possesses Li ion conductivity greater than 1 e-3 S/cm at 60° C. An overall ion conductivity of the cathode (1 e-4 S/cm) can be achieved by adjusting the volume ratio of the active cathode material (ranging from about 30% to about 85%) to the catholyte. To improve electronic conductivity to match the ionic conductivity, carbon can be added as a third component or pre-coated onto the cathode active material.

In an example, the composition of the catholyte is $Li_aX$-$P_bS_c$, where X=Ge (for LGPS) or Si (for LSPS). LGPS and LSPS are synthesized using similar starting materials: $Li_2S$, $P_2S_5$, and $GeS_2$ or $SiS_2$. The synthetic approach includes ball milling of the precursors to create a homogenous mixture, followed by annealing at 550° C. in an air-tight vessel, and additional ball milling of the resultant product to achieve the desired particle size. Alternatively, the material can be made by evaporating the pre-annealed powder or co-evaporating $Li_2S$, $P_2S_5$, and $SiS_2/GeS_2$ powders. As a thin film, the compounds could also be used as electrolytes.

LSPS as described herein can be used as a thin film electrolyte. Means to deposit LSPS as a thin film are known to those skilled in the art. As an example, PVD methods such as PLD, sputtering, thermal, e-beam, and/or flash evaporation can be used. As a specific, non-limiting example of one deposition by thermal evaporation, the process is as follows:
1. Clean a smooth stainless steel substrate (430 alloy) with a kitchen sponge and simple green. Rinse in water. Rinse in acetone. Rinse in water. Microwave for two minutes submerged in water. 2. Load substrate into evaporator. 3. Prepare LSPS material as described above and press LSPS in the ratio of 5:1:1 $Li_2S:P_2S_5:SiS_2$ into pellets. Load pellets into evaporator crucible. Total mass of LSPS is 1.5 g. 4. Pump evaporator down to base pressure of ~1 e-5 torr. 5. Evaporate for 23 minutes with heater at ~1400 degrees C. while rotating substrate. 6. Purge evaporator twice with inert gas. 7. Evaporate inert metal, e.g. Pt or Au, as top contact.

In an example, a benefit of replacing Ge with Si is to address the high cost of Ge, among others. The price Ge is approximately 800 times of Si. The overall material cost of the catholyte drops by a factor of 10 if Ge is replaced with Si. Use of Si in place of Ge also appears to improve the stability of the material interface to Li. Further details of an embodiment of the present invention can be found throughout the present specification and more particularly below.

As used herein, the phrase "substantially free from oxygen species," refers to a material having less than 5% oxygen.

As used herein, the phrase "substantially prevent," refers to material wherein the catholyte or cathode active material do not react to form a separate phase that prevents a long cycle life, wherein a long cycle life is characterized by greater than 100 cycles. If the catholyte or cathode active material substantially react, e.g., more than 1% mass fraction of the active material reacts, to form a separate phase that is not useful for battery performance, the cycle life of the cathode or of the battery is shortened. As such, the battery cycle life is maintained at a long cycle life (>100 cycles) when the catholyte or cathode active material do not substantially react to form a detrimental separate phase.

As used herein, the phrase "substantially homogeneous thickness," refers to a material having a roughness of less than 1 micron.

As used herein, the phrase "substantially free from oxygen" refers to a material having less than 5% oxygen.

As used herein, the phrase "selectively allow a lithium species to traverse through the material," refers to material that allows lithium species to diffuse therethrough by at least 7 or 8 orders of magnitude more than another diffusion species. As used herein, "selectively allow" also refers to >C/3 rate capability for charge/discharge with lithium while providing for long (>100 cycles) cycle life.

Active material mass loading in a cathode determines the energy density of a battery. Increasing the accessible active material mass loading per surface area improves the overall system energy density by increasing the ratio of active material to inactive components including current collectors and separators. The active material mass loading is limited by the total ionic and electronic conductivity through the cathode. By including a high $Li^+$ ionic conductivity catholyte in the cathode, lithium access is improved throughout the entire cathode thickness and reduces voltage losses to overpotential. The use of ceramic material also may reduce/eliminate the formation of a solid electrolyte interface (SEI) and provide a wider voltage stability window.

FIG. 1 is a simplified diagram illustrating mixing cathode active material with catholyte (MEIC) to improve overall ion conductivity according to an example of the present invention. As shown, mixing occurs with active material, which can be any suitable active material with catholyte material, which can be $Li_aXP_bS_c$, where X=Ge (for LGPS) or Si (for LSPS), and combinations thereof, or the like. As shown, the catholyte material is coated or configured around or within a vicinity of the active material. As shown is a core shell structure, although there can be variations. The core-shell structure may be fabricated by solid-state synthesis such as co-milling or mechanofusion, liquid phase synthesis such as precipitation or heterogeneous reaction, or vapor phase synthesis such as CVD or evaporation. In an example, the present catholyte material has a high ion conductivity of $10^{-3}$ S/cm and greater.

Figure 2:
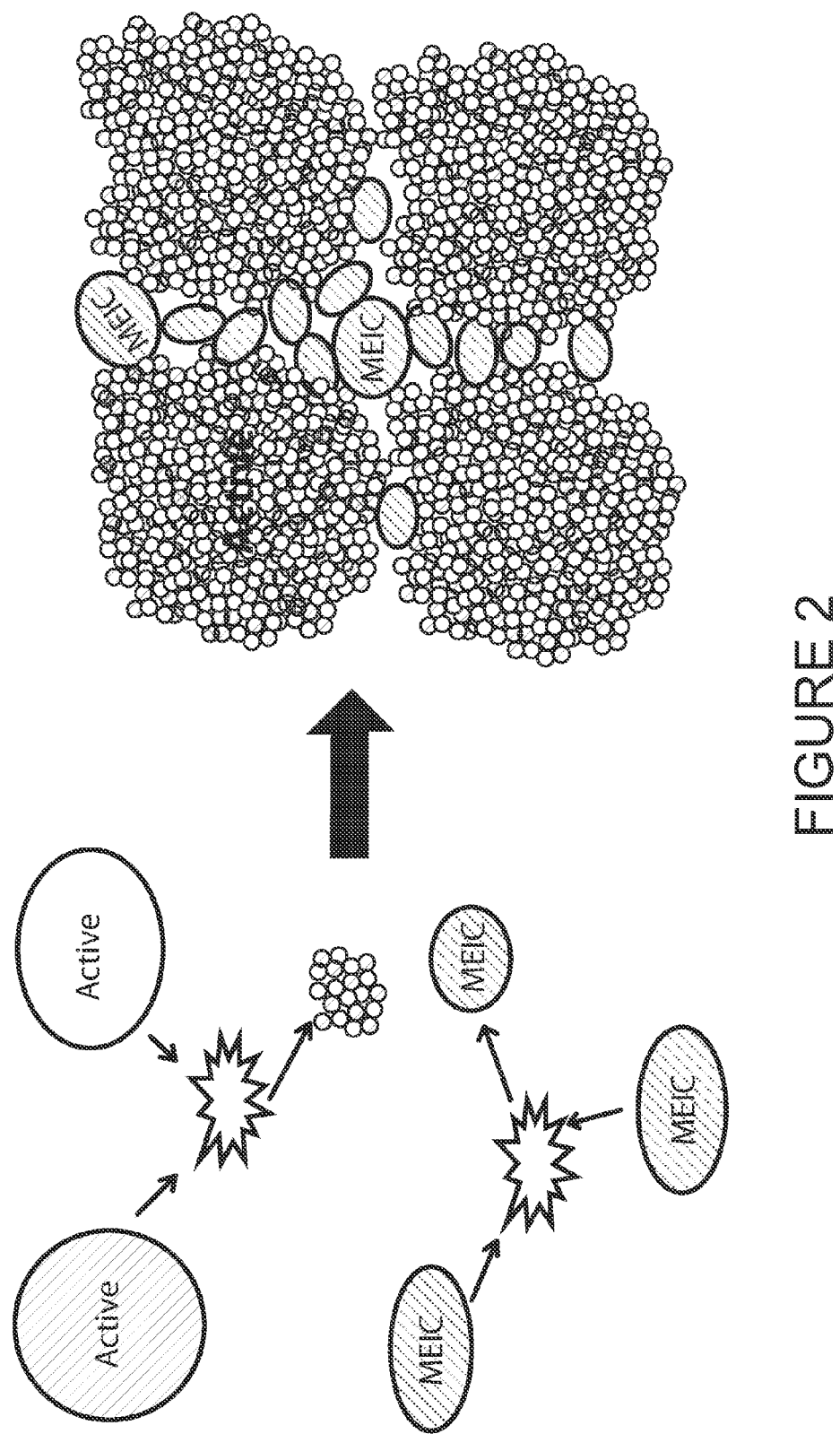
FIG. 2 is a simplified diagram illustrating mixing smaller particles of catholyte with active cathode material for enhancing ionic and electronic conductivity according to an example of the present invention.

FIG. 2 is a simplified diagram illustrating mixing smaller particles of MEIC with active cathode material in the ideal geometry for enhancing ionic and electronic conductivity according to an example of the present invention. As shown, smaller particles of MEIC are mixed with active cathode material to form a plurality of clusters representing intermixed active cathode material spatially disposed with the MEIC particles. In another example, the illustration shows engineered sized catholyte particles to improve and or to optimize ion conductivity to form a percolating network structure.

Figure 3:
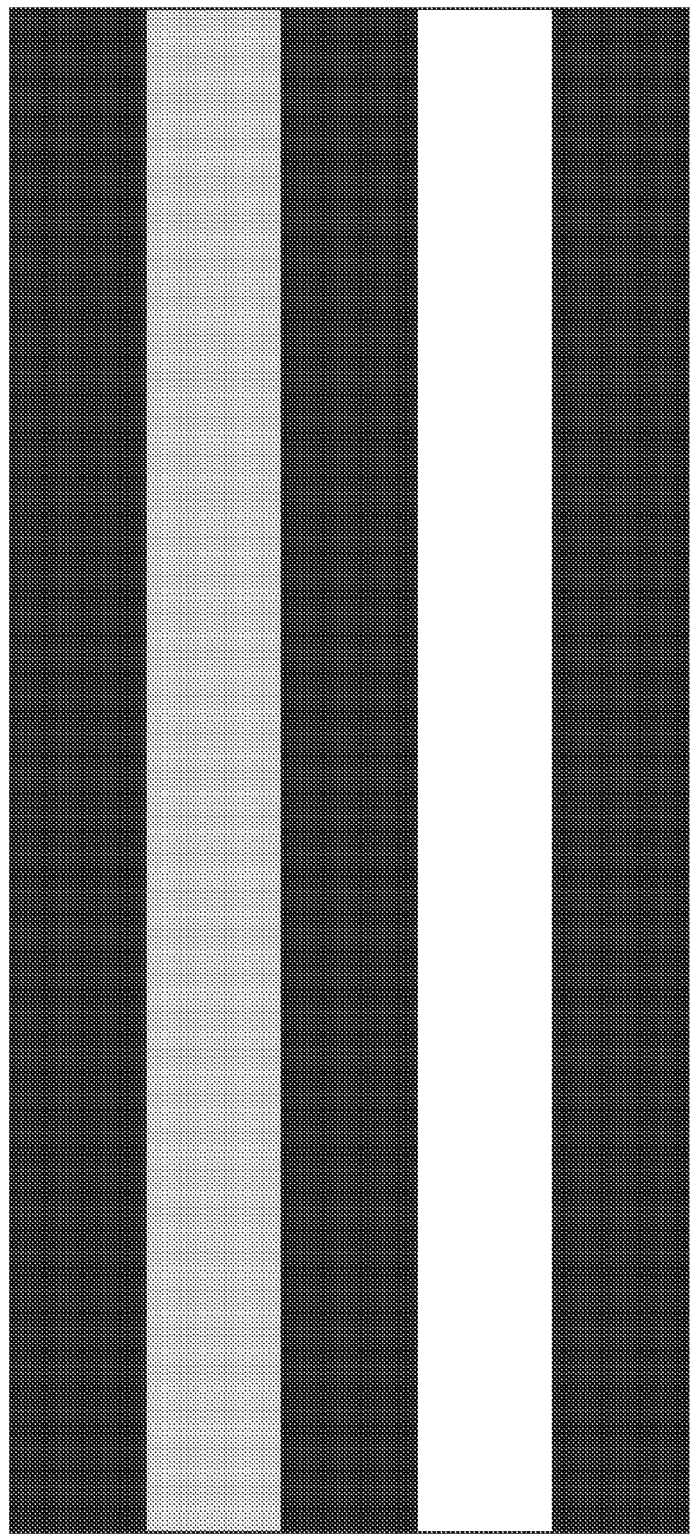
FIGS. 3 and 3A are a simplified diagram illustrating a cross-section of a battery device according to an example of the present invention.
Figure 3A:
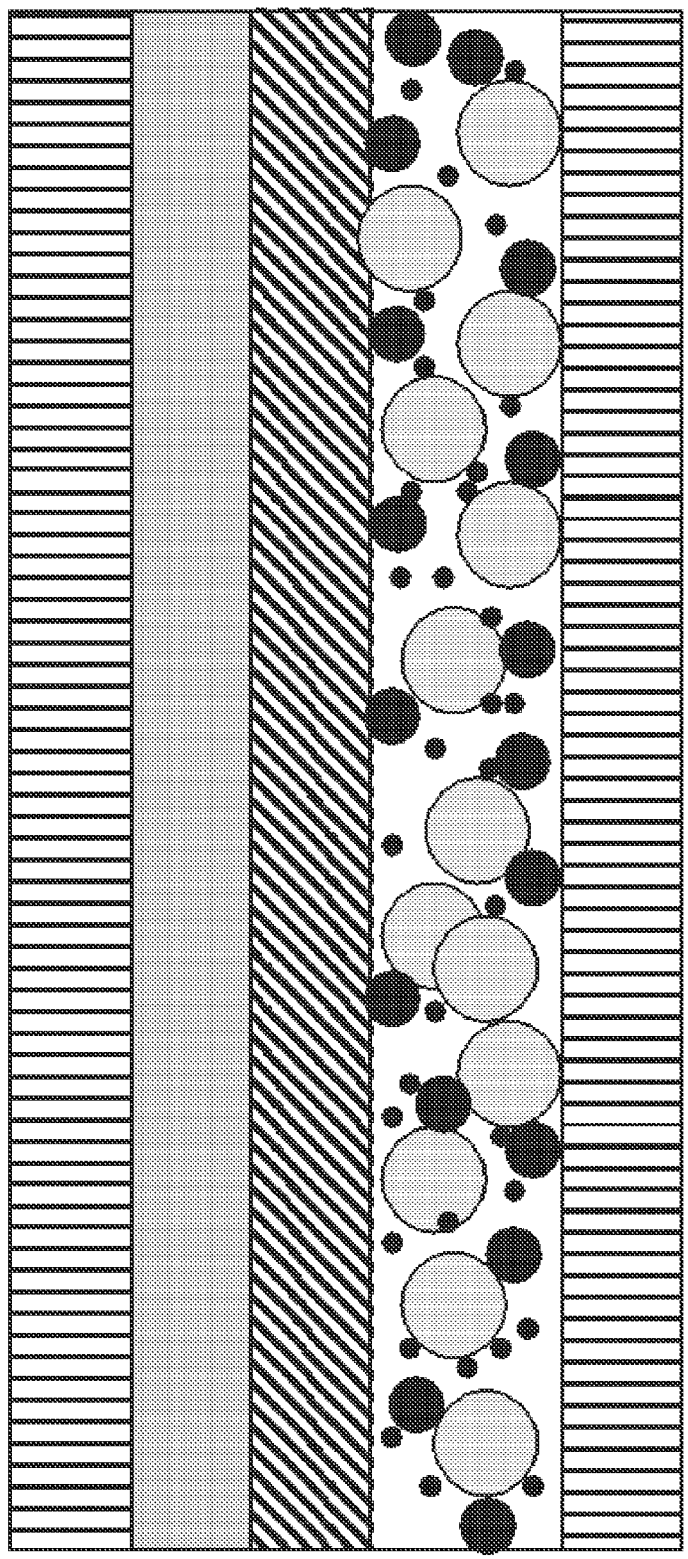

FIG. 3 is a simplified diagram illustrating a cross-section of a battery device according to an example of the present invention. As shown, the battery device comprises an anode region, a first current collector, an electrolyte, a second current collector, and a cathode region. Further details of battery device can be found throughout the present specification and more particularly below, and also in reference to FIG. 3A.

In an example, the anode region comprises a major active region comprising lithium. The anode region has a thickness ranging from about 0.1 µm to about 100 µm, but can include variations. In an embodiment, the anode region is created in situ by plating lithium from the cathode during the first charging cycle, among other techniques.

Each of the current collectors is a metal foil or a metal coating. Each current collector has a major surface region and preferably has a thickness ranging from 100 nm to 25 µm, although there may be variations. In an example, the negative current collector is a foil made of copper, nickel, nickel-coated copper, iron-coated copper, copper-coated aluminum, titanium, stainless steel, and coatings of these and other materials known not to alloy with lithium, and configured to the anode region. In another example, the positive current collector is aluminum foil or carbon-coated aluminum foil, though other materials stable at >3.5V vs Li (either intrinsically or via a self-passivating mechanism) can be used. The positive current collector is configured to the cathode region. In the case that one or both current collectors is a metal coating rather than a foil, it may be created with standard routes such as electroplating, electroless plating, PVD, metal nanoparticle sintering, and/or sol-gel with post-reduction. In this example, configured includes adhering or bonding the current collector to that which it is configured.

As shown, the battery device has an electrolyte. The electrolyte is, in some examples, a fast lithium ion conductor with a conductivity of greater than $10^{-5}$ S/cm. Examples of such materials include garnet, LiPON, antiperovskite, LISICON, thio-LISICON, sulfide, oxysulfide, polymer, composite polymer, ionic liquid, gel, or organic liquid. The electrolyte has a thickness ranging from about 0.1 µm to about 40 µm, but includes variations. In some examples, the electrolyte thickness is 25 µm, i.e., 25 microns. In some examples, the electrolyte thickness is 25 µm or less, i.e., 25 microns or less.

In an example, the cathode region comprises a major active region comprising a plurality of first active regions spatially disposed within the cathode region. The cathode region includes a catholyte material spatially confined within a spatial region of the cathode region. In an example, the material is spatially disposed within spatial regions not occupied by the active regions, the catholyte material comprising a lithium, germanium, phosphorous, and sulfur ("LGPS") containing material or a lithium, silicon, phosphorous, and sulfur ("LSPS") containing material, each of which is configured in a polycrystalline or amorphous state. The catholyte material has an ion conductivity greater than $10^{-4}$ S/cm and preferably greater than $10^{-3}$ S/cm. The catholyte material is configured to form a percolating network through the cathode. The catholyte material is therefore made with a particle size that is smaller than the active region particle size. For example, the median catholyte particle can be have a diameter three times or more smaller than the median active particle size. The particle size may be measured by techniques familiar to those skilled in the art such as a Horiba particle size analyzer. The catholyte material may alternately be configured in a core-shell structure as a coating around the cathode active material. In a further variation, the catholyte material may be configured as nanorods or nanowires. The cathode is then densified, for example in a calender press, to reduce porosity, thereby increasing the density of the cathode.

The cathode region also includes electronically conducting species such as carbon, activated carbon, carbon black, carbon fibers, carbon nanotubes, graphite, graphene, fullerenes, metal nanowires, super P, and other materials known in the art. The cathode region further comprises a binder material to improve the adhesion of the cathode to the substrate and the cohesion of the cathode to itself during cycling.

In an example, the catholyte material has an oxygen species configured within the LGPS or LSPS containing material. In an example, the oxygen species has a ratio to the sulfur species of 1:2 and less to form a LGPSO material or LSPSO material. In an example, the oxygen species is less than 20 percent of the LGPSO material. Of course, there can be variations which are embraced by other embodiments of the invention.

In an example, the catholyte material has a protective material overlying exposed regions of the cathode active material to minimize a reaction between the catholyte containing material and the active material. In an example, the protective material is configured as a barrier material. The barrier material may be $AlF_3$, LiF, $LiAlF_4$, $LiPO_4$, $Al_2O_3$, $TiO_2$, lithium titanate, lithium beta alumina, $LiNbO_3$, $LiCoO_2$, FeOF, $FeO_x$, or other materials stable in the cathode potential range. The barrier material substantially prevents a reaction between the active material and the catholyte material. The confinement material substantially prevents an interaction of the sulfur containing species with an element within the major active region. The major active region is preferably about 50 percent or more of the cathode region; and the catholyte material is preferably about 30 percent or less of the cathode region. In an example, the protective material is configured to selectively allow a lithium species to traverse through the protective material. As an example, the protective material may comprise a plurality of spatial openings to allow the lithium species to traverse through the protective material. Each of the openings has a size ranging from about 1 $nm^2$ to about 100 $nm^2$. As another example, the protective material may comprise a lithium conductive material.

Optionally, the device has a second protective material overlying each of the plurality of active regions. The second protective material is similar in characteristic as the first confinement material. In a variation, the protective material may be configured around the active material or around the ion conductive material. Alternatively, the device can include multiple confinement materials, among other variations.

In an example, the catholyte comprises $Li_aXP_bS_cO_d$ where X=Ge or Si, $2 \leq a \leq 6$, $0.5 \leq b < 2.5$, $4 \leq c \leq 10$, and $d \leq 3$ or other variations. Further details of the LSPS material characterization can be found throughout the present specification and more particularly below. See, for example, the XPS, XRD, Raman, set forth herein.

In another example, the LSPS or LGPS material is characterized by $Li_aSiP_bS_cO_d$ or $Li_aGeP_bS_cO_d$ where $2 \leq a \leq 8$, $0.5 \leq b \leq 2.5$, $4 \leq c \leq 12$, $d < 3.4$ In yet another example, the LSPS or LGPS material is characterized by a catholyte selected from either $Li_aSiP_bS_c$ or $Li_aGeP_bS_c$; wherein $2 \leq a \leq 10$, $0.5 \leq b \leq 2.5$, $4 \leq c \leq 12$, $d < 3$.

In an example, the catholyte material is configured to substantially fill the cathode region comprising the major active region to form a substantially homogeneous thickness of material defining the cathode region. In an example, the catholyte material comprises a plurality of clusters, each of which is separable. Alternatively, the catholyte material comprises a plurality of shell structures around the active material particles. In other embodiments, the catholyte material is configured as a plurality of particles.

In an example, the catholyte material is characterized as a solid. That is, the material has a substantially fixed compound structure, which behaves like a solid rather than a fluid. In an example, the solid catholyte material is fabricated by physical vapor deposition (PVD), chemical vapor deposition (CVD), atomic layer deposition (ALD), and solid state reaction of powders, mechanical milling of powders, solution synthesis, evaporation, or any combination thereof. In an example, the catholyte material is mixed with the active material in a mixer or mill or with different configurations of physical vapor deposition, optionally mixed with carbon, and coated onto a substrate by gravure, comma coating, meyer rod coating, doctor blading, slot die coating, or with a conventional technique. In an example, the catholyte material is coated directly on the active material with a vapor phase growth, mechanofusion, liquid phase growth, deposition on particles in a fluidized bed or rotary reactor, or combinations thereof, or the like. Of course, there are various alternatives, modifications, and variations.

In an alternative example, the device further comprises a polymer material configured within a vicinity of the catholyte material, the polymer material comprising a lithium species. The polymer material is formed overlying the catholyte material, the polymer material comprising a lithium material. The polymer material configured to accommodate an internal stress within the cathode region during the change in volume from the expansion to a contraction. An example of the polymer material includes polyacrylonitrile, poly-ethylene oxide, PvDF, PvDF-HFP, rubbers like butadiene rubber and styrene butadiene rubber, among others.

In an example, the silicon material has a purity of 98 to 99.9999%, the lithium has a purity of 98 to 99.9999%, phosphorous has a purity of 98 to 99.9999%, and the sulfur has a purity of about 98 to 99.9999%, although there can be variations.

Figure 4:
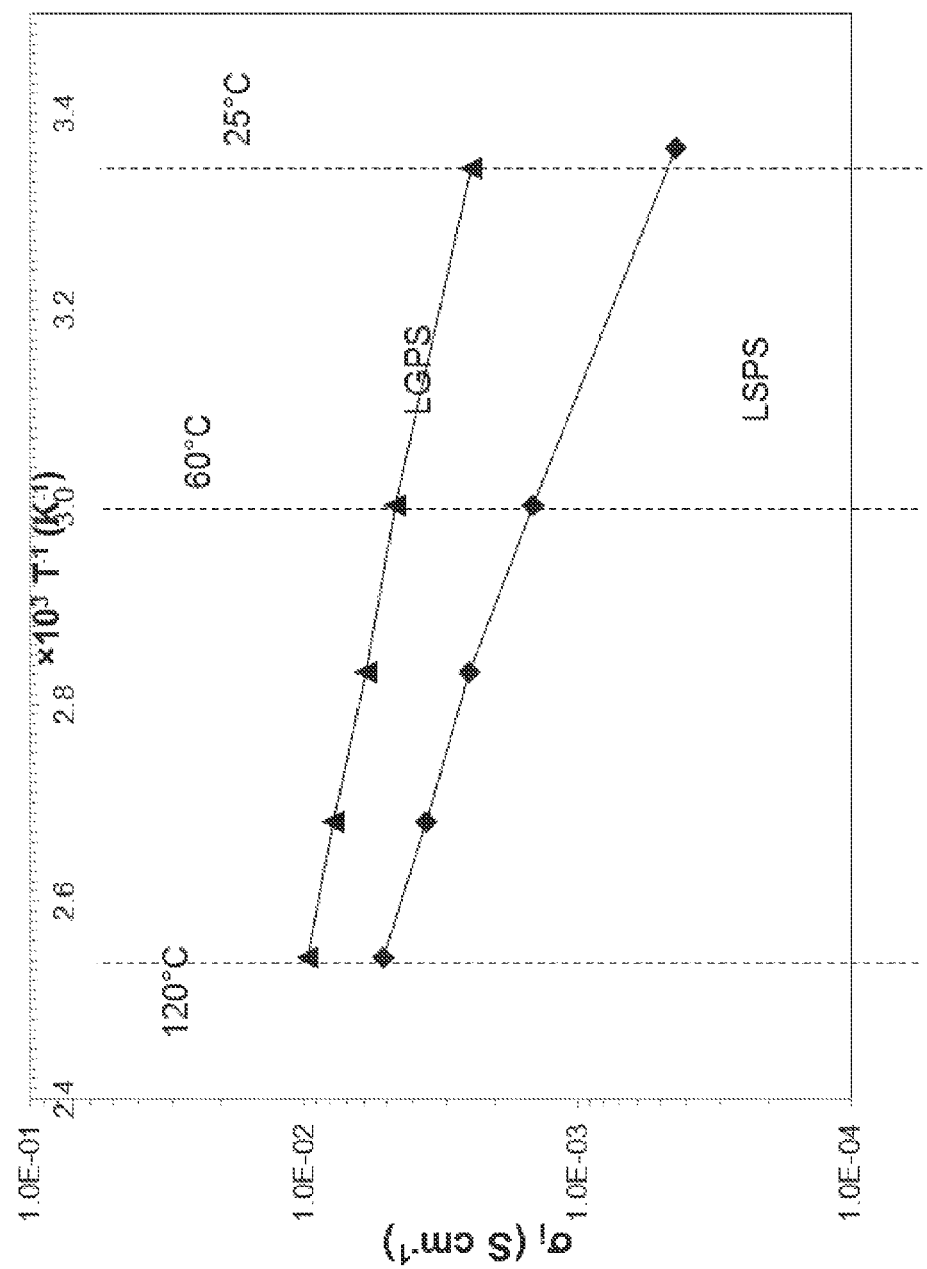
FIG. 4 is a simplified diagram illustrating LSPS ionic and electronic conductivity Arrhenius plot according to an example of the present invention.

FIG. 4 is a simplified diagram illustrating LSPS ionic conductivity Arrhenius plot according to an example of the present invention. As shown, conductivity is plotted against 1/T. Conductivity is plotted in an Arrhenius plot. As an example, a conventional solid catholyte material is below $10^{-4}$ S/cm for ionic conductivity, which is well below the present materials and techniques. Arrhenius plot of the ionic conductivity of $Li_aGeP_bS_c$ and $Li_xSiP_yS_z$ pressed pellets measured by electrochemical impedance spectroscopy with indium blocking electrodes. Pellets were made by mixing 5:1:1 ratios of $Li_2S:P_2S_5:GeS_2$ for $Li_aGeP_bS_c$ and $Li_2S:P_2S_5:SiS_2$ for $Li_xSiP_yS_z$ by high energy milling in a zirconia jar with zirconia media, followed by annealing at 550° C. for 8 hrs in stainless steel VCR Swagelok reactors. Pellets were made from the powders by pressing at 5 MPa. LXPS materials may also be synthesized by annealing in a quartz or silica reactor. LXPS may be synthesized from starting precursors that include the elemental compounds (Li and/or and/or Si and/or P and/or Sn and/or Ge and/or S) alone or in combination with the compounds ($Li_2S$, $SiS_2$, $SnS_2$, $P_2S_5$, $GeS_2$).

Figure 5:
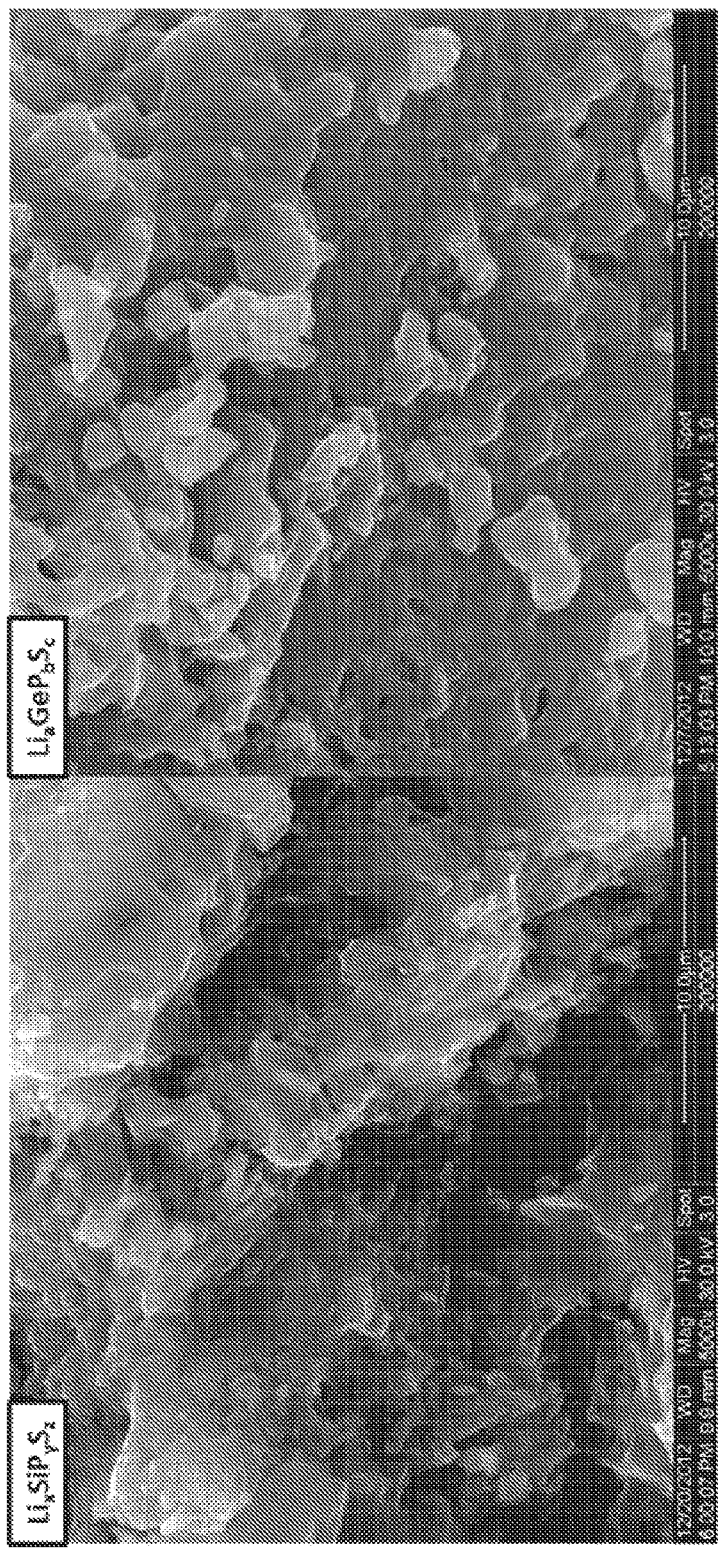
FIG. 5 shows SEM of LSPS, LGPS, illustrating a necking behavior and forming connecting networks according to an example of the present invention.

FIG. 5 shows LSPS and LGPS, SEM including a necking behavior indicated a good chance of forming connecting networks according to an example of the present invention. As shown, LGPS has features at a ten-nanometer scale, LGPS has features at a 100-nanometer scale. As shown, the material is configured with a plurality of particles each of which is interconnected to each other via a necking arrangement, rather than a single point or a "billiard ball" contact, which would limit conductivity between particles. In an example, the particle-to-neck ratio dimension can be 1% or greater to 100% to form a polycrystalline structure having a porosity of less than 30% of the total volume of the material. In an example, the material is substantially homogeneous in a micro-scale while configured in the polycrystalline structure in a ten to one hundred micron scale. In an example, the material with active material, such as $LiCoO_2$ for example, or other variations. As shown illustrate morphology of $Li_xSiP_yS_z$ and $La_aGeP_bS_c$ pressed pellets. Grain sizes of these synthesized materials are 1-10 µm (synthesized by annealing $Li_2S$, $P_2S_5$, $GeS_2$ or $SiS_2$ at 550° C. for 8 hrs in stainless steel VCR Swagelok reactors). Of course, there can be variations.

Figure 6:
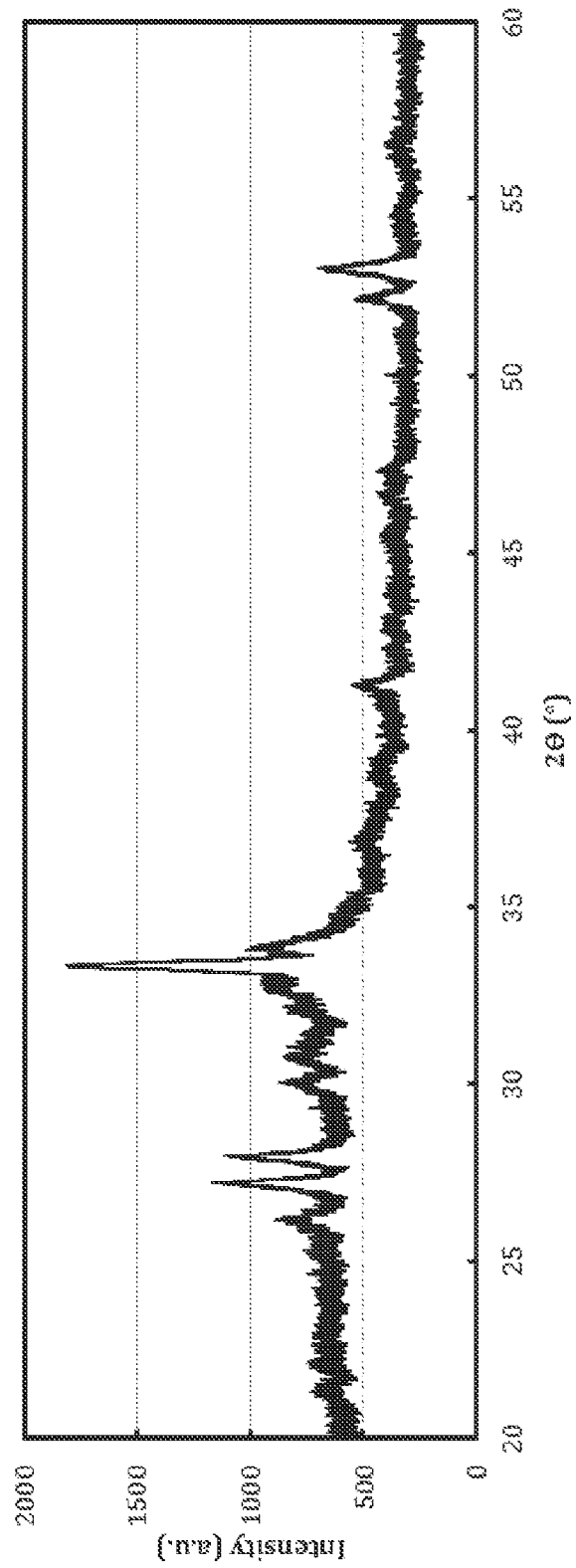
FIG. 6 shows LSPS XRD scan in air and peak location derived from material that is crystalline from the annealing process according to an example of the present invention.

FIG. 6 shows LSPS XRD scan in air derived from material that is crystalline from the annealing process according to an example of the present invention. As shown is the peak position, intensity, and FWHM data below. As shown is XRD 2θ scan of $Li_{4.4}SiP_{1.2}S_{6.3}O_{1.5}$ pellet. The $Li_{4.4}SiP_{1.2}S_{6.3}O_{1.5}$ powder is synthesized by high energy ball milling 5:1:1 mixture of $Li_2S$, $P_2S_5$, and $SiS_2$ in a $ZrO_2$ jar with $ZrO_2$ media, followed by annealing at 550° C. for 8 hrs in stainless steel VCR Swagelok reactors. Pellets were made from the powders by pressing at 15 MPa.

| 2-theta (°) | d (Å) | Normalized intensity | FWHM (°) |
|---|---|---|---|
| 26.1722 | 3.40207 | 0.16 | 0.5674 |
| 27.184 | 3.27771 | 0.45 | 0.2801 |
| 27.9566 | 3.18885 | 0.41 | 0.2701 |
| 30.9299 | 2.88874 | 0.12 | 1.5391 |
| 33.3519 | 2.6843 | 1.00 | 0.2044 |
| 33.8262 | 2.64773 | 0.34 | 2.0815 |
| 41.3252 | 2.18294 | 0.12 | 0.3451 |
| 52.1143 | 1.75356 | 0.21 | 0.2782 |
| 52.9999 | 1.72632 | 0.38 | 0.2964 |
| 54.6355 | 1.67845 | 0.04 | 0.8441 |
| 56.4607 | 1.62844 | 0.05 | 0.5958 |

Figure 7:
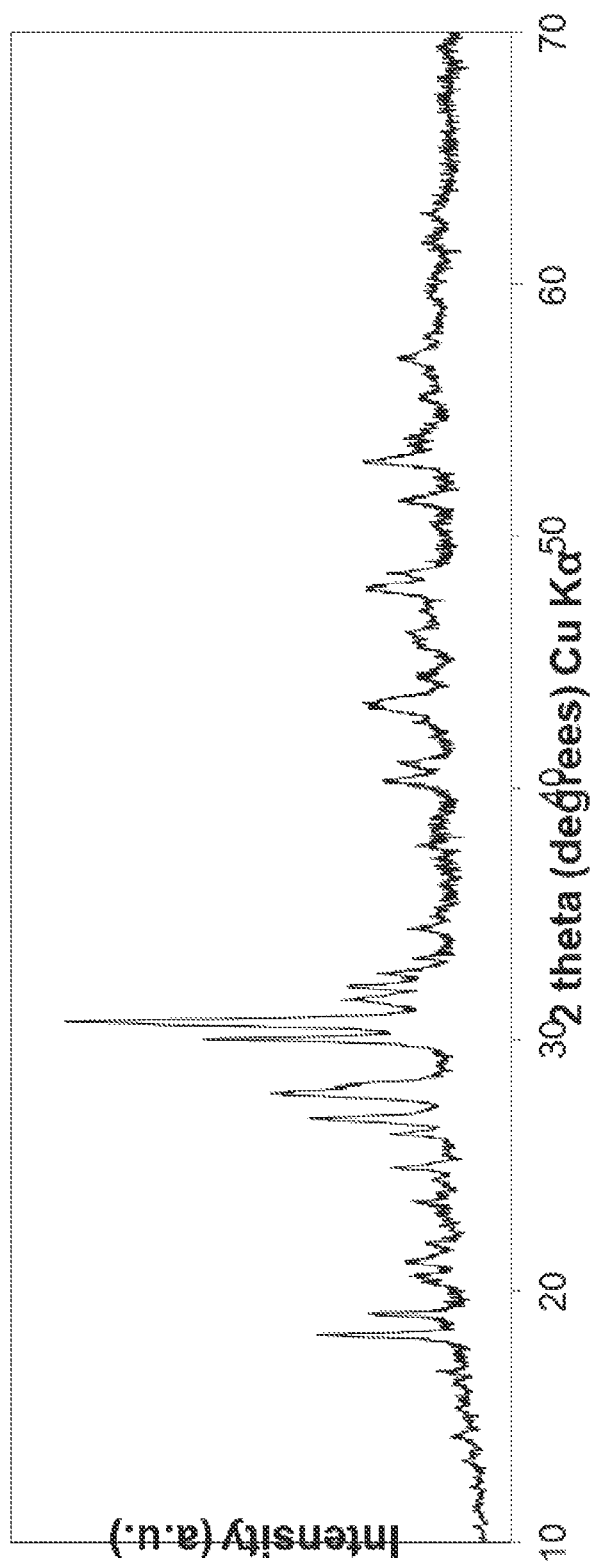
FIG. 7 shows an XRD pattern & peak positions of LSPS taken in an argon environment according to an example of the present invention.

FIG. 7 shows an XRD pattern and peak positions of LSPS taken in an argon environment according to an example of the present invention. As shown below are angle and height data from the XRD pattern. As shown, the LSPS material is configured having a XRD pattern having a major peak along a 2-theta direction and height provided in the table below and FIG. 7 showing an X-ray diffraction of a $Li_{5.6}SiP_{1.5}S_{6.8}O_{1.0}$ pressed pellet. The $Li_{5.6}SiP_{1.5}S_{6.8}O_{1.0}$ powder is synthesized by high energy ball milling 5:1:1 mixtures of $Li_2S$, $P_2S_5$, and $SiS_2$ in a $ZrO_2$ jar with $ZrO_2$ media, followed by annealing at 550° C. for 8 hrs in stainless steel VCR Swagelok reactors. Pellets were made from the powders by pressing at 5 MPa.

| 2-theta (°) | Normalized intensity |
|---|---|
| 18.4 | 0.29 |
| 19.1 | 0.29 |
| 26.3 | 0.32 |
| 27.1 | 0.39 |
| 27.9 | 0.39 |
| 30.1 | 0.42 |
| 30.9 | 0.55 |
| 33.4 | 0.43 |
| 43.8 | 1.00 |
| 50.4 | 0.41 |
| 53.1 | 0.44 |

Figure 8:
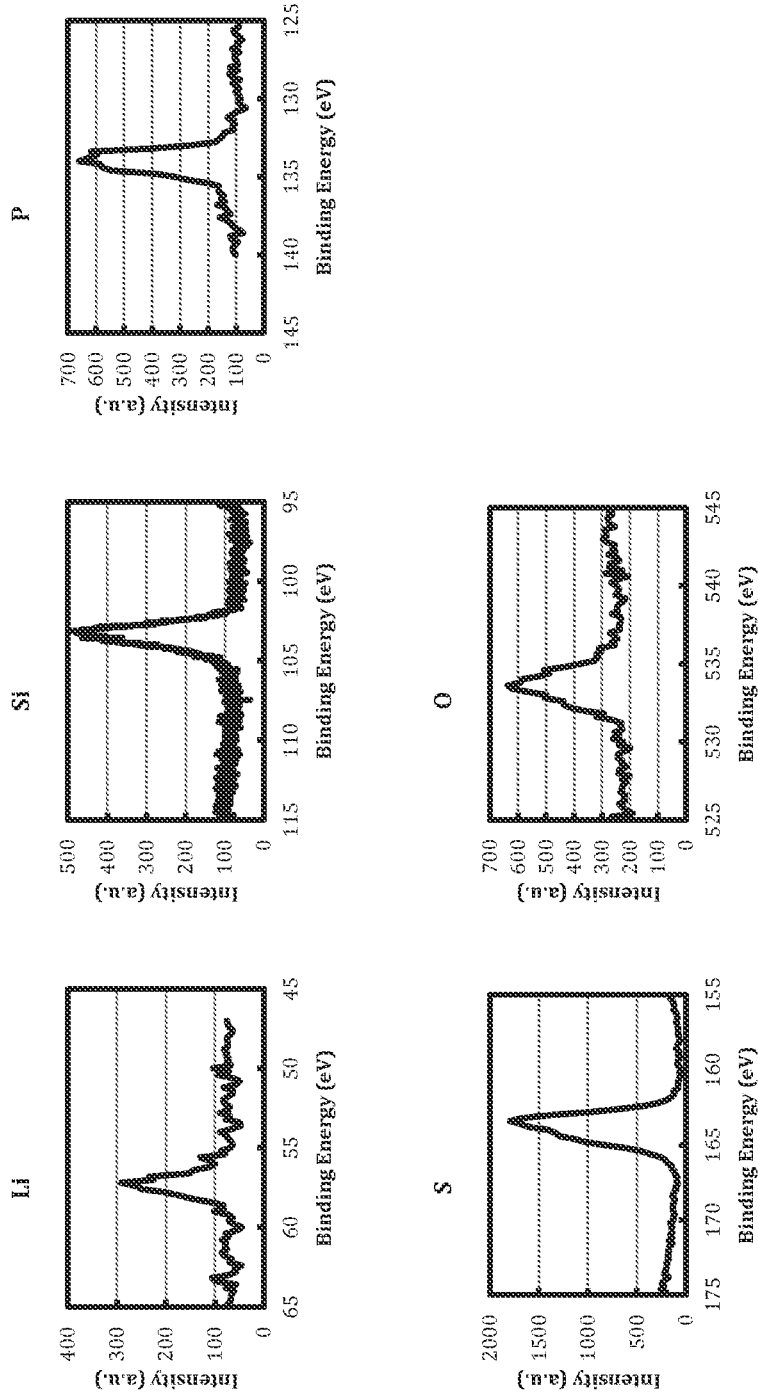
FIG. 8 shows an LSPS XPS scan and stoichiometry including LSPS specific peak shifts according to an example of the present invention.

FIG. 8 shows an LSPS XPS scan and stoichiometry including LSPS specific peak shifts according to an example of the present invention. As shown are peaks associated with lithium, silicon, phosphorous, sulfur, and oxygen to characterize the material. Peak locations are at approximately 58 eV, 104 eV, 134 eV, 164 eV, and 533 eV respectively when calibrated versus a carbon is peak at 284 eV. As shown is XPS of $Li_{4.4}SiP_{1.2}S_{6.3}O_{1.5}$ pellet. The $L_{4.4}SiP_{1.2}S_{6.3}O_{1.5}$ powder is synthesized by high energy ball milling 5:1:1 mixture of $Li_2S$, $P_2S_5$, and $SiS_2$ in a $ZrO_2$ jar with $ZrO_2$ media, followed by annealing at 550° C. for 8 hrs in stainless steel VCR Swagelok reactors. Pellets were made from the powders by pressing at 15 MPa.

Figure 9:
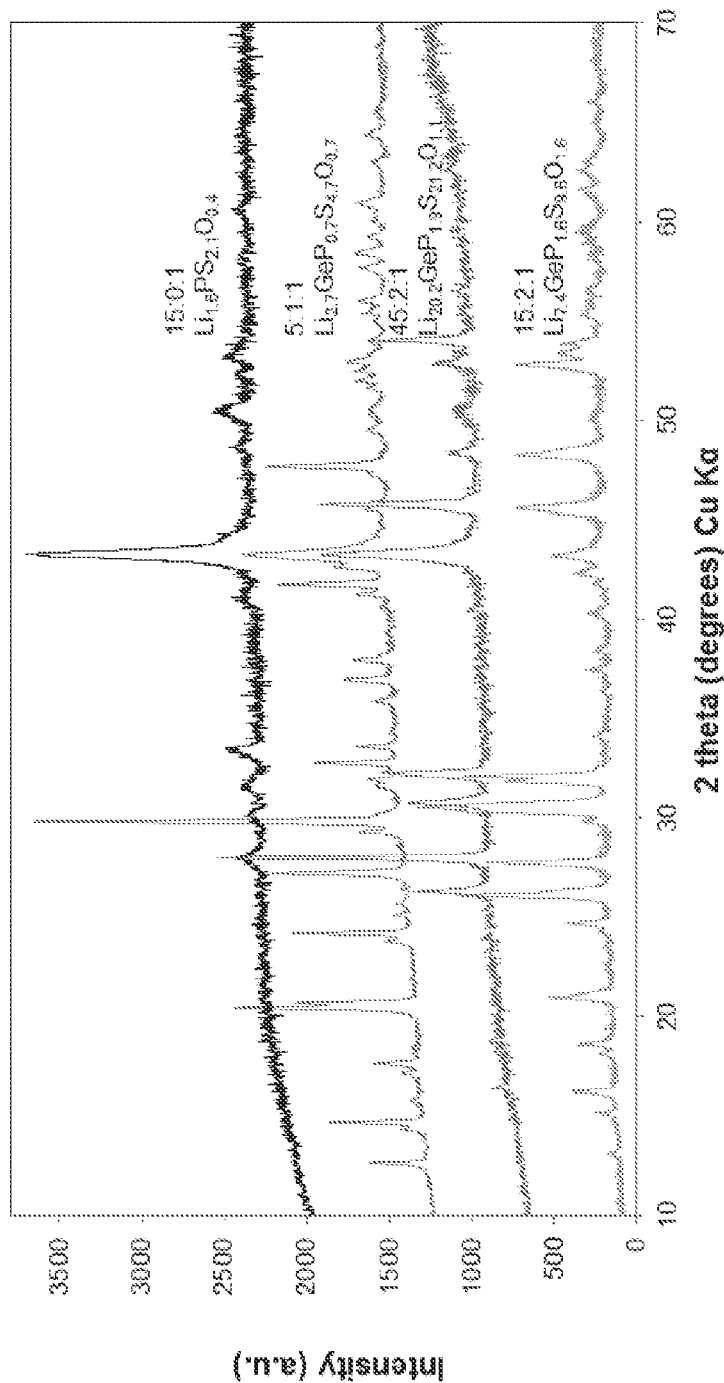
FIG. 9 shows XRD patterns and peaks of several LGPS powders taken in an argon atmosphere according to an example of the present invention.

FIG. 9 shows XRD patterns and peaks of several L(G)PS powders taken in an argon atmosphere according to an example of the present invention. As shown, ratios refer to the proportion of $Li_2S$ to $P_2S_5$ to $GeS_2$ initially mixed to form the final compound. Actual compositions are $Li_{2.85}GeP_{0.68}S_5O_{0.5}$ and $Li_{2.2}GeP_{0.75}S_5O_{0.2}$. Of course, there can be variations. As shown are four different compositions in the Figure. Compensations in the ratios 5:1:1, 45:2:1, 15:2:1 are show below.

| 5:1:1 Li2S:P2S5:GeS2 | | 45:2:1 Li2S:P2S5:GeS2 | | 15:2:1 Li2S:P2S5:GeS2 | |
|---|---|---|---|---|---|
| 2θ | Normalized intensity | 2θ | Normalized intensity | 2θ | Normalized intensity |
| 12.6 | 0.44 | 16.3 | 0.43 | 12.88 | 0.10 |
| 14.28 | 0.38 | | | 15.08 | 0.16 |
| 15.42 | 0.36 | 28.2 | 0.70 | 16.12 | 0.26 |
| 17.06 | 0.38 | 30.7 | 0.73 | 17.87 | 0.14 |
| 17.62 | 0.43 | 32.24 | 0.79 | 18.59 | 0.28 |
| 20.42 | 0.65 | 43.2 | 1.00 | 26.18 | 0.87 |
| 23.7 | 0.40 | 45.8 | 0.99 | 27.3 | 0.70 |
| 24.22 | 0.57 | 48.24 | 0.57 | 30.68 | 1.00 |
| 25.06 | 0.39 | 52.8 | 0.66 | 31.8 | 0.62 |
| 25.5 | 0.39 | 53.96 | 0.80 | 31.88 | 0.80 |
| 26.9 | 0.62 | | | 33.7 | 0.17 |
| 29.24 | 0.45 | | | 38 | 0.17 |
| 29.82 | 1.00 | | | 40 | 0.19 |
| 31.48 | 0.42 | | | 42 | 0.26 |
| 32.74 | 0.53 | | | 43 | 0.38 |
| 33.56 | 0.46 | | | 45.5 | 0.56 |
| 35.8 | 0.43 | | | 48.2 | 0.55 |
| 36.9 | 0.47 | | | 52.7 | 0.53 |
| 37.9 | 0.46 | | | 52.98 | 0.37 |
| 41.72 | 0.58 | | | 53.5 | 0.34 |
| 43.2 | 0.65 | | | 59 | 0.23 |
| 47.66 | 0.62 | | | | |
| 51.9 | 0.45 | | | | |
| 52.4 | 0.46 | | | | |
| 52.88 | 0.47 | | | | |
| 54 | 0.43 | | | | |
| 55.34 | 0.44 | | | | |
| 55.94 | 0.45 | | | | |
| 57.52 | 0.44 | | | | |
| 58.34 | 0.46 | | | | |
| 59.1 | 0.44 | | | | |
| 60.8 | 0.45 | | | | |
| 64.28 | 0.44 | | | | |

Figure 10:
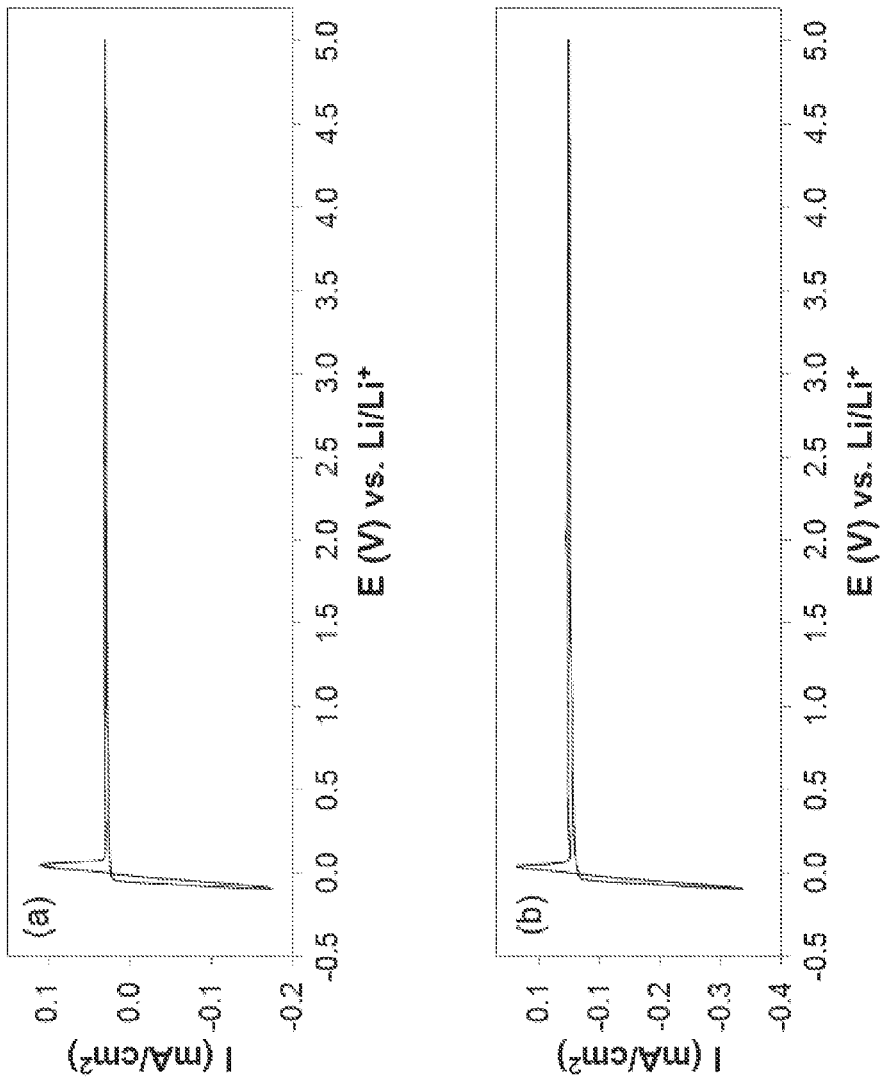
FIG. 10 shows a cyclic voltammogram of LGPS using a lithium reference/counter electrode and stainless steel working electrode according to an example of the present invention.

FIG. 10 is a plot of cyclic voltammogram of LGPS using a lithium reference/counter electrode and stainless steel working electrode. Li plating and stripping is observed at 0 V vs. Li/Li$^+$, and the lack of features up to 5 V indicates excellent electrochemical stability. The measurement is provided to indicate electrochemical stability, as indicated by the substantially straight line without peaks or imperfections. The straight line originates in an ion conductor from a plating current to form both positive and negative current as the voltage varies from negative to positive. As shown, no significant current is observed in the positive voltage region on the voltage curve, which indicates electrochemical stability: (a) Cyclic voltammogram of $Li_{7.4}GeP_{1.6}S_{9.6}O_{1.6}$ pressed pellet using a lithium reference/counter electrode and stainless steel working electrode. (b) Cyclic voltammogram of $Li_{5.6}SiP_{1.5}S_{6.8}O_{1.0}$ pressed pellet using a lithium reference/counter electrode and Nickel foil working electrode. In both cases, clear Li plating and stripping occurs at 0 V vs. Li/Li$^+$.

Figure 11:
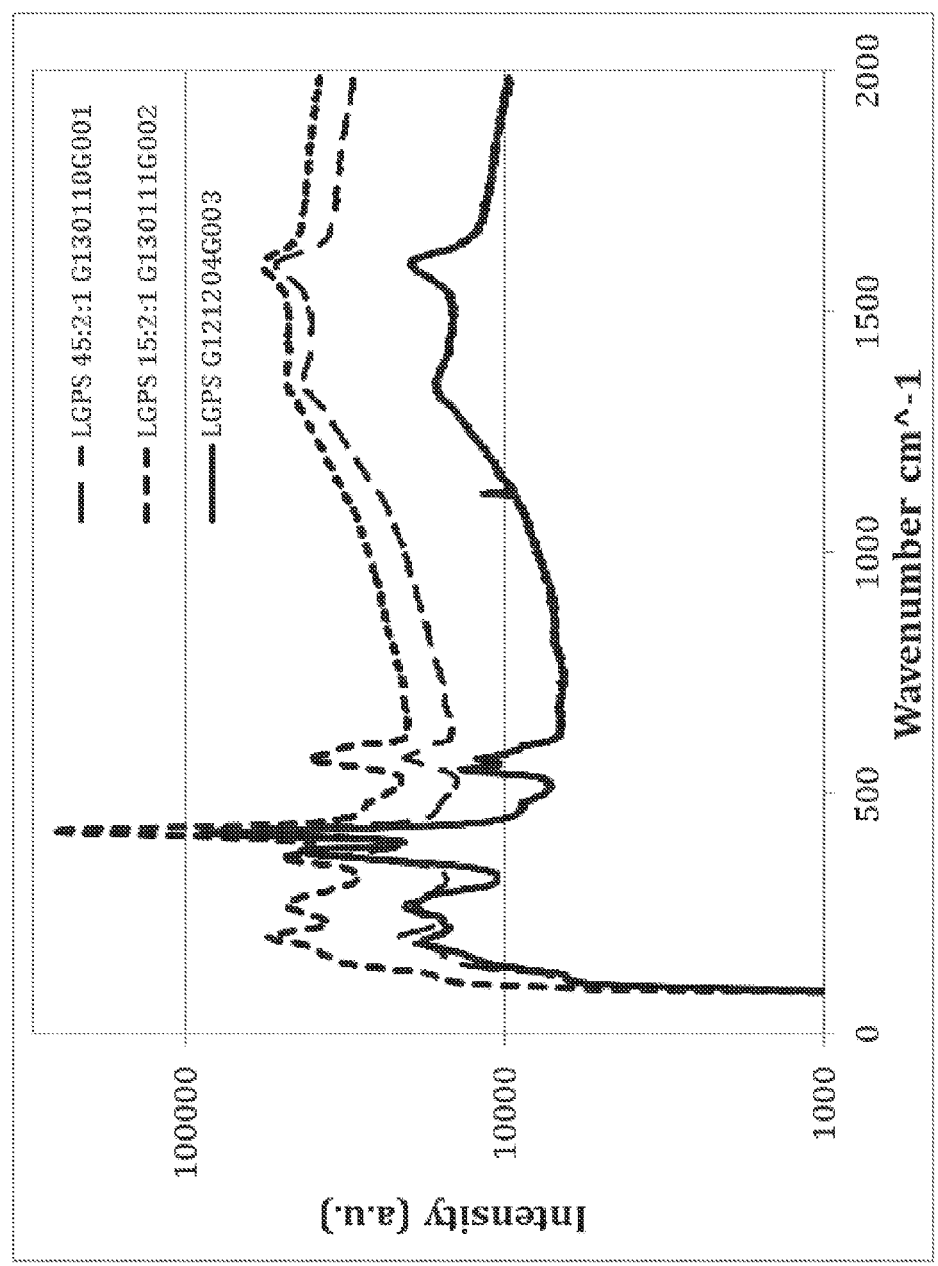
FIG. 11 shows an illustration of Raman spectroscopy signatures of several LGPS samples according to an example of the present invention.

FIG. 11 is an illustration of Raman spectroscopy signatures of several LGPS samples. As shown, the Raman signature indicates LGPS material configuration. As shown is Raman spectroscopy of various $Li_aGeP_bS_c$ pressed pellets.

| Wavenumber (cm$^{-1}$) | Normalized Intensity |
|---|---|
| 202 | 0.22 |
| 286 | 0.22 |
| 383 | 0.53 |
| 418 | 1.00 |
| 551 | 0.17 |
| 575 | 0.15 |
| 600 | 0.10 |
| 1366 | 0.20 |
| 1614 | 0.23 |

The Table shows Raman peaks from LGPS 15:2:1 (the ratios refer to the relative amounts of $Li_2S:P_2S_5:GeS_2$ precursors used in the synthesis). Note that Raman peaks shift slightly with the laser wavelength. Of course, there can be other techniques to characterize the subject material. However, the Raman signature for these pellets is similar from sample to sample.

Figure 12:
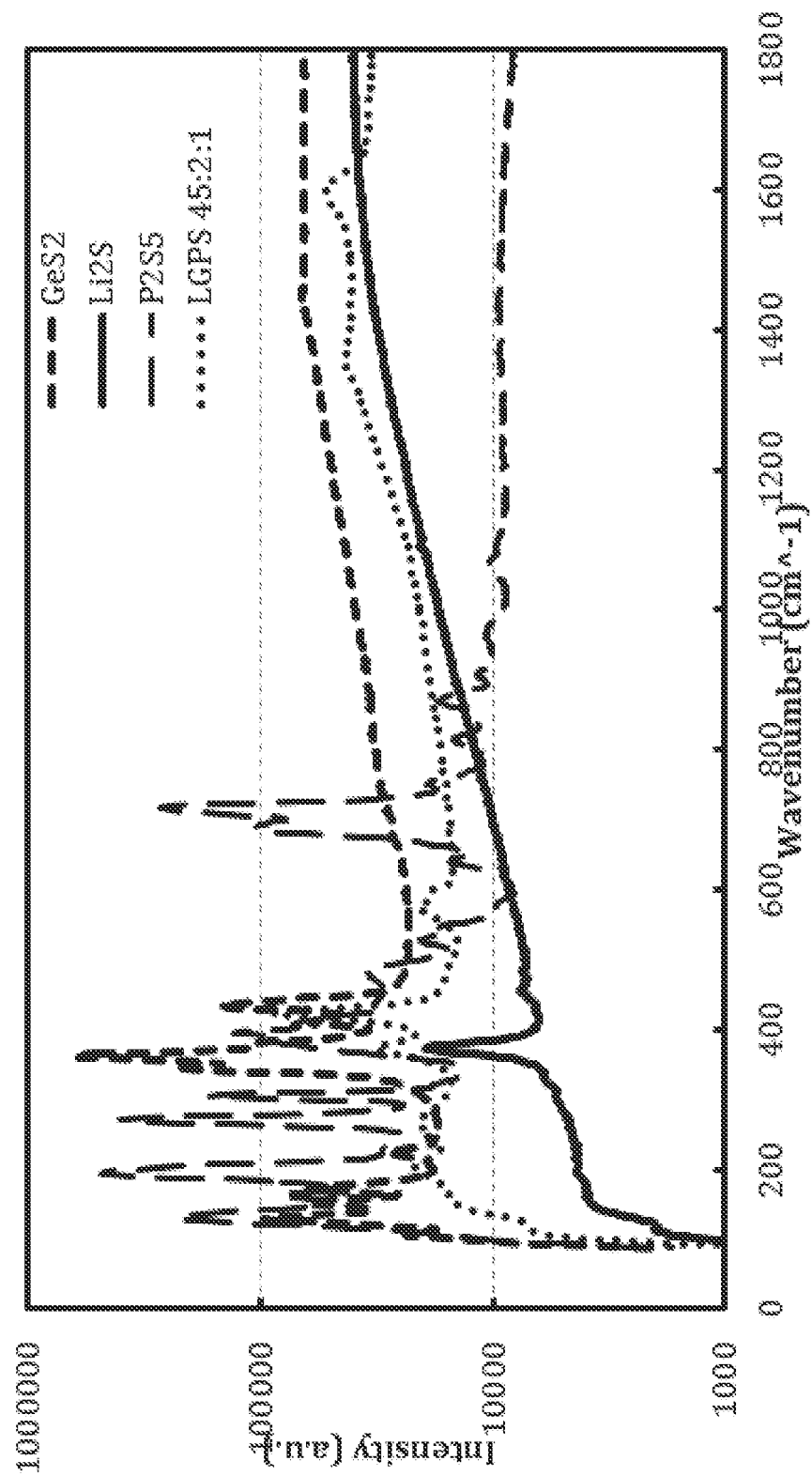
FIG. 12 shows an illustration of Raman spectroscopy of LGPS, comparing to precursors according to an example of the present invention.

FIG. 12 illustrates a Raman spectroscopy of LGPS, compared to its precursors. New features in Raman spectra can be clearly observed in LGPS versus the precursors. As shown is Raman spectroscopy of $GeS_2$, $Li_2S$, $P_2S5$, and $L_aGeP_bS_c$ pressed pellets. The 45:2:1 refers to the relative amounts of $Li_2S:P_2S_5:GeS_2$ precursors used in the synthesis.

Figure 13:
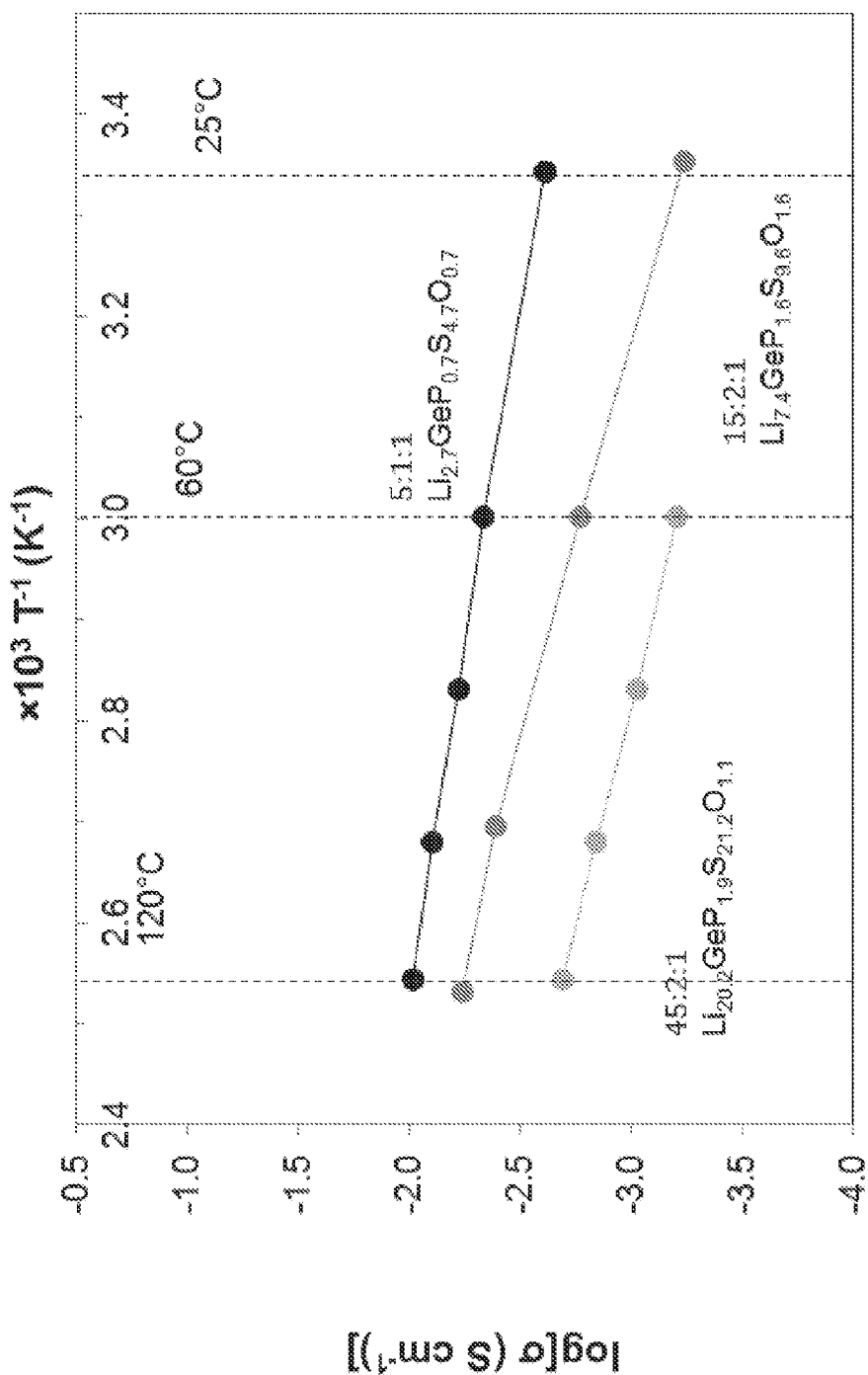
FIG. 13 shows an illustration of an LGPS ionic conductivity Arrhenius plot according to an example of the present invention.

FIG. 13 illustrates LGPS ionic conductivity Arrhenius plot in an example according to the present invention. As shown is Arrhenius plot of the ionic conductivity of various $Li_aGeP_bS_c$ pressed pellets measured by electrochemical impedance spectroscopy with indium blocking electrodes. The ratios refer to the relative amounts of $Li_2S:P_2S_5:GeS_2$ precursors used in the synthesis, while the compositions are derived from X-ray photoelectron spectroscopy measurements.

Figure 14:
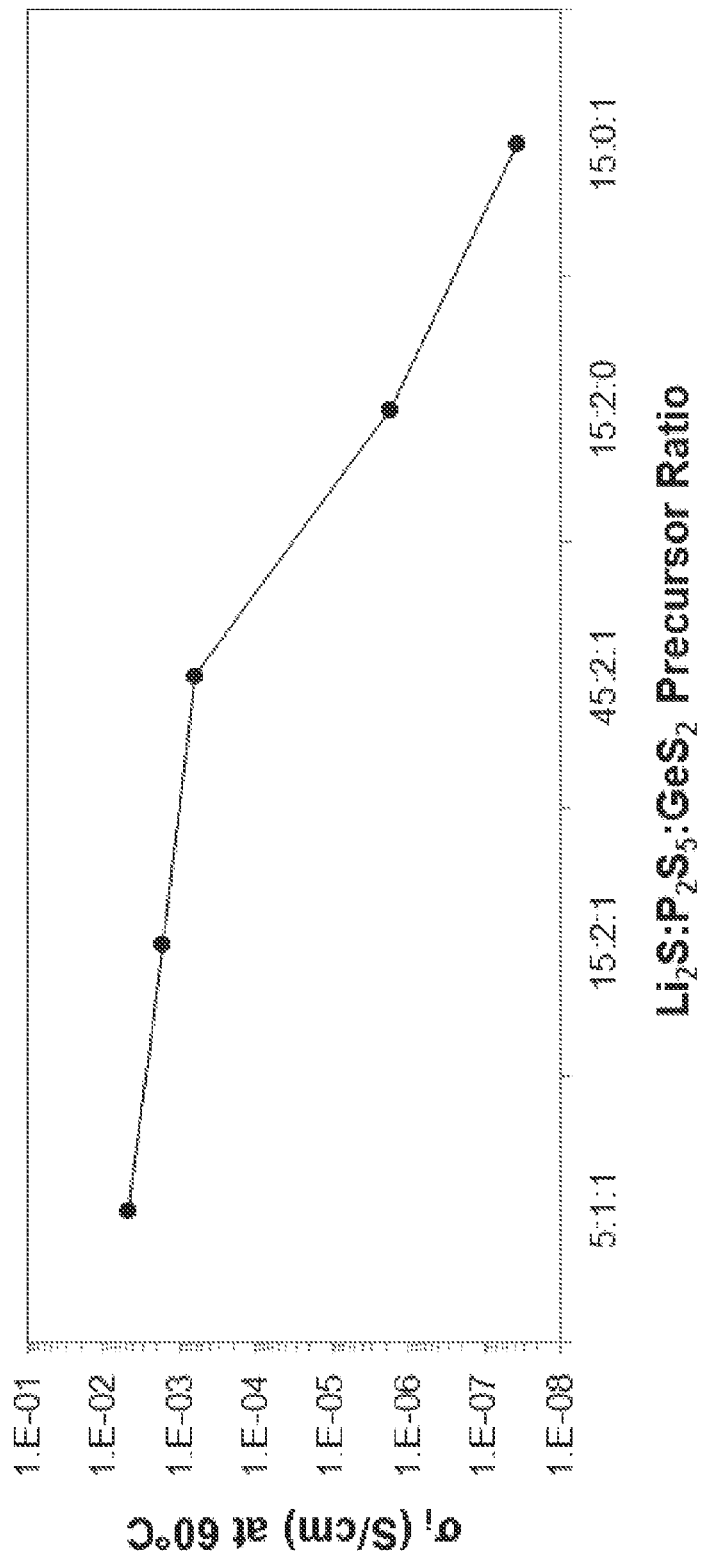
FIG. 14 shows LGPS ionic conductivity as a function of P and Ge concentrations according to an example of the present invention.

FIG. 14 illustrates LGPS ionic conductivity as a function of P and Ge concentrations according to examples of the present invention. As shown, the ranges 5:1:1 to 15:2:1 and 45:2:1 are indicative of desirable material, and 5:1:1 is also preferred, although there can be variations. Ionic conductivity of various $Li_aGeP_bS_c$ pressed pellets at 60° C. measured by electrochemical impedance spectroscopy with indium blocking electrodes as a function of the $Li_2S:P_2S_5:GeS_2$ precursor ratio.

Figure 15:
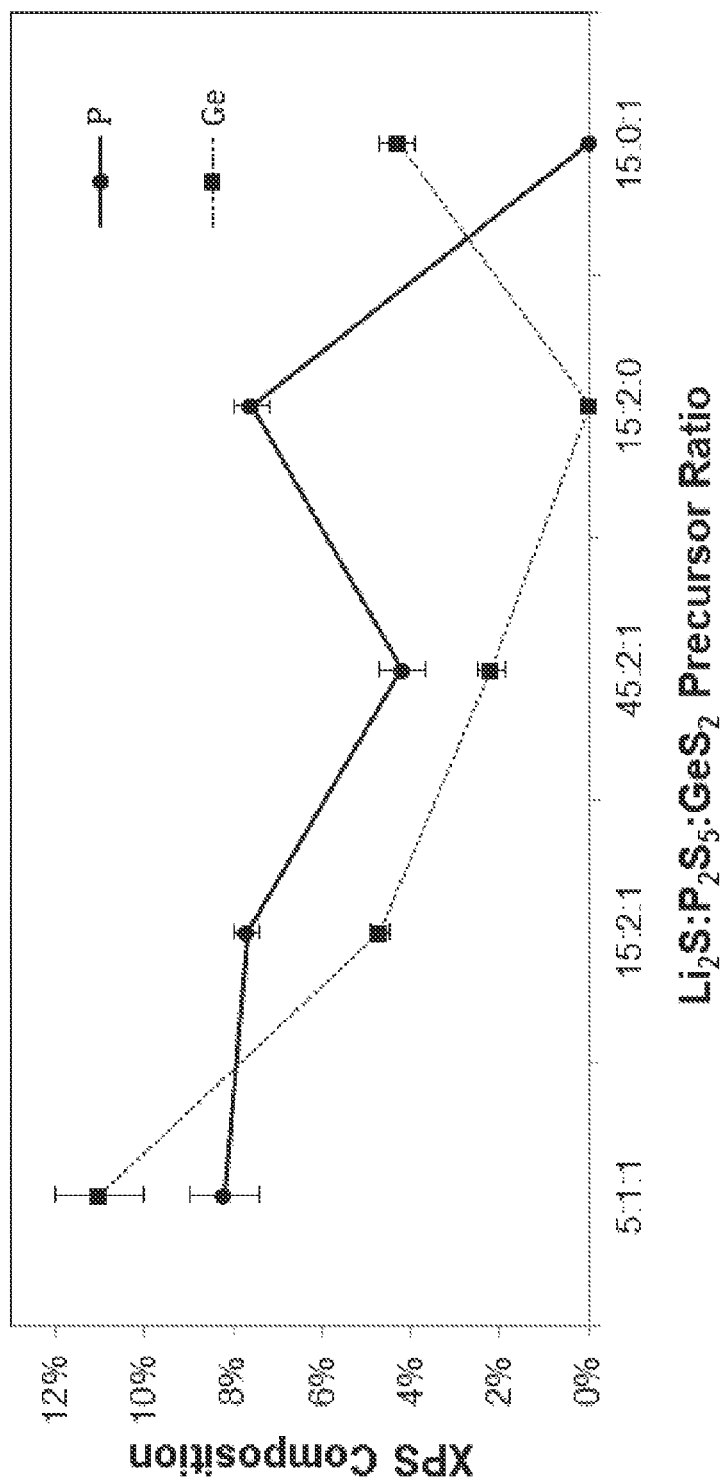
FIG. 15 shows composition of P and Ge in pressed pellets of $Li_aGeP_bS_c$ measured by X-ray photoelectron spectroscopy (XPS) as a function of $Li_2S:P_2S_5:GeS_2$ precursor ratio.

FIG. 15 illustrates composition of P and Ge in pressed pellets of $Li_aGeP_bS_c$ measured by X-ray photoelectron spectroscopy (XPS) as a function of $Li_2S:P_2S_5:GeS_2$ precursor ratio. As shown, decreasing germanium and/or phosphorous content generally leads to undesirable results. Further details of the present techniques can be found throughout the present specification and more particularly below.

TABLE

Compositions of LGPS produced by thermal evaporation. Values are atomic percentage of each element; each row is a different sample.

| Li | Ge | P | S | O | Ion conductivity (S/cm) at 60° C. |
|---|---|---|---|---|---|
| 24.94 | 6.73 | 14.47 | 46.58 | 7.29 | |
| 52.02 | 0.10 | 0.23 | 32.46 | 8.06 | 2.5e−6 |

TABLE-continued

Compositions of LGPS produced by thermal evaporation. Values are atomic percentage of each element; each row is a different sample.

| Li | Ge | P | S | O | Ion conductivity (S/cm) at 60° C. |
|---|---|---|---|---|---|
| 55.28 | 0.78 | 0.89 | 34.56 | 8.33 | ~1e−8 |
| 62.75 | 1.92 | 0.11 | 29.93 | 8.11 | 3.5e−8 |
| 45.72 | 8.54 | 0.02 | 38.99 | 6.73 | 3e−6 |

TABLE

Compositions of LSPS produced by thermal evaporation. Values are atomic percentage of each element; each row is a different sample.

| Li | Si | P | S | O | Ion conductivity (S/cm) at 60 degrees C. |
|---|---|---|---|---|---|
| 26.76 | 0.15 | 22.22 | 45.62 | 5.25 | 1e−7 |
| | | | | | 5e−7 |

Figure 16:
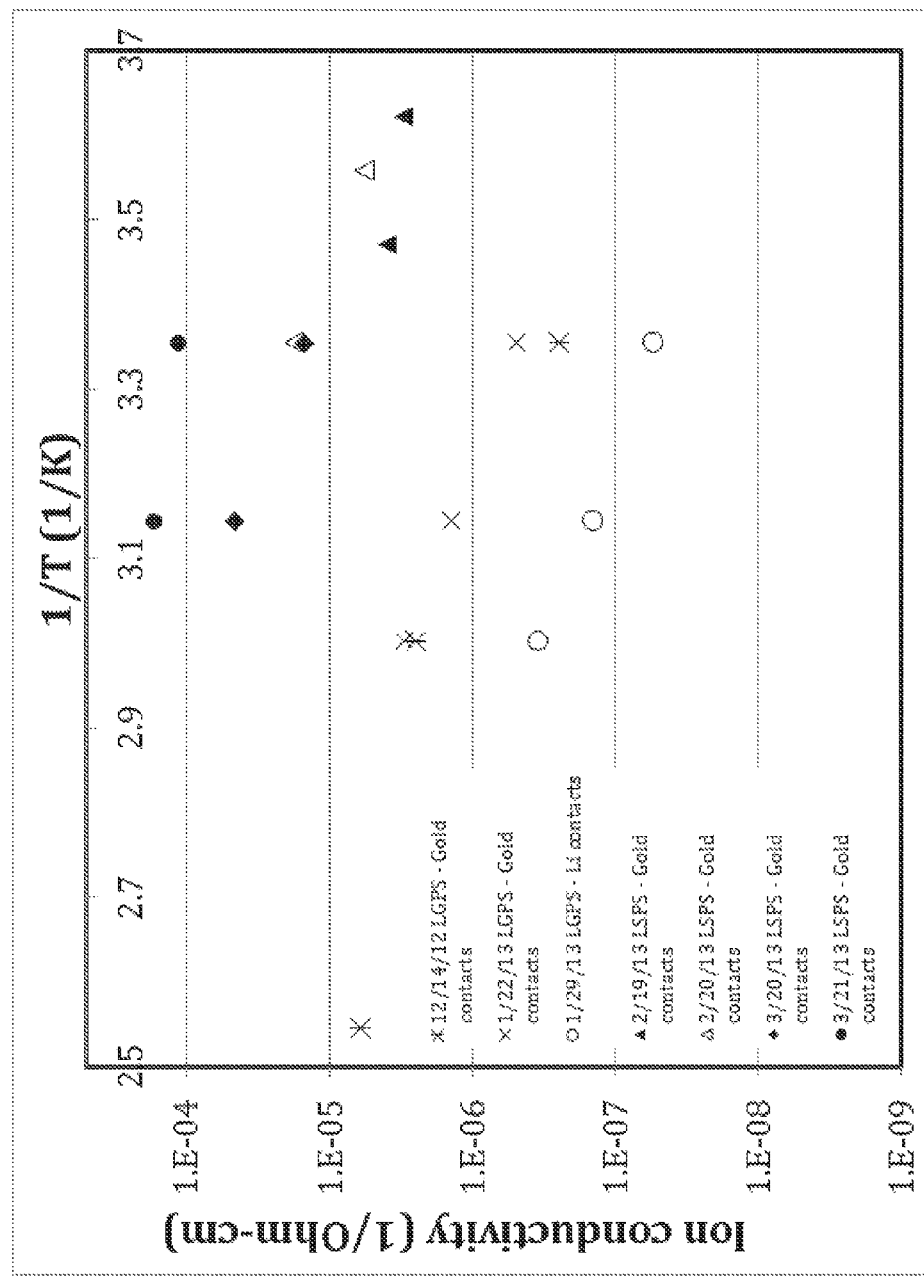
FIG. 16 shows ion conductivity plotted as a function of temperature for samples according to an embodiment of the present invention.

FIG. 16 shows the ion conductivity plotted as a function of temperature for samples according to an embodiment of the present invention. All samples were fabricated in a thermal evaporator with powder as the source material. All were made from LS(G)PS powder made from milling and annealing a mixture of $Li_2S$, $P_2S_5$ and $SiS_2$ ($GeS_2$) powders. Evaporation occurred at ~1000° C. for the samples, while for other samples the temperature was gradually increased from approximately 400 to 1500° C. during the course of the evaporation. The power was premixed according to the following compositions ($Li_2S$: $P_2S_5$: $SiS_2$):
- 15:2:1
- 5:1:1
- 5:1:1
- 5:1:1

The samples were, in some instances, made by thermal co-evaporation of $SiS_2$ ($GeS_2$) powder and a mixture of $Li_2S$: $P_2S_5$ (2.5:1) powder that had been milled and annealed. The sources were heated in parallel and deposited onto a rotating substrate. The temperatures of the sources were increased independently as the rate of either fell.

Substrates for certain wafers were thermal oxide silicon wafer with a sputtered Ti/TiN contact layer. Certain substrates were stainless steel of 4 mil thickness.

Figure 17:
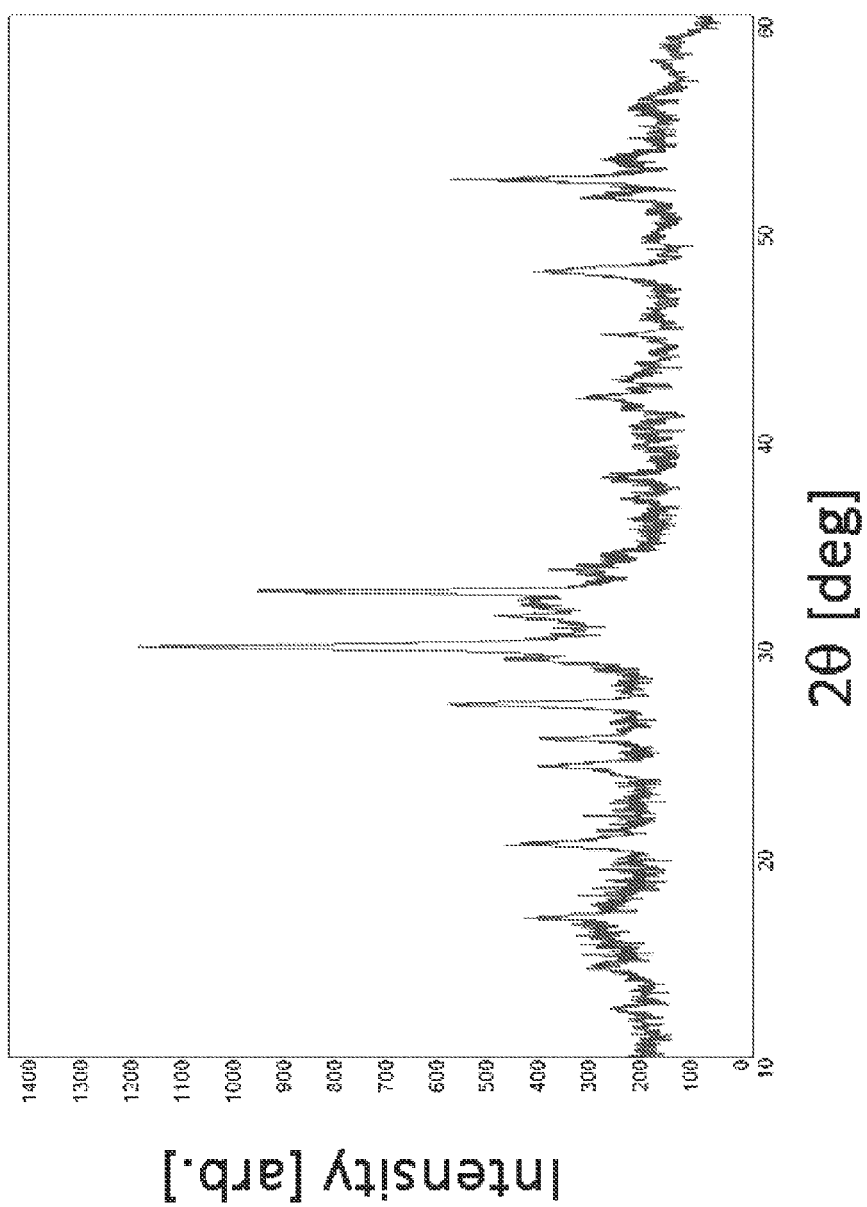
FIG. 17 shows an XRD spectrum of an LSPS sample with conductivity of 9 e-4 S/cm at 30° C.

FIG. 17 is an XRD spectrum of an LSPS sample with composition $Li_{0.38}Si_{0.07}P_{0.08}S_{0.35}O_{0.12}$ and conductivity of 9 e−4S/cm at 30° C. The peak list is presented in the following table:

| 2-theta (°) | d (Å) | Normalized intensity | FWHM (°) |
|---|---|---|---|
| 12.38 | 7.15 | 0.08 | 0.35 |
| 14.35 | 6.17 | 0.13 | 0.50 |
| 16.05 | 5.52 | 0.13 | 1.61 |
| 16.74 | 5.29 | 0.16 | 0.35 |
| 19.55 | 4.54 | 0.06 | 0.35 |
| 20.22 | 4.39 | 0.21 | 0.38 |
| 20.91 | 4.24 | 0.07 | 0.35 |
| 24.03 | 3.70 | 0.16 | 0.40 |
| 25.27 | 3.52 | 0.21 | 0.15 |
| 26.94 | 3.31 | 0.35 | 0.28 |
| 29.10 | 3.07 | 0.30 | 0.20 |
| 29.67 | 3.01 | 1.00 | 0.34 |
| 31.15 | 2.87 | 0.16 | 0.26 |
| 31.89 | 2.80 | 0.31 | 1.44 |
| 32.37 | 2.76 | 0.68 | 0.20 |
| 33.42 | 2.68 | 0.19 | 0.43 |
| 34.12 | 2.63 | 0.09 | 0.35 |
| 36.81 | 2.44 | 0.09 | 0.35 |
| 37.86 | 2.37 | 0.13 | 0.40 |
| 41.75 | 2.16 | 0.13 | 0.51 |
| 42.52 | 2.12 | 0.09 | 0.39 |
| 44.70 | 2.03 | 0.12 | 0.27 |
| 47.73 | 1.90 | 0.23 | 0.47 |
| 51.22 | 1.78 | 0.16 | 0.21 |
| 52.09 | 1.75 | 0.33 | 0.26 |
| 53.03 | 1.73 | 0.11 | 0.41 |

A solid-catholyte material may be fabricated by physical vapor deposition (PVD), chemical vapor deposition (CVD), atomic layer deposition (ALD), and solid state reaction of powders, mechanical milling of powders, solution synthesis, evaporation, or any combination thereof. It may then be mixed with the active material in a mixer or mill or with different configurations of physical vapor deposition, optionally mixed with carbon, and coated onto a substrate by calendaring, doctor blading, slot die coating, or with a standard technique as described above. It also may be coated directly on the active material with a vapor phase growth, liquid phase growth, deposition on particles in a fluidized bed, etc. Of course, there are various alternatives, modifications, and variations.

This approach enables lower cost, higher energy density batteries with better temperature performance, enhanced safety, and improved electrochemical cycling stability.

The incorporation of Si lowers the total cost of the catholyte by a factor of 10× compared to using Ge.

Use of Si in place of Ge appears to improve the stability of the catholyte/Li interface.

A method according to an example of the present invention can be outlined as follows:
1. Provide a substrate member;
2. Form a major active region comprising a plurality of first active regions spatially disposed within a cathode region such that the major active region expands or contracts from a first volume to a second volume during a period of a charge and discharge;
3. Form a catholyte material spatially confined within a spatial region of the cathode region and spatially disposed within spatial regions not occupied by the first active regions. In an example, the catholyte material comprises a lithium, metal, phosphorous, and sulfur ("LMPSO") containing material configured in a polycrystalline state;
4. Optionally form a protective material formed overlying exposed regions of the cathode material to substantially maintain the sulfur species within the catholyte material;
5. Form cathode active material, electron conductive additive, binder, and other elements;
6. Mix cathode components together with a solvent into a slurry and deposit the slurry on said substrate; dry the substrate
7. Complete solid state battery device;
8. Package battery device; and
9. Transport battery device.

The above sequence of steps is an example of a method for fabricating a battery device. In an example, steps can be combined, removed, or include others, among variations. Other variations, alternatives, and modifications can exist. Further details of these process steps can be found throughout the present specification.

Certain Embodiments of the Invention Described Herein

In one example, the present invention provides an energy storage device comprising a cathode region, the cathode region comprising a major active region comprising a plurality of first active regions spatially disposed within the cathode region, the major active region expanding or contracting from a first volume to a second volume during a period of a charge and discharge; a catholyte material spatially confined within a spatial region of the cathode region and spatially disposed within spatial regions not occupied by the first active regions, the catholyte material comprising a lithium, germanium, phosphorous, and sulfur ("LGPS") containing material configured in a polycrystalline state; an oxygen species configured within the LGPS containing material, the oxygen species having a ratio to the sulfur species of 1:2 and less to form a LGPSO material; and a protective material formed overlying exposed regions of the cathode material to substantially maintain the sulfur species within the catholyte material. In certain embodiments, the oxygen species is less than 20 percent of the LGPSO material. In some embodiments, the sulfur containing species ranges from about 20 to 60 percent of the LGPSO material. In other embodiments, the confinement material is configured as a barrier material. In other embodiments, the confinement material substantially prevents an interaction of the sulfur containing species with an element within the major active region. In yet other embodiments, the major active region is greater than about 50 percent of the cathode region; and the catholyte material is less than about 30 percent of the cathode region. In other embodiments, the confinement material is configured to selectively allow a lithium species to traverse through the confinement material, the confinement materials comprising a plurality of spatial openings to allow the lithium species to traverse through the confinement material. In yet other embodiments, the catholyte material is configured to substantially fill the cathode region comprising the major active region to form a substantially homogeneous thickness of material defining the cathode region.

In some examples, the present invention further comprises a polymer material configured within a vicinity of the catholyte material, the polymer material comprising a lithium species. In some of these embodiments, the polymer material is formed overlying the catholyte material, the polymer material comprising a lithium material. In other embodiments, the polymer material configured to accommodate an internal stress within the cathode region during the change in volume from the expansion to a contraction. In some examples, the plurality of active regions has a size ranging from about first dimension to about a second dimension. In some examples, the catholyte material comprising a plurality of clusters, each of which is separable. In some other examples, the catholyte material comprising a plurality of shell structures. In yet other embodiments, the catholyte material is configured as a plurality of particles. In some examples, the present invention provides a device further comprising a second confinement material overlying each of the plurality of active regions.

In another example, the present invention provides an energy storage device comprising a cathode region, the cathode region comprising: a major active region comprising a plurality of first active regions spatially disposed within the cathode region; a catholyte material spatially confined within a spatial region of the cathode region and spatially disposed within spatial regions not occupied by the first active regions, the catholyte material comprising a lithium, germanium, phosphorous, and sulfur ("LGPS") containing material or a lithium, silicon phosphorous, and sulfur ("LSPS") containing material, each of which is configured in a polycrystalline or amorphous state; an oxygen species configured within the LGPS or LSPS containing material, the oxygen species having a ratio to the sulfur species of 1:2 and less to form a LGPSO or LSPSO material; and a confinement material formed overlying exposed regions of the cathode active material to minimize reaction between the LGPS or LSPS containing material and the active material. In some examples, the oxygen species ranges from less than 1 percent to 20 percent of the LGPSO or LSPSO material. In other examples, the sulfur containing species ranges from about 20 to 60 percent of the LGPSO or LSPSO material. In some examples, the confinement material is configured as a barrier material. In yet other examples, the confinement material substantially prevents an interaction of the sulfur containing species with an element within the major active region. In other examples, the major active region is greater than 50 percent by volume of the cathode region. In certain examples, the confinement material is configured to selectively allow a lithium species to traverse through the confinement material. In other examples, the catholyte material is configured to substantially fill the cathode region comprising the major active region to form a substantially homogeneous thickness of material defining the cathode region.

In some examples, the devices described herein further comprise a polymer material configured within a vicinity of the catholyte material, the polymer material serving as a binder material comprising a lithium species. In other examples, the polymer material is formed overlying the catholyte material, the polymer material serving as an electrolyte. In yet other embodiments, the polymer material is configured to accommodate an internal stress within the cathode region during the change in volume from the expansion to a contraction. In some other examples, the size distribution of active regions has a median diameter ranging from about 20 nm to about 10 μm. In some examples, the catholyte material comprising a plurality of clusters, each of which has a median diameter ranging from about 10 nm to about 300 nm. In other examples, the catholyte material comprises a plurality of shell structures around the cathode active regions. In other examples, the catholyte material is configured as a plurality of particles, each of the particles having a median diameter ranging from about 20 nm to about 300 nm. In some other examples, the device further comprises a second confinement material overlying each of the plurality of active regions. In other examples, the catholyte material is substantially free from oxygen species.

In some examples, the present invention sets forth an energy storage device comprising a cathode region, the cathode region comprising a major active region comprising a plurality of first active regions spatially disposed within the cathode region; a catholyte material spatially confined within a spatial region of the cathode region and spatially disposed within spatial regions not occupied by the first active regions, the catholyte material comprising a lithium, germanium, phosphorous, and sulfur ("LGPS") containing material or a lithium, silicon phosphorous, and sulfur ("LSPS") containing material, each of which is configured in a polycrystalline or amorphous state; a plurality of particles characterizing the catholyte material, each of the plurality of particles is interconnected to another via a necking arrangement, each particle having a dimension characterized by a particle diameter to neck ratio dimension ranging from 1% to greater than 100% to form a polycrystalline structure having a porosity of less than 30% of a total volume of the cathode region. In some examples, the plurality of particles in the catholyte material is substantially homogeneous in a micro-scale while configured in the polycrystalline structure in a ten to one hundred micron scale. In other examples, the cathode region comprises an active material, the active material comprising iron and fluorine and/or nickel and fluorine.

In some examples, of any of the devices set forth herein, the catholyte material is selected from one of $Li_xSiP_yS_z$ or $Li_aGeP_bS_c$. In some examples, the catholyte material is provided by annealing $Li_2S$, $P_2S_5$, and $GeS_2$ or $SiS_2$ at between 400-700° C. for greater than about 4 hrs.

In some examples, of any of the devices set forth herein, the device further comprises an oxygen species configured within the LGPS or LSPS containing material, the oxygen species having a ratio to the sulfur species of 1:10 and less to form a LGPSO or LSPSO material; and a confinement material formed overlying exposed regions of the cathode active material to minimize reaction between the LGPS or LSPS containing material and the active material. In some examples, the oxygen species is less than 20 percent of the LGPSO or LSPSO material. In other examples, the sulfur containing species ranges from about 20 to 60 percent of the LGPSO or LSPSO material. In certain examples, the confinement material is configured as a barrier material. In yet other examples, the confinement material substantially prevents an interaction of the sulfur containing species with an element within the major active region. In other examples, the major active region is greater than 50 percent by volume of the cathode region. In still other examples, the confinement material is configured to selectively allow a lithium species to traverse through the confinement material. In some examples, the catholyte material is configured to substantially fill the cathode region comprising the major active region to form a substantially homogeneous thickness of material defining the cathode region. In other examples, the device further comprises a polymer material configured within a vicinity of the catholyte material, the polymer material serving as a binder material. In certain examples, the polymer material is formed overlying the catholyte material, the polymer material serving as an electrolyte. In other embodiments, the polymer material is configured to accommodate an internal stress within the cathode region during the change in volume from the expansion to a contraction. In some examples, each of the plurality of active regions has a median diameter ranging from about 20 nm to about 10 μm. In some examples, each of the plurality of active regions has a median diameter ranging from about 20 nm to about 3 μm. In other examples, the catholyte material comprises a plurality of clusters, the size distribution of which has a median diameter ranging from about 10 nm to about 300 nm. In some examples, the catholyte material comprises a plurality of shell structures around the cathode active regions. In some examples, the catholyte material is configured as a plurality of particles, the size distribution of the particles having a median diameter ranging from about 20 nm to about 300 nm. In some other examples, the device further comprises a second confinement material overlying each of the plurality of active regions. In other examples, the catholyte material is substantially free from oxygen species.

In some examples, the present invention sets forth an energy storage device comprising a catholyte material spatially confined within a spatial region of the energy storage device, the catholyte material comprising a lithium, germanium, phosphorous, and sulfur ("LGPS") containing material or a lithium, silicon phosphorous, and sulfur ("LSPS") containing material, each of which is configured in a polycrystalline, nanocrystalline or amorphous state; a room temperature ionic conductivity ranging from $10^{-5}$ to $5 \times 10^{-2}$ S/cm characterizing the LGPS or LSPS material; and an electrical conductivity less than $10^{-5}$ S/cm characterizing the LGPS or LSPS material. In some examples, the room temperature ionic conductivity ranges from $10^{-4}$ to 1 e-2S/cm; and the electrical conductivity is less than $10^{-5}$ S/cm. In other embodiments, the device further comprises a plurality of particles characterizing the catholyte material, each of the plurality of particles is interconnected to another via a necking arrangement, each particle having a dimension characterized by a particle diameter to neck ratio dimension ranging from 1% to greater than 100% to form a polycrystalline structure having a solid area to hole area or porosity of less than 30% of a total volume of the catholyte material. In other examples, each of the plurality of particles in the catholyte material is substantially homogeneous in a micro-scale while configured in the polycrystalline structure in a ten to one hundred micron scale. In some examples, the cathode region comprises an active material, the active material comprising iron and fluorine and/or nickel and fluorine.

In some examples, the cathode region comprises an active material, the active material comprising iron and fluorine. In some examples, the cathode region comprises an active material, the active material comprising nickel and fluorine.

In any of the examples, set forth herein, the catholyte material may be selected from one of $Li_xSiP_yS_z$ or $Li_aGeP_bS_c$. In some examples, the catholyte material is provided by annealing $Li_2S$, $P_2S_5$, $GeS_2$ or $SiS_2$ at between 400 and 700° C. for at least 4 hrs.

In some examples, the present invention sets forth an energy storage device comprising a catholyte material spatially confined within a spatial region of the energy storage device, the catholyte material comprising: a lithium, silicon phosphorous, and sulfur ("LSPS") containing material, each of which is configured in a polycrystalline or amorphous state; a room temperature ionic conductivity ranging from $10^{-5}$ S/cm to $10^{-2}$ S/cm characterizing the LSPS material; an electrical conductivity less than 1 e-5S/cm characterizing the LSPS material; and an XRD 2Θ scan with Cu Kα radiation is characterized by a primary peak at 33°±1°, 30°±1°, or 43°±1°. In some examples, the room temperature ionic conductivity ranges from $10^{-4}$ to $5 \times 10^{-3}$; and the electrical conductivity range is less than $10^{-5}$ S/cm. In some examples, the devices described herein further comprise a plurality of particles characterizing the catholyte material, each of the plurality of particles is interconnected to another via a necking arrangement, each particle having a dimension characterized by a particle diameter to neck ratio dimension ranging from 1% to greater than 100% to form a polycrystalline structure having a solid area to hole area or porosity of less than 30% of a total volume of the catholyte material. In some examples, the plurality of particles in the catholyte material is substantially homogeneous in a micro-scale while configured in the polycrystalline structure in a ten to one hundred micron scale. In some other examples, the catholyte material comprises an active material, the active material comprising iron and fluorine and/or nickel and fluorine. In certain examples, the catholyte material is selected from one of $Li_xSiP_yS_z$ or $Li_aGeP_bS_c$. In some other examples, the catholyte material is provided by annealing $Li_2S$, $P_2S_5$, $GeS_2$ or $SiS_2$ at between 400-700° C. for at least 4 hrs.

In some examples, the present invention sets forth an energy storage device comprising a catholyte material spatially confined within a spatial region of the energy storage device, the catholyte material comprising a lithium, silicon phosphorous, and sulfur ("LSPS") containing material, each of which is configured in a polycrystalline or amorphous state; a room temperature ionic conductivity ranging from $10^{-5}$S/cm to $10^{-2}$S/cm characterizing the LSPS material; an electrical conductivity less than 1 e-5S/cm characterizing the LSPS material; and an XRD 2⊖ scan with Cu Kα radiation is characterized by a first major peak between about 41 to 45° 2⊖ and a second major peak between about 30 to 35° 2⊖ and a third major peak between 51-54° 2⊖. In some examples, the first major peak is higher in intensity than either the second major peak or the third major peak. In other examples, the XRD is measured in counts per second and the first major peak is higher in intensity than either the second major peak or the third major peak. In yet other examples, the device exhibits a cyclic voltammogram characterized by a current density of less than 1 mA/cm² when the voltage is swept at 10 mV/s between 0.1-4.5V vs $Li/Li^+$ and the sample is maintained at 30° C.

In some examples, the present invention sets forth an energy storage device comprising a cathode region, the cathode region comprising a major active region comprising a plurality of first active regions spatially disposed within the cathode region, the major active region expanding or contracting from a first volume to a second volume during a period of a charge and discharge; a catholyte material spatially confined within a spatial region of the cathode region and spatially disposed within spatial regions not occupied by the first active regions, the catholyte material comprising a lithium, germanium, phosphorous, and sulfur ("LGPS") containing material configured in a polycrystalline state; wherein the catholyte material is characterized by an XRD as measured in counts per second characterized by a first major peak between at 41 to 45° 2⊖, between about 30 to 35° 2⊖; whereupon the first major peak is higher in intensity than either the second major peak or the third major peak. In some examples, the device further comprises an oxygen species configured within the LGPS containing material, the oxygen species having a ratio to the sulfur species of 1:2 and less to form a LGPSO material wherein the oxygen species is less than 20 percent of the LGPSO material. In other examples, the sulfur containing species ranges from about 25 to 60 percent of the LGPSO material. In certain examples, the device further comprises a confinement material formed overlying exposed regions of the cathode material to substantially maintain the sulfur species within the catholyte material; wherein the confinement material is configured as a barrier material. In certain other examples, the device further comprises a confinement material; wherein the confinement material substantially prevents an interaction of the sulfur containing species with an element within the major active region. In other examples, the major active region is greater than about 50 percent by volume of the cathode region; and the catholyte material is less than about 30 percent by volume of the cathode region. In other examples, the device further comprises a confinement material; wherein the confinement material is configured to selectively allow a lithium species to traverse through the confinement material, the confinement materials comprising a plurality of spatial openings to allow the lithium species to traverse through the confinement material.

In other examples, the catholyte material is configured to substantially fill the cathode region comprising the major active region to form a substantially homogeneous thickness of material defining the cathode region. In yet other examples, the device further comprises a polymer material configured within a vicinity of the catholyte material, the polymer material comprising a lithium species. In other examples, the polymer material is formed overlying the catholyte material, the polymer material comprising a lithium material. In other examples, the polymer material configured to accommodate an internal stress within the cathode region during the change in volume from the expansion to a contraction. In still other examples, each of the plurality of active regions has a size ranging from about first dimension to about a second dimension. In some other examples, the catholyte material comprises a plurality of clusters, each of which is separable. In other examples, the catholyte material comprises a plurality of shell structures. In other examples, the catholyte material is configured as a plurality of particles. In some other examples, the device further comprises a second confinement material overlying each of the plurality of active regions.

In some examples, the present invention sets forth a method for manufacturing an energy storage device comprising forming a cathode region, the cathode region comprising a major active region comprising a plurality of first active regions spatially disposed within the cathode region, the major active region expanding or contracting from a first volume to a second volume during a period of a charge and discharge; a catholyte material spatially confined within a spatial region of the cathode region and spatially disposed within spatial regions not occupied by the first active regions, the catholyte material comprising a lithium, germanium, phosphorous, and sulfur ("LGPS") containing material configured in a polycrystalline state. In some examples, the LGPS containing material comprises an oxygen species configured within the LGPS containing material, the oxygen species having a ratio to the sulfur species of 1:2 and less to form a LGPSO material. In some other examples, the method further comprises forming a confinement material formed overlying exposed regions of the cathode material to substantially maintain the sulfur species within the catholyte material. In still other examples, the oxygen species is less than 20 atomic percent of the LGPSO material. In other examples, the sulfur containing species ranges from about 25 to 60 percent of the LGPSO material. In some other examples, the method further comprises forming a confinement material configured as a barrier material. In still other examples, the confinement material substantially prevents an interaction of the sulfur containing species with an element within the major active region. In yet other examples, the major active region is at least 50 percent by volume of the cathode region; and the catholyte material is less than about 30 percent by volume of the cathode region. In some other examples, the method further comprises forming a confinement material configured to selectively allow a lithium species to traverse through the confinement material, the confinement materials comprising a plurality of spatial openings to allow the lithium species to traverse through the confinement material. In other examples, the catholyte material is configured to substantially fill the cathode region comprising the major active region to form a substantially homogeneous thickness of material defining the cathode region. In other examples, the method further comprises forming a polymer material configured within a vicinity of the catholyte material, the polymer material comprising a lithium species. In some other examples, the polymer material is formed overlying the catholyte material, the polymer material comprising a lithium material. In yet other examples, the polymer material configured to accommodate an internal stress within the cathode region during the change in volume from the expansion to a contraction. In some other examples, each of the plurality of active regions has a size ranging from about first dimension to about a second dimension. In still other examples, the catholyte material comprises a plurality of clusters, each of which is separable. In some examples, the catholyte material comprises a plurality of shell structures. In yet other examples, the catholyte material is configured as a plurality of particles. In yet other examples, the method further comprises a second confinement material overlying each of the plurality of active regions.

In some examples, the present invention sets forth a solid catholyte material comprising a lithium element; a silicon element; a phosphorous element; a sulfur element; and an oxygen element; wherein the major peak is located at a peak in a position of $2\theta=30°\pm1°$ in an X-ray diffraction measurement using a CuKα line, or at the peak of $2\theta=33°\pm1°$ or a peak of $2\theta=43°\pm1°$. In some embodiments, the present invention provides a solid ion conducting material characterized by a formula $Li_aSiP_bS_cO_d$ where $2 \leq a \leq 8$, $0.5 \leq b \leq 2.5$, $4 \leq c \leq 12$, $d<3$, wherein any impurities are less than 10 atomic percent. In some examples, the present invention provides a solid ion conducting material comprising Li, Si, P, and S characterized by primary Raman peaks at $418\pm10$ cm$^{-1}$, $383\pm10$ cm$^{-1}$, $286\pm10$ cm$^{-1}$, and $1614\pm10$ cm$^{-1}$ when measured by a Renishaw inVia Raman microscope. In yet other examples, the present invention provides a solid ion conducting material that results from a reaction of x Li$_2$S, y SiS$_2$, and z P$_2$S$_5$, where $1 \leq x/y \leq 50$ and $0.5 \leq z/y \leq 3$.

In some examples, the present invention sets forth a process for manufacture of a solid ion conducting material comprising the steps of mixing Li$_2$S, P$_2$S$_5$, and SiS$_2$ and then heating the mixture to a temperature above 400° C. for a time of greater than 3 hours.

According to an embodiment of the present invention, techniques related to a solid catholyte material having desired ion conductivity are provided. More particularly, an embodiment of the present invention present invention provides a method and structure for a catholyte material to improve a total ionic conductivity for a cathode to allow for higher mass loading of an active material, faster charge/discharge, and a wider range of operating temperature. Merely by way of example, the invention has been applied to solid state battery cells, although there can be other applications.

As background, poor ionic conductivity of the cathode active material in a battery imposes strong limitations to overall performance, particularly in an all solid state battery wherein a solid catholyte material is needed to enable transport of ions from the cathode to the electrolyte. By mixing the low ionic conductivity cathode active material with a high ionic conductivity ceramic catholyte, we can improve overall cathode conductivity. Rate capability in a battery can be improved by increasing the volume fraction of the catholyte material. To improve electronic conductivity to match the ionic conductivity, a dopant species such as carbon can be added as a third component or pre-coated onto the cathode active material. Depending on the implementation, dopant species can be selected from a tin element, an aluminum element, carbon, titanium, hafnium, cerium, and/or zirconium.

In an example, an embodiment of the present invention sets forth a solid state catholyte, lithium-silicon-tin-phosphorus-sulfide (LSTPS), which possesses Li ion conductivity of $>5\times10^{-3}$ S/cm at 60° C. The composition of the catholyte is $Li_aSi_bSn_cP_dS_e$. LSTPS is synthesized using starting precursor materials: Li$_2$S, P$_2$S$_5$, Si, Sn, and S by a solid state reaction procedure wherein the materials are milled together and annealed to form a crystalline material.

In an example, the high ionic conductivity solid state catholyte enables improved energy density, power density, and low temperature performance of a battery with improved safety by eliminating the use of typical flammable components. Examples of conventional techniques are described.

That is, conventional cation ceramic sulfide ionic conductors have been proposed. These materials contain up to three cations paired with a sulfur anion. These materials may be amorphous or crystalline. These materials do not utilize an advantageous doping effect of a fourth cation, which limits the achievable ionic conductivity. Examples in the literature include: Kamaya et al., *A lithium super ionic conductor*, Nat. Mat. 10 (2011) 682-686. DOI: 10.1038/NMAT3066, and Murayama, et al., *Material design of new lithium ionic conductor, thio-LISICON, in the Li$_2$S-P$_2$S$_5$ system*, Solid State Ionics 170 (2004) 173-180. DOI: 10.1016/j.ssi.2004.02.025.

Conventional ceramic oxide ionic conductors have also been proposed. These ceramic oxide ionic conductors contain multiple cations paired with an oxygen anion. These materials cannot be used as catholyte materials since the space-filling requirement of the catholyte morphology needed to achieve high volumetric and gravimetric energy density necessitates a tortuous and highly granular structure with a high surface area to volume ratio. In the case of these oxides, high grain boundary impedances severely limit overall ionic conductivity, which are difficult to mitigate without high temperature sintering in excess of 1000° C. Such conditions can damage other components of the cell architecture. Examples include:

Buschmann, et al. *Lithium metal electrode kinetics and ionic conductivity of the solid lithium ion conductors "Li$_7$La$_3$Zr$_2$O$_{12}$" and Li$_{7-x}$La$_3$Zr$_{2-x}$Ta$_x$O$_{12}$*. J. Power Sources 206 (2012) 236-244. DOI: 10.1016/j.jpowsour.2012.01.094; and Ohta, et al. *High lithium ionic conductivity in the garnet-type oxide Li$_{7-x}$La$_3$(Zr$_{2-x}$, Nb$_x$)O$_{12}$ (x=0-2)*. J. Power Sources 196 (2011) 3342-3345. DOI: 10.1016/j.jpowsour.2010.11.089.

Conventional liquid ionic conductors have also been proposed. These materials typically consist of an ionic salt solvated in a liquid phase. These conductors often suffer from voltage instability. This voltage instability manifests in the formation of a solid electrode interface (SEI), which requires costly formation cycling and initial charge loss. Also extremely detrimental is the inherent flammability of these liquids, which severely impacts the overall safety of the device.

Figure 18A:
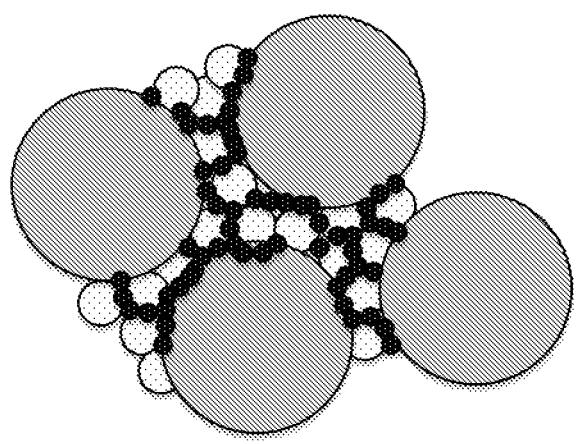
FIG. 18A is a simplified illustration of an electrode material (including an active positive electrode material, ionic conductor, and electronic conductor) according to an example of the present invention.

In an example, the composite ceramic catholyte material with chemical formula $Li_aX_bP_cS_d$ (LX(=M)PS), where X can be Ge, Si, Sn, or any combination thereof, may be synthesized using a solid state reaction. The precursors include Li$_2$S, P$_2$S$_5$, an elemental powder of X, and S. The powders are mixed in a ratio $L_aX_bP_cS_d$ where a=5, b=1, c=1, and d=2. In the case of LSPS, LTPS, or LGPS, b=1, and X is elemental Si powder (LSPS), elemental tin powder (LTPS), or elemental germanium powder (LGPS). In a non-limiting example of LSTPS, the composition $Li_aSi_bSn_cP_dS_e$, where a=5, b=0.5, c=0.5, d=1, and e=2. The precursor powders are exposed to high energy planetary milling, followed by annealing in enclosed reactors at 550° C. for 8 hours. The catholyte is then mixed with a binder, an active electrode material and an electronic conductor to form a composite positive electrode material, as illustrated in FIG. 18A. The positive electrode is then assembled into a fully functional solid state device, as illustrated in FIG. 18B.

FIG. 18A is a simplified illustration of an electrode material (including an active positive electrode material, ionic conductor, binder, and electronic conductor) according to an example of the present invention. The LMPS material forms a percolating network throughout the cathode and conducts ions to the active material with low transport losses.

Figure 18B:
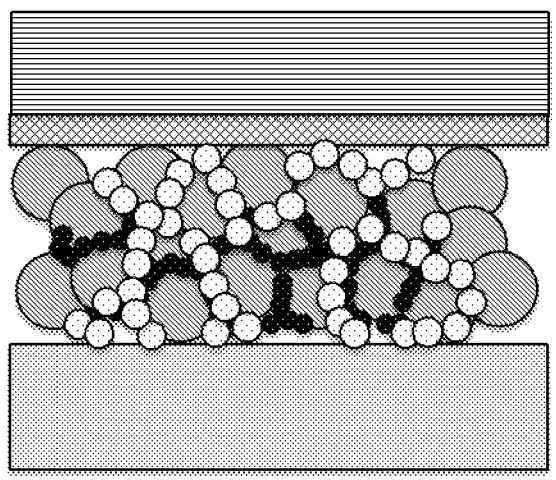
FIG. 18B is a simplified illustration of a negative electrode current collector, a solid state electrolyte, and a positive electrode current collector according to an example of the present invention.

FIG. 18B is a simplified illustration of a negative electrode current collector, a solid state electrolyte, and a positive electrode current collector according to an example of the present invention.

To assess ionic conductivity, the LXPS powders are pressed into pellets and studied using electrochemical impedance spectroscopy with blocking electrodes. The ionic conductivity of 4 component materials ranks in order of LGPS>LSPS>LTPS, as shown in FIG. 19, where average ionic conductivity of both LGPS and LSPS exceed $1 \times 10^{-3}$ S/cm at 60° C. It is unexpectedly shown that addition of a dopant material to create LSTPS improves the conductivity by a factor of 2× relative to average LSPS and 10× relative to average LTPS. Champion samples of LSTPS possess conductivities in excess of $5 \times 10^{-3}$ S/cm at 60° C. In an example, the conductivity of LSTPS exceeds the conductivity of any of the 4-component materials, and LSTPS is substantially less expensive than LGPS, since the cost of Ge is many times higher than the cost of Sn or Si.

Certain examples of the present invention surprisingly show that mixed Si/Sn doping unexpectedly results in beneficial conductivity properties.

In addition, the doped LSTPS material possesses an activation energy of 0.25 eV, lower than either LSPS (0.26 eV) or LTPS (0.28 eV), as previously shown in FIG. 20.

The conductivity trend extends down to 10° C. without the appearance of any additional grain boundary impedance, demonstrating the unique ability of sulfide materials to achieve excellent inter-grain contact without the need for high temperature sintering, unlike many oxide materials.

XRD shows that all of the materials possess a unique crystalline structure shown in FIG. 21. That is, FIG. 21 illustrates crystal structure from XRD spectra of LSTPS, LSPS, and LTPS according to examples according to the present invention.

XPS compositions in TABLE A confirm that LSTPS contains a mixture of both Si & Sn, whereas LSPS contains no Sn, and LTPS contains no Si. In an example, the composition range of LSPS includes $Li_aSiP_bS_cO_d$ where $2 \leq a \leq 12$, $0.5 \leq b \leq 3$, $2 \leq c \leq 15$, and $0 \leq d \leq 2$. The composition range of LTPS includes $Li_aSnP_bS_cO_d$ where $2 \leq a \leq 12$, $0.5 \leq b \leq 3$, $2 \leq c \leq 15$, and $0 \leq d \leq 3$. The composition range of LSTPS includes 30-50 at % Li, 0-10 at % Si, 0-10 at % Sn, 5-15 at % P, 30-55 at % S, and 0-15 at% O.

TABLE A

Compositions based on XPS analysis

| ID | Li | O | P | S | Si | Sn |
|---|---|---|---|---|---|---|
| LSTPS | 43 | 8 | 9 | 34 | 4 | 2 |
| LTPS | 36 | 11 | 13 | 34 | 0 | 6 |
| LSPS | 42 | 6 | 9 | 34 | 10 | 0 |

In an example, the unique chemical environments of the Li & P atoms between the LXPS compositions are shown in $^7$Li NMR spectra of FIGS. 22A, 22B, 22C, and 22D and $^{31}$P NMR spectra of FIGS. 23A, 23B, 23C, and 23D. Table B below provides an example of chemical environment based on $^7$Li and $^{31}$P NMR analysis. In an example, the peak shifts are listed in Table B.

TABLE B

Chemical environments based on $^7$Li and $^{31}$P NMR analysis

| | $^7$Li peak shifts (ppm) | $^{31}$P peak shifts (ppm) |
|---|---|---|
| LSPS | 1.176 | 73.217 |
| | | 87.114 |
| | | 93.892 |
| LSTPS | 0.732 | 75.575 |
| | | 86.699 |
| | | 93.590 |
| | | 108.367 |
| LTPS | 0.812 | 77.418 |
| | | 92.733 |
| | | 108.360 |
| LGPS | 0.955 | 74.430 |
| | | 86.590 |
| | | 92.227 |
| | | 109.251 |

TABLE C

XRD peak positions of LSTPS

| Pos. [°2Th.] | Height [cts] | FWHM Left [°2Th.] | d-spacing [Å] | Rel. Int. [%] |
|---|---|---|---|---|
| 12.733610 | 26.591680 | 0.157440 | 6.95207 | 5.73 |
| 14.784530 | 56.879290 | 0.157440 | 5.99197 | 12.25 |
| 17.723710 | 38.558420 | 0.236160 | 5.00437 | 8.31 |
| 20.481290 | 143.921600 | 0.118080 | 4.33640 | 31.01 |
| 20.781580 | 133.582900 | 0.118080 | 4.27441 | 28.78 |
| 24.229180 | 111.174500 | 0.137760 | 3.67345 | 23.95 |
| 27.243660 | 158.124100 | 0.196800 | 3.27345 | 34.07 |
| 27.763790 | 43.883490 | 0.236160 | 3.21329 | 9.45 |
| 29.354880 | 76.615600 | 0.157440 | 3.04265 | 16.51 |
| 29.856440 | 464.168600 | 0.177120 | 2.99267 | 100.00 |
| 31.965920 | 35.157160 | 0.196800 | 2.79983 | 7.57 |
| 33.639830 | 54.079900 | 0.157440 | 2.66424 | 11.65 |
| 35.873710 | 31.241780 | 0.236160 | 2.50330 | 6.73 |
| 36.919290 | 99.591870 | 0.157440 | 2.43477 | 21.46 |
| 37.924850 | 48.159920 | 0.236160 | 2.37249 | 10.38 |
| 41.732860 | 141.007900 | 0.196800 | 2.16439 | 30.38 |
| 42.569990 | 84.150730 | 0.275520 | 2.12375 | 18.13 |
| 45.560390 | 42.126310 | 0.236160 | 1.99107 | 9.08 |
| 47.630040 | 206.606000 | 0.236160 | 1.90928 | 44.51 |
| 49.299420 | 29.497720 | 0.393600 | 1.84846 | 6.35 |
| 51.935750 | 46.042590 | 0.236160 | 1.76066 | 9.92 |
| 52.798970 | 56.437860 | 0.314880 | 1.73390 | 12.16 |
| 55.107590 | 25.241580 | 0.472320 | 1.66660 | 5.44 |
| 55.994610 | 36.691830 | 0.314880 | 1.64228 | 7.90 |
| 58.343510 | 49.514790 | 0.314880 | 1.58164 | 10.67 |
| 59.193100 | 26.718480 | 0.314880 | 1.56095 | 5.76 |
| 60.398770 | 33.454870 | 0.314880 | 1.53265 | 7.21 |
| 64.457960 | 27.037480 | 0.314880 | 1.44559 | 5.82 |
| 71.353960 | 9.812757 | 0.551040 | 1.32187 | 2.11 |
| 72.420560 | 11.335860 | 0.472320 | 1.30501 | 2.44 |

FIG. 24 illustrates a schematic of full cell with solid state catholyte in an example according to the present invention. In an example, the LMPS material is present in the cathode as the ion conductor providing ion transport to the active material throughout the cathode.

FIG. 25 is an SEM micrograph of cast film of solid state LMPS according to an example of the present invention.

In contrast to previous efforts to synthesize a sulfide-based ionic conductor, the addition of N cation dopants (where N=1, 2, 3 . . . ) further improves the ionic conductivity of the material relative to the N-1 composition. This is highlighted by the LSTPS composition, in which the conductivity exceeds both LSPS and LTPS, and additionally possesses lower activation energy than both LSPS and LTPS. The improved conductivity and shallower activation energy enables higher energy density, power density, and low temperature performance of a battery, while also possessing the non-flammability (improved safety) of an all solid state ionic conductor.

A method according to an example of the present invention can be outlined as follows:

1. In an example, powders of $Li_2S$, $P_2S_5$, elemental Si, elemental Sn, and elemental S are mixed in a 5:1:0.5:0.5:2 mol ratio to produce LSTPS. Powders of $Li_2S$, $P_2S_5$, $SiS_2$, $SnS_2$ are mixed in a 5:1:0.5:0.5 mol ratio to produce LSTPS in an example, while there can be variations. Powders of $Li_2S$, $P_2S_5$, elemental Sn, and elemental S are mixed in a 5:1:1:2 mol ratio to produce LTPS in an example. Powders of $Li_2S$, $P_2S_5$, and $SnS_2$ are mixed in a 5:1:1 mol ratio to produce LTPS in an example. Powders of $Li_2S$, $P_2S_5$, elemental Si, and elemental S are mixed in a 5:1:1:2 mol ratio to produce LSPS In an example. Powders of $Li_2S$, $P_2S_5$, and $SiS_2$ are mixed in a 5:1:1 mol ratio to produce LSPS in an example. Powders of $Li_2S$, $P_2S_5$, elemental Ge, and elemental S are mixed in a 5:1:1:2 mol ratio to produce LGPS in an example. Powders of $Li_2S$, $P_2S_5$, and $GeS_2$ are mixed in a 5:1:1 mol ratio to produce LGPS in an example. In an example, $P_2S_5$ can be replaced with a 2:5 mixture of elemental P and elemental S. In an example, the molar equivalent of $Li_2S$ can be as low as 4.5 and as high as 5.5. In an example, the molar equivalent of $P_2S_5$ can be as low as 0.6 and as high as 1.4. In an example, the Si/(Si+Sn) stoichiometry can be as low as 0.25 and as high as 0.75. Of course, there can be variations in compositions, times, and other parameters. Depending on the specific process performed, the mixing ratios may be changed due to material loss and/or other factors.

2. The mixture of powder from Step 1 is loaded into, for example, a 50-500 ml milling jar containing 1-10 mm spherical milling media. The milling jar and media could be composed of stainless steel, hardened steel, alumina, or zirconia, in an example. In an example, 14 gr. of the mixture from Step 1 is loaded into a 50 ml $ZrO_2$ milling jar containing 50 gr. of 1 mm $ZrO_2$ spherical milling media.

3. The mixture in the milling jar is milled. In an example, the mixture is milled at 200-400 rpm for 4-16 hours in a planetary mill, although there can be variations, with 400 rpm for 8 hours being one preferred example. In another example, a shaker mill could be used.

4. The powder in the milling jars from Step 3 is recovered using a sieve, preferably 80 mesh, in an example.

5. The powder after sieving in Step 4 is loaded into an enclosed reactor. This reactor can be a vacuum sealed quartz tube or a high pressure and high temperature autoclave constructed of steel in an example.

6. The reactor vessel is heated to 400-700° C. for a soak duration of 1-8 hours.

7. The powder after annealing in Step 6 is recovered from the reactor vessel and finely distributed using a mortar & pestle, additional planetary milling, or vortex milling in an example.

8. The powder from Step 7 can be further downsized as needed using a planetary mill, a media mill, or a jet mill in order to achieve better percolation in a cathode in an example.

9. The powder derived from either Step 7 or Step 8 is then mixed with an active material to form a full cathode.

10. The cathode can then be assembled with an electrolyte and anode to create a full cell, in an example.

The above sequence of steps is an example of a method for fabricating a battery device. In an example, steps can be combined, removed, or include others, among variations. Other variations, alternatives, and modifications can exist.

In an example, a doped LSPS material is provided. In an example, the LSPS material comprises a lithium species, a silicon species, a phosphorous species, and a sulfur species. In an example, the doped LSPS material is configured with a plurality of dopant species consisting of a tin species to form an LSTPS alloy material; wherein the lithium species ranges from 30 to 50 at %; wherein the silicon species ranges from 0 to 15 at %; wherein the tin species ranges from 0 to 15 at %; the phosphorous species ranges from 5 to 17 at %; the sulfur species ranges from 30-55 at %; and the oxygen species ranges from 0-15 at %.

In an example, a doped LGPS material comprising a lithium species, a germanium species, a phosphorous species, and a sulfur species is provided. The doped LGPS material is doped with a plurality of tin species to form an LGTPS alloy material; wherein the lithium species ranges from 30 to 50 at %; wherein the germanium species ranges from 0 to 15 at %; wherein the tin species ranges from 0 to 15 at %; the phosphorous species ranges from 5 to 17 at %; the sulfur species ranges from 30 to 55 at %. In an example, the doped LGPS material further comprises an oxygen species ranging from 0-15 at %.

In an alternative example, a doped LGPS material comprising a lithium species, a germanium species, a phosphorous species, and a sulfur species is provided. In an example, the doped LGPS material is configured with a plurality of dopant species to form an LGSPS alloy material; wherein the lithium species ranges from 30 to 50 at %; wherein the germanium species ranges from 0 to 15 at %; wherein the silicon species ranges from 0 to 15 at %; the phosphorous species ranges from 5 to 17 at %; the sulfur species ranges from 30 to 55 at %; and the doped LGPS material. The doped LGPS material further comprises an oxygen species ranging from 0-15 at %.

In an alternative example, a doped LMPS material characterized with a plurality of different XRD peaks in a plurality of ranges including 18-21°, 26-28°, 28-31°, and 46-48° is provided. In an alternative example, a doped LMPS material characterized with at least one $^7$Li NMR peak shifts ranging from 0.5-1.5 ppm is provided. In an alternative example, a doped LMPS material characterized with at least one $^{31}$P NMR peak shifts ranging from 86-88 ppm (LSPS, LGPS, LSTPS), 92-94 ppm (LSTPS, LTPS, LGPS), 74-78 ppm (LSTPS, LTPS, LGPS), or 108-109 ppm (LTPS, LSTPS) is provided.

Although numerous examples of the invention have been illustrated and described, the invention is not so limited. Numerous modifications, variations, substitutions and equivalents will occur to those skilled in the art without departing from the spirit and scope of the present invention.

While the above is a full description of the specific embodiments, various modifications, alternative constructions and equivalents may be used. Therefore, the above description and illustrations should not be taken as limiting the scope of the present invention which is defined by the appended claims.

What is claimed:

1. A method of making a catholyte material, comprising providing catholyte precursor materials; ball milling the catholyte precursor materials; annealing the catholyte precursor materials to form a catholyte; and ball milling the catholyte to a median particle size of less than about 1 um and greater than 20 nm; wherein the catholyte precursor materials are selected from LiS, $P_2Ss$, $SiS_2$, Si, S, and combinations thereof.

2. The method of claim 1, wherein the annealing is at 500° C. to 600° C.

3. The method of claim 1, wherein the annealing is at 400° C. to 600° C.

* * * * *